US010635179B2

(12) United States Patent
Shahmohammadi

(10) Patent No.: US 10,635,179 B2
(45) Date of Patent: Apr. 28, 2020

(54) APPARATUS, SYSTEMS, AND METHODS FOR FACILITATING USER INTERACTION WITH ELECTRONIC DEVICES

(71) Applicant: FACEBOOK TECHNOLOGIES, LLC, Menlo Park, CA (US)

(72) Inventor: Mohsen Shahmohammadi, Pittsburgh, PA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/975,759

(22) Filed: May 9, 2018

(65) Prior Publication Data
US 2019/0346928 A1 Nov. 14, 2019

(51) Int. Cl.
*G06F 3/01* (2006.01)
*H04B 13/00* (2006.01)
(52) U.S. Cl.
CPC .......... *G06F 3/017* (2013.01); *H04B 13/005* (2013.01)
(58) Field of Classification Search
CPC ............. G06F 3/011–015; G06F 3/017; H04B 13/005; G02B 27/017; G02B 27/0093
See application file for complete search history.

(56) References Cited

U.S. PATENT DOCUMENTS

| | | | | |
|---|---|---|---|---|
| 6,992,565 B1* | 1/2006 | Giesler | ............. | A61B 5/0028 340/13.2 |
| 9,449,446 B1* | 9/2016 | Mullin | ............. | G07C 9/00158 |
| 2011/0080339 A1* | 4/2011 | Sun | ............. | G06F 3/017 345/157 |
| 2012/0088446 A1* | 4/2012 | Fyke | ............. | H04K 3/415 455/1 |
| 2015/0145805 A1* | 5/2015 | Liu | ............. | G06F 3/01 345/174 |
| 2015/0257647 A1* | 9/2015 | Buck | ............. | A61B 5/0028 600/388 |
| 2015/0379255 A1* | 12/2015 | Konanur | ............. | G06F 21/35 726/19 |
| 2016/0213324 A1* | 7/2016 | Gil | ............. | A61B 5/7278 |

(Continued)

FOREIGN PATENT DOCUMENTS

WO 2015193460 A1 12/2015

OTHER PUBLICATIONS

Chouchang Yang, Jeremy Gummeson, and Alanson Sample; Riding the airways: Ultra-wideband ambient backscatter via commercial broadcast systems; https://ieeexplore.ieee.org/document/8057162/ (May 1-4, 2017).

(Continued)

*Primary Examiner* — Tom V Sheng
(74) *Attorney, Agent, or Firm* — FisherBroyles, LLP

(57) ABSTRACT

A method for facilitating user interaction with an electronic device may include (1) applying, via at least one primary electrode of a human-body coupling subsystem, a body-bound signal to a user's body, (2) receiving, through the user's body via at least one secondary electrode of the human-body coupling subsystem, the body-bound signal, (3) determining at least one characteristic of the received body-bound signal, and (4) identifying a bodily gesture made by the user based on the at least one characteristic of the received body-bound signal. Various other apparatus, systems, and methods are also disclosed.

20 Claims, 30 Drawing Sheets

(56) References Cited

U.S. PATENT DOCUMENTS

| | | | | |
|---|---|---|---|---|
| 2016/0366266 | A1* | 12/2016 | Chung | H04W 76/14 |
| 2017/0075425 | A1* | 3/2017 | Kursula | G06F 3/014 |
| 2017/0124816 | A1* | 5/2017 | Yang | G06Q 10/0833 |
| 2018/0055455 | A1* | 3/2018 | Hu | A61B 5/02433 |
| 2018/0253151 | A1* | 9/2018 | Kletsov | G01S 7/412 |
| 2018/0322335 | A1* | 11/2018 | Golan | G06F 3/16 |

OTHER PUBLICATIONS

Driving the New Era of Immersive Experiences; whitepaper; Qualcomm Technologies, Inc.; Oct. 2015 (Oct. 2015).

E. Rehmi Post, Matt Reynolds, Matthew Gray, Joe Paradiso, and Neil Gershenfeld; Intrabody Buses for Data and Power (Oct. 13-14, 1997).

Emteq announces collaboration with Quantum Capture at Awe Europe; https://emteq.net/blog/2017/10/19/press-release-awe2017; as accessed Aug. 13, 2018; Emteq Ltd (Oct. 19, 2017).

Emteq Reveals VR Facial Tracking Tech That Doesn't Require Cameras; https://www.vrfocus.com/2016/09/emteq-reveals-vr-facial-tracking-tech-that-doesnt-require-cameras/, as accessed Aug. 13, 2018; VRFocus (Sep. 12, 2016).

Gabe Cohn, Sidhant Gupta, Tien-Jui Lee, Dan Morris, Joshua R. Smith, Matthew S. Reynolds, Desney S. Tan, and Shwetak N. Patel; An ultra-low-power human body motion sensor using static electric field sensing; https://dl.acm.org/citation.cfm?doid=2370216.2370233 (Sep. 5-8, 2012).

http://thetechielifestyle.blogspot.com/2014/07/google-and-novartis-ink-deal-for-smart.html (Aug. 13, 2018).

https://www.vuzix.com/products/blade-smart-glasses (Aug. 13, 2018).

https://www.x.company/glass/ (Aug. 13, 2018).

Joshua F. Ensworth and Matthew S. Reynolds; Every smart phone is a backscatter reader; https://ieeexplore.ieee.org/document/7113076/ (Apr. 15-17, 2015).

Kai Zhang, Qun Hao, Yong Song, Jingwen Wang, Ruobing Huang, and Yue Liu; Modeling and Characterization of the Implant Intra-Body Communication Based on Capacitive Coupling Using a Transfer Function Method (Jan. 2014).

Making Immersive Virtual Reality Possible in Mobile; whitepaper; Qualcomm Technologies, Inc.; Mar. 2016 (Mar. 2016).

Maoyuan Li, Yong Song, Guangfa Wang, Qun Hao, and Kai Zang; Characterization of the implantable intra-body communication based on capacitive coupling by transfer function; https://ieeexplore.ieee.org/document/7796259/ (Nov. 11-13, 2016 ).

Marc Simon Wegmueller, Michael Oberle, Norbert Felber, Niels Kuster, and Wolfgang Fichtner; Signal Transmission by Galvanic Coupling Through the Human Body; https://ieeexplore.ieee.org/document/5280245/ (Oct. 6, 2009).

MirHojjat Seyedi and Daniel Tze Huei Lai; Effect of Limb Joints and Limb Movement on Intrabody Communications for Body Area Network Applications (Jan. 2014).

Nafiseh Seyed Mazloum; Body-Coupled Communications Experimental characterization, channel modeling and physical layer design (Dec. 2008).

Paul Worgan, Jarrod Knibbe, Mike Fraser, and Diego Martinez Plasencia; PowerShake: Power Transfer Interactions for Mobile Devices; https://dl.acm.org/citation.cfm?doid=2858036.2858569 (May 7-12, 2016 ).

Pengyu Zhang, Mohammad Rostami, Pan Hu, Deepak Ganesan; Enabling Practical Backscatter Communication for On-body Sensors (Aug. 22-26, 2016 ).

Qualcomm's XR (Extended Reality) Is Mobile Future; http://booredatwork.com/qualcomms-xr-extended-reality-is-mobile-future/; as accessed Aug. 13, 2018; Boredatwork (May 31, 2017).

Ryan Gill; Human Body Communication Using Galvanic Coupling (2017).

Smart Contact Lenses—Who's Got Their Eyes on the Prize? ; http://www.gadgethelpline.com/smart-contact-lenses-whos-got-their-eyes-on-the-prize/; as accessed Aug. 13, 2018; Gadget Helpline (May 3, 2016).

Tengxiang Zhang, Xin Yi, Chun Yu, Yuntao Wang, Nicholas Becker, and Yuanchun Shi; TouchPower: Interaction-based Power Transfer for Power-as-needed Devices; https://dl.acm.org/citation.cfm?doid=3139486.3130986 (Sep. 2017).

The Mobile Future of Augmented Reality (Dec. 2016).

Thomas Guthrie Zimmerman; Personal Area Networks (PAN): Near-Field Intra-Body Communication (Sep. 1995).

Tobii Pro Glasses 2; https://www.tobiipro.com/product-listing/tobii-pro-glasses-21; as accessed Aug. 13, 2018; Tobii AB (Aug. 13, 2017).

VR and AR pushing connectivity limits (May 2017).

Yong Song, Qun Hao, Kai Zhang; Review of the Modeling, Simulation and Implement of Intra-body Communication (Oct. 30, 2013).

* cited by examiner

APPARATUS, SYSTEMS, AND METHODS FOR FACILITATING USER INTERACTION WITH ELECTRONIC DEVICES

BACKGROUND

The disclosure relates generally to wearable devices, and more specifically to head-mounted-display devices and systems.

Virtual reality (VR) and augmented reality (AR) headsets are gaining in popularity for use in a growing number of activities. Such headsets may integrate visual information into a user's field of view to enhance their surroundings or allow them to step into immersive three-dimensional environments. While virtual reality and augmented reality headsets are often utilized for gaming and other entertainment purposes, they are also commonly employed for purposes outside of recreation—for example, governments may use them for military training simulations, doctors may use them to practice surgery, and engineers may use them as visualization aids. Virtual and augmented reality systems are also increasingly recognized for their utility in facilitating interpersonal interactions between individuals in a variety of contexts.

Head-mounted devices, such as AR and VR headsets, typically need to be light in weight and have small profiles. Additionally, a user's view may be partially or fully obscured in such headsets. Accordingly, physical interfaces allowing for input of user commands are often limited and may only permit a select number of inputs by users. Unfortunately, inputting more complex user commands may be challenging due to these interface constraints. Additionally, while AR and VR headsets are increasingly utilized in remote interactions between users, such headsets are not commonly equipped to easily convey more nuanced details, such as user facial expressions and/or bodily gestures. The instant disclosure, therefore, identifies and addresses a need for apparatus, systems, and methods for facilitating interaction with wearable devices and between users of users of wearable devices, especially VR and AR headsets.

SUMMARY

As will be described in greater detail below, the instant disclosure describes various apparatus, systems, and methods for facilitating user interaction with electronic devices. In one example, an interactive system may include (1) a human-body coupling subsystem configured to conduct a body-bound signal through a user's body, the human-body coupling subsystem including a plurality of electrodes, (2) a transmitting and receiving subsystem electrically connected to the human-body coupling subsystem and configured to (i) apply, to the user's body via the at least one primary electrode of the human-body coupling subsystem, a body-bound signal, and (ii) receive, through the user's body via the at least one secondary electrode of the human-body coupling subsystem, the body-bound signal, and (3) a gesture-detection subsystem electrically connected to the transmitting and receiving subsystem and configured to determine at least one characteristic of the received body-bound signal and identify a bodily gesture made by the user based on the at least one characteristic of the received body-bound signal. The human-body coupling subsystem may be configured to be galvanically coupled or capacitively coupled to the user's body via at least some of the plurality of electrodes.

According to some embodiments, the at least one characteristic of the received body-bound signal may include at least one of a magnitude of an amplitude, a phase shift, or a propagation delay of the received body-bound signal. The transmitting and receiving subsystem may be configured to selectively apply and receive body-bound signals via each of the plurality of electrodes. The gesture-detection subsystem may be configured to identify the bodily gesture based on a comparison between the at least one characteristic of the received body-bound signal and at least one predetermined signal characteristic. In this example, the at least one predetermined signal characteristic may be based on at least one characteristic of one or more body-bound signals received by the transmitting and receiving subsystem during at least one of a time period during which the user is making the bodily gesture or a time period during which the user is not making the bodily gesture. In some examples, the gesture-detection subsystem may be configured to identify the bodily gesture based on a comparison between the at least one characteristic of the received body-bound signal and at least one characteristic of a transmitted signal sent from the transmitting and receiving subsystem to the at least one primary electrode of the human-body coupling subsystem. In at least one example, the gesture-detection subsystem may be configured to identify the bodily gesture based on a correlation between the bodily gesture and the at least one characteristic of the received body-bound signal determined using a trained machine-learning model.

According to at least one embodiment, the human-body coupling subsystem may include (1) a medial surface positioned to face at least a portion of the user's body when the human-body coupling subsystem is worn by the user, and (2) a lateral surface positioned to face away from the user's body when the human-body coupling subsystem is worn by the user. In this example, the at least one primary electrode may be coupled to the medial surface of the human-body coupling subsystem such that the at least one primary electrode is positioned to abut at least one primary region of the user's body. The at least one secondary electrode may be coupled to the medial surface of the human-body coupling subsystem such that the at least one secondary electrode is positioned to abut at least one secondary region of the user's body.

In some examples, the transmitting and receiving subsystem may be configured to apply, to the user's body via the at least one primary electrode of the human-body coupling subsystem, a plurality of body-bound signals, each of the plurality of body-bound signals having a separate frequency. In this example, the transmitting and receiving subsystem may be configured to receive, through the user's body via the at least one secondary electrode of the human-body coupling subsystem, the plurality of body-bound signals. The gesture-detection subsystem may be configured to (1) determine at least one characteristic of each of the plurality of received body-bound signals and (2) identify the bodily gesture made by the user based on the at least one characteristic of each of the plurality of received body-bound signals. The transmitting and receiving subsystem may be configured to apply each of the plurality of body-bound signals to the user's body via a separate primary electrode of the at least one primary electrode. Additionally or alternatively, the transmitting and receiving subsystem may be configured to apply each of the plurality of body-bound signals to the user's body during a separate time period.

In some embodiments, the interactive system may include a head-mounted device having (1) a display region configured to display images to the user and (2) a display controller configured to modify the images displayed in the display region based on the identified bodily gesture. In this example, the head-mounted device may include at least a portion of the human-body coupling subsystem. Additionally or alternatively, the interactive system may include an electronic device that is configured to abut a non-head portion of the user's body, the electronic device including another portion of the human-body coupling subsystem. The interactive system may also include a communication subsystem configured to transmit data to an external device. The communication subsystem may be configured to modify the data transmitted to the external device based on the identified bodily gesture. In at least one example, the bodily gesture may include at least one of a facial gesture, a head gesture, a torso gesture, an arm gesture, or a leg gesture.

A corresponding head-mounted-display device may include (1) a human-body coupling subsystem configured to conduct a body-bound signal through a user's body, the human-body coupling subsystem including a plurality of electrodes, each of the plurality of electrodes positioned to abut a separate region of the user's head, (2) a transmitting and receiving subsystem electrically connected to the human-body coupling subsystem and configured to (i) apply, to the user's head via at least one electrode of the plurality of electrodes, a body-bound signal, and (ii) receive, through the user's body via at least one additional electrode of the plurality of electrodes, the body-bound signal. In some embodiments, the head-mounted-display device may include a facial-interface cushion dimensioned to abut a facial portion of the user. One or more of the plurality of electrodes may form an integral part of the facial-interface cushion. In at least one embodiment, the head-mounted-display device may include (1) a display region, (2) a bridge coupled to the display region and dimensioned to rest on the nose of the user, and (3) a temple coupled to the display region and dimensioned to rest on an ear of the user. In this example, one or more of the plurality of electrodes may form an integral part of one of the bridge or the temple.

A corresponding method for facilitating user interaction with an electronic device may include (1) applying, via at least one primary electrode of a human-body coupling subsystem, a body-bound signal to a user's body, (2) receiving, through the user's body via at least one secondary electrode of the human-body coupling subsystem, the body-bound signal, (3) determining at least one characteristic of the received body-bound signal, and (4) identifying a bodily gesture made by the user based on the at least one characteristic of the received body-bound signal.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
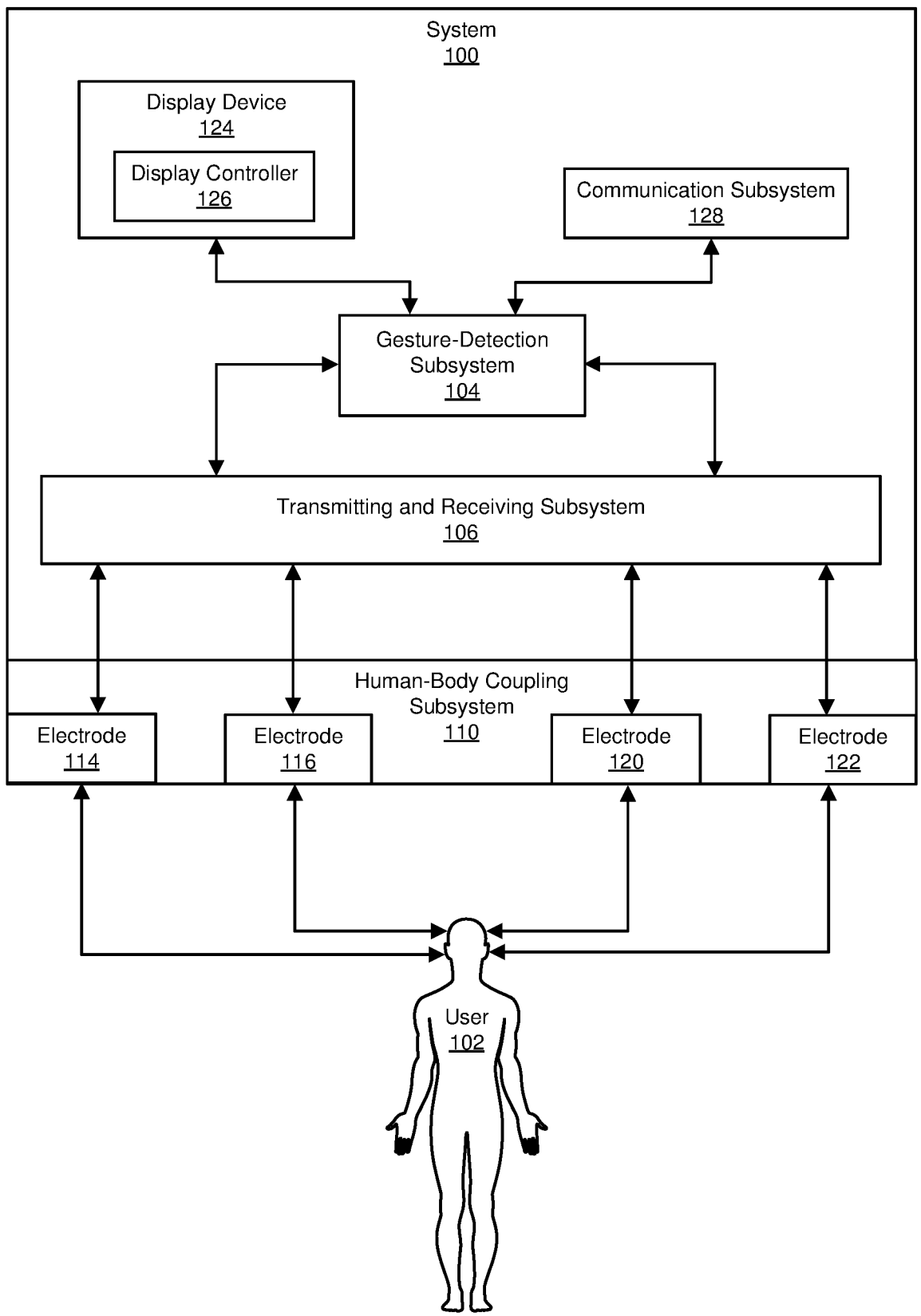
FIG. 1 is a block diagram of an exemplary galvanically coupled interactive system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatus, systems, and methods for facilitating user interaction with electronic devices. As will be explained in greater detail below, embodiments of the instant disclosure may enable a head-mounted device, such as a head-mounted display and/or at least one other electronic device worn, held, and/or interacted with by a user, to detect user gestures (e.g., facial gestures and/or other bodily gestures). By using a wearer's body as a signal transfer medium, embodiments of the instant disclosure may enable devices to detect user gestures based on changes in one or more body-bound signals transmitted through the wearer's body. Such apparatus, systems, and methods may enable user interaction with electronic devices, such as head-mounted displays, without requiring users to input operations via conventional input interfaces, such as keyboards, controllers, headset buttons, voice-command interfaces, etc. Detection of user gestures may be accomplished using low-power signals that require minimal amounts of energy to transmit and receive, thereby reducing power use and extending the life of battery-operated devices. Moreover, users may easily and efficiently convey gestures to other remote users via such apparatus, systems, and methods. Accordingly, users may interact with electronic devices and other users in a manner that provides a broader range of interactive capabilities while facilitating a greater sense of immersion in VR and AR environments.

The following will provide, with reference to FIGS. 1-10, 13, 14, 16A-19, and 21-24, examples of systems and devices for facilitating user interaction with electronic devices. In addition, the discussion corresponding to FIGS. 11-12O, 15A-15L, and 20 will provide examples of bodily gestures that may be detected by the disclosed devices and systems. Further, the discussion corresponding to FIG. 15 will provide examples of methods for facilitating user interaction with electronic devices.

Figure 2:
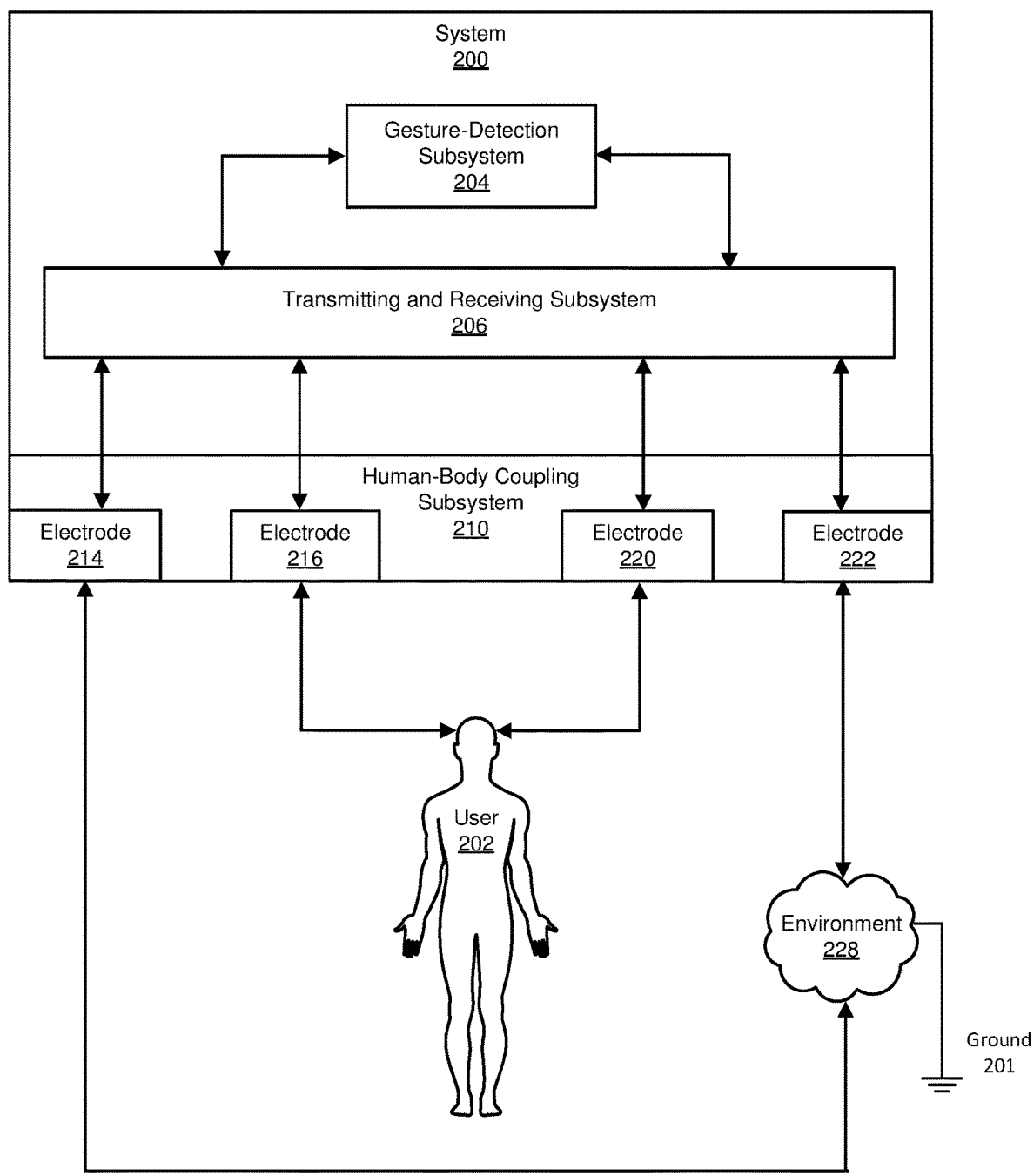
FIG. 2 is a block diagram of an exemplary capacitively coupled interactive system in accordance with some embodiments.

FIGS. 1 and 2 show exemplary interactive systems for facilitating user interaction with electronic devices according to some embodiments. As will be described in greater detail below, these interactive systems may include one or more electronic devices (e.g., a head-mounted-display device, a smart watch, a smart phone, etc.) that are worn by and/or interacted with by a user. In at least one embodiment, electronic devices of the interactive systems may include electrodes that abut body portions of the user to conduct body-bound signals through the user's body. Such body-bound signals may be utilized by the interactive systems to detect physical gestures (e.g., bodily gestures, facial expressions, etc.) made by the user based on characteristics (e.g., signal magnitude, signal phase shift, etc.) of the body-bound signals after passing through the user's body.

FIG. 1 illustrates an exemplary gesture-detection system 100 that may be galvanically coupled to a user 102 to facilitate interaction between user 102 and at least one electronic device. As shown in this figure, system 100 may include a gesture-detection subsystem 104 for detecting bodily gestures made by user 102 based on characteristics of body-bound signals passing through the body of user 102. For example, gesture-detection subsystem 104 may determine at least one characteristic of a body-bound signal received from the body of user 102 and may identify a bodily gesture based on the at least one characteristic of the body-bound signal. System 100 may also include a transmitting and receiving subsystem 106 for applying body-bound signals to the body of user 102 and/or receiving body-bound signals that have been transmitted through the body of user 102. For example, transmitting and receiving subsystem 106 may produce electromagnetic waves that are applied to at least a portion of the body of user 102 and that are subsequently received from the body of user 102 by transmitting and receiving subsystem 106. Gesture-detection subsystem 104 and/or transmitting and receiving subsystem 106 may be included in one or more electronic devices worn by and/or interacted with by user 102 and/or may be included in one or more external electronic devices. In some embodiments, system 100 may also include a display device 124 (e.g., a display of a head-mounted-display device) having a display region that is configured to display images to the user. Display device 124 may include a display controller 126 that is configured to modify images displayed in the display region of display device 124 based on one or more bodily gestures of user 102 identified by gesture-detection subsystem 104. In at least one example, system 100 may also include a communication subsystem 128 configured to transmit data to an external device, such as a device not worn or interacted with by user 102. Communication subsystem 128 may, for example, be configured to modify data transmitted to the external device based on one or more bodily identified bodily gestures of user 102 identified by gesture-detection subsystem 104.

In some embodiments, system 100 may include a human-body coupling subsystem 110 that is galvanically coupled to user 102. For example, human-body coupling subsystem 110 may be galvanically coupled to the body of user 102 via two or more electrodes, such as electrodes 114, 116, 120, and/or 122. The electrodes described herein may each be any suitable electrically conductive member having any suitable shape (e.g., square or circle) and/or may be made of any suitable conductive material (e.g., a conductive polymer, perhaps covered by silver ink, a metal such as copper, silver, or gold, and/or a conductive fabric, such as a fabric including conductive fibers). Human-body coupling subsystem 110 may include at least a portion of a single electronic device, such as a head-mounted-display device, or may include portions of two or more separate electronic devices. In some examples, electrodes 114, 116, 120, and 122 may be disposed abutting a portion of the body of user 102 such that two or more of electrodes 114, 116, 120, and 122 are in relatively close proximity to each other without directly contacting each other. In at least one example, electrodes 114, 116, 120, and 122 may be separated from one another by a dielectric material. An electromagnetic signal may be differentially applied between two or more of electrodes 114, 116, 120, and 122 by transmitting and receiving subsystem 106, generating an electric current between electrodes 114, 116, 120, and/or 122. A major portion of the electric current may be distributed between two or more of electrodes 114, 116, 120, and 122 and a smaller secondary electric current (i.e., a body-bound signal) may propagate through the body of user 102. The body-bound signal may be transmitted through conductive tissues of the body along any suitable pathway and/or combination of pathways in the body.

The applied body-bound signal may be received by two or more of electrodes 114, 116, 120, and 122 after passing through the body of user 102. The secondary current induced by electrodes 114, 116, 120, and/or 122 may pass through at least a portion of the body as described above and may be received at two or more electrodes 114, 116, 120, and 122 (e.g., electrodes separate from the transmitting electrodes), resulting in a differential signal applied between the two or more electrodes, which is received by transmitting and receiving subsystem 106.

Body-bound signals transmitted and received by electrodes 114, 116, 120, and/or 122 may be influenced by the dielectric properties of conductive tissues within the body of user 102. Additionally, as will be described in greater detail below, position, orientation, and/or movement of various portions of the body may influence signals. For example, a change in position, orientation, and/or movement of one or more portions of the body of user 102 may cause body-bound signal transmission pathways through the body to be lengthened, shortened, and/or otherwise changed.

FIG. 2 illustrates an exemplary gesture-detection system 200 that may be capacitively coupled to a user 202 to facilitate interaction between user 202 and at least one electronic device. As shown in FIG. 2, system 200 may include a gesture-detection subsystem 204 for detecting bodily gestures made by user 202 based on characteristics of body-bound signals passing through the body of user 202. System 200 may also include a transmitting and receiving subsystem 206 for applying body-bound signals to the body of user 202 and/or receiving body-bound signals that have been transmitted through the body of user 202. Gesture-detection subsystem 204, transmitting and receiving subsystem 206, and/or transmitting and receiving subsystem 206 may be included in one or more electronic devices worn by and/or interacted with by user 202 and/or may be included in one or more external electronic devices.

In some embodiments, system 200 may include a human-body coupling subsystem 210 that is capacitively coupled to user 202. For example, human-body coupling subsystem 210 may be capacitively coupled to the body of user 202 and to a region surrounding the user, represented by environment 228, via two or more electrodes, such as electrodes 214, 216, 220, and/or 222. As shown in FIG. 2, electrodes, such as electrodes 216 and 220, may abut a portion of the body of user 202, and other electrodes, such as electrodes 214 and 222, may be exposed to environment 228. Capacitively coupled pairs of electrodes, such as electrodes 214 and 216 and/or electrodes 220 and 222, may be in relatively close proximity to each other and may be separated from one another by a dielectric material. For example, electrode 214 and electrode 216 may be layered so as to overlap each other with a dielectric layer disposed between electrode 214 and electrode 216. Additionally, electrode 214, which is exposed to environment 228, may not contact the body of user 202 such that electrodes 214 and 216 are each disposed at different distances from the body, resulting in electrodes 214 and 216 each having a different capacitive coupling to the body when an electromagnetic signal is applied and/or received between electrodes 214 and 216 by transmitting and receiving subsystem 206. A corresponding body-bound signal may be applied to the body and/or received from the body of user 202 by electrodes 214 and 216.

In some embodiments, electrode 220 may abut a portion of the body of user 202 and another electrode, such as electrode 222, may be exposed to environment 228 as illustrated in FIG. 2. Electrodes 220 and 222 may be in relatively close proximity to each other and may be separated from one another by a dielectric material. For example, electrode 220 and electrode 222 may be layered so as to overlap each other with a dielectric layer disposed between electrode 220 and electrode 222. Additionally, electrode 222, which is exposed to environment 228, may not contact the body of user 202. Accordingly, electrodes 220 and 222 may each be disposed at different distances from the body of user 202 such that differential signals are generated between electrodes 220 and 222 in response to, for example, a body-bound signal applied via electrodes 214 and 216 passing through the body of user 202. The body of user 202 may, for example, act as a conductor conveying the body-bound signals from transmitting and receiving subsystem 206 via electrodes 214 and 216 to transmitting and receiving subsystem 206 via electrodes 220 and 222. A return signal path may be generated between electrode 214 and electrode 222, which are exposed to environment 228, through ground 201. Therefore, an electric field around the body of user 202 may be utilized to capacitively transmit body-bound signals through the body of user 202.

According to at least one embodiment, body-bound signals received by transmitting and receiving subsystem 206 via electrodes 214 and 216 and/or via electrodes 220 and 222 may be influenced by the dielectric properties of conductive tissues within the body of user 202. In some embodiments, capacitively-coupled pairs of electrodes may act as passive sensors capable of detecting changes in voltage across the paired electrodes for purposes of, for example, phased array electric field sensing. Additionally, as will be described in greater detail below, position, orientation, and/or movement of various portions of the body may influence the signal. For example, a change in position, orientation, and/or movement of one or more portions of the body of user 202 may cause body-bound signal transmission pathways through the body to be lengthened, shortened, and/or otherwise changed.

In some embodiments, currents applied to the body of a user by one or more electrodes may be selected such that body-bound signals do not negatively impact a user's health while allowing for sufficient propagation of the body-bound signals through the user's body. For example, a transmitting and receiving (e.g., transmitting and receiving subsystem 106, transmitting and receiving subsystem 206, etc.), may supply up to +20 decibel-milliwatts (dBm) of power to electrodes at frequencies between about 1 kilohertz (kHz) and 150 megahertz (MHz).

Figure 3:
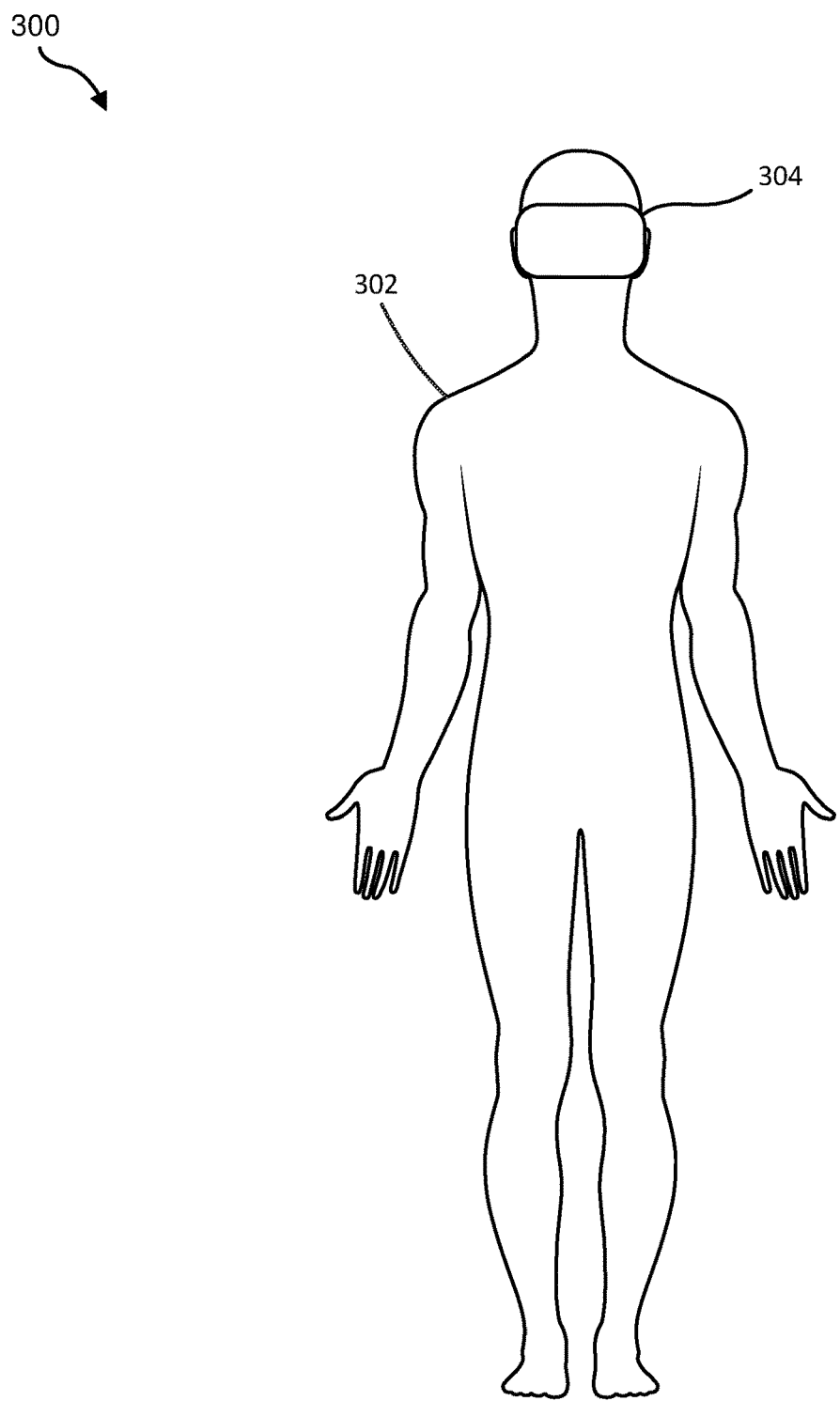
FIG. 3 is a front view of a user wearing a head-mounted-display device of an exemplary interactive system in accordance with some embodiments.

Example systems 100 and 200 in FIGS. 1 and 2 may be implemented in a variety of ways. For example, all or a portion of example systems 100 and 200 may represent portions of example systems 300 and 400 shown in FIGS. 3 and 4. As shown in FIG. 3, system 300 may include a user 302 and an electronic device worn by user 302. For example, FIG. 3 illustrates a head-mounted-display device 304, such as a virtual reality headset, worn on the head of user 302.

Figure 4:
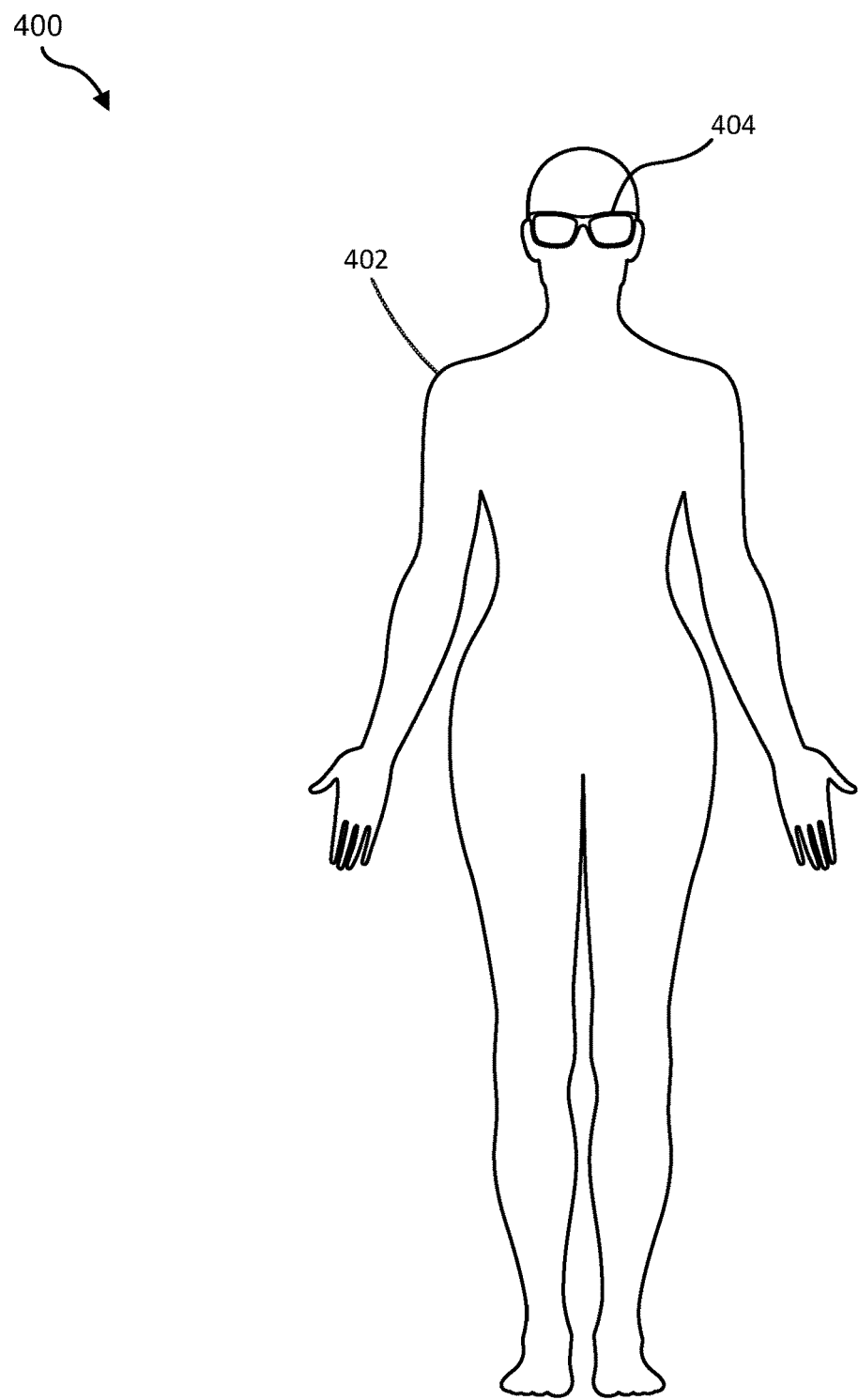
FIG. 4 is a front view of another user wearing a head-mounted-display device of another exemplary interactive system in accordance with some embodiments.

As shown in FIG. 4, system 400 may include a user 402 and an electronic device worn by user 402. For example, FIG. 4 illustrates a head-mounted-display device 404, such as a pair of augmented reality glasses, worn on the head of user 402.

Figure 5:
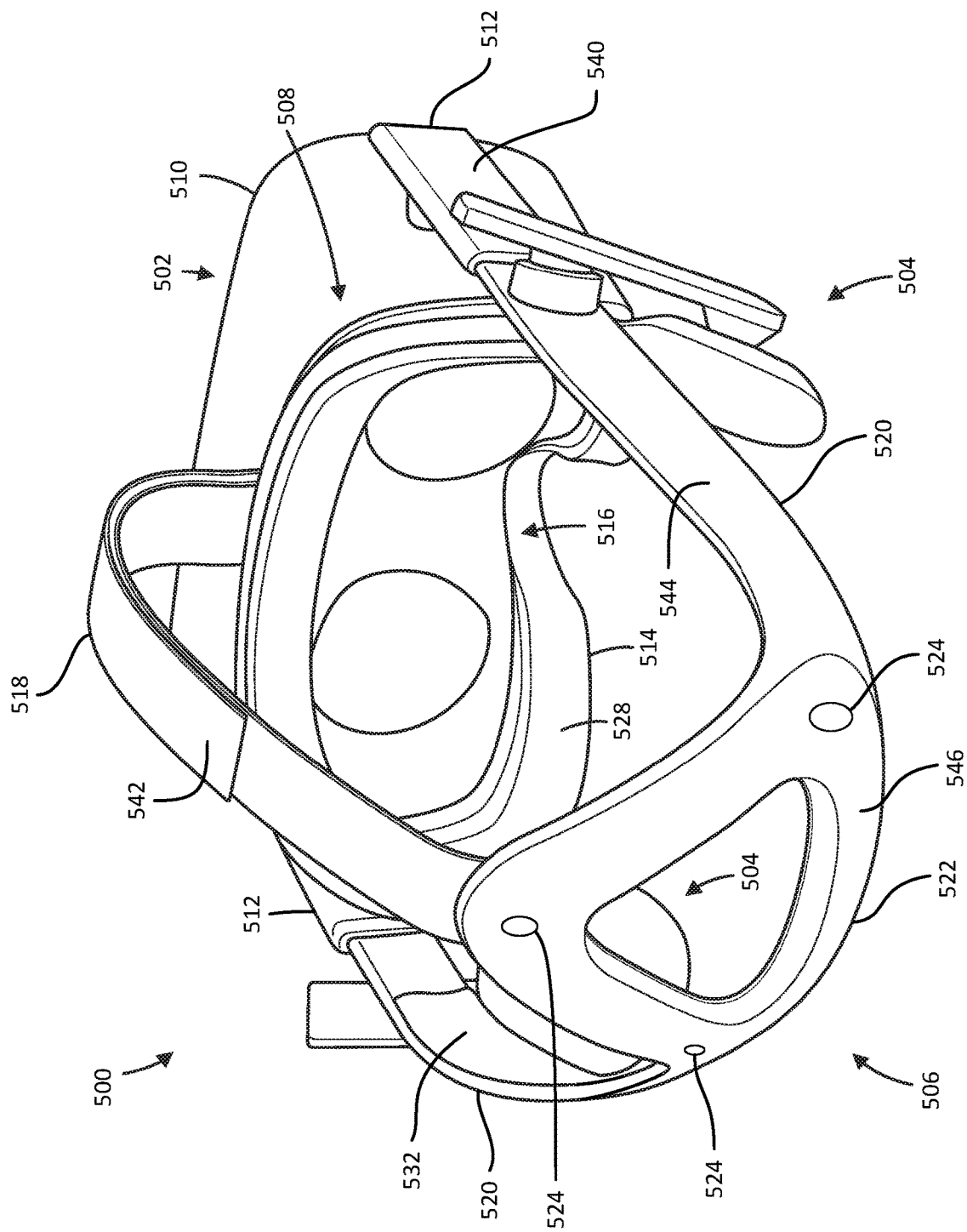
FIG. 5 is a perspective top view of an exemplary head-mounted-display device in accordance with some embodiments.
Figure 6:
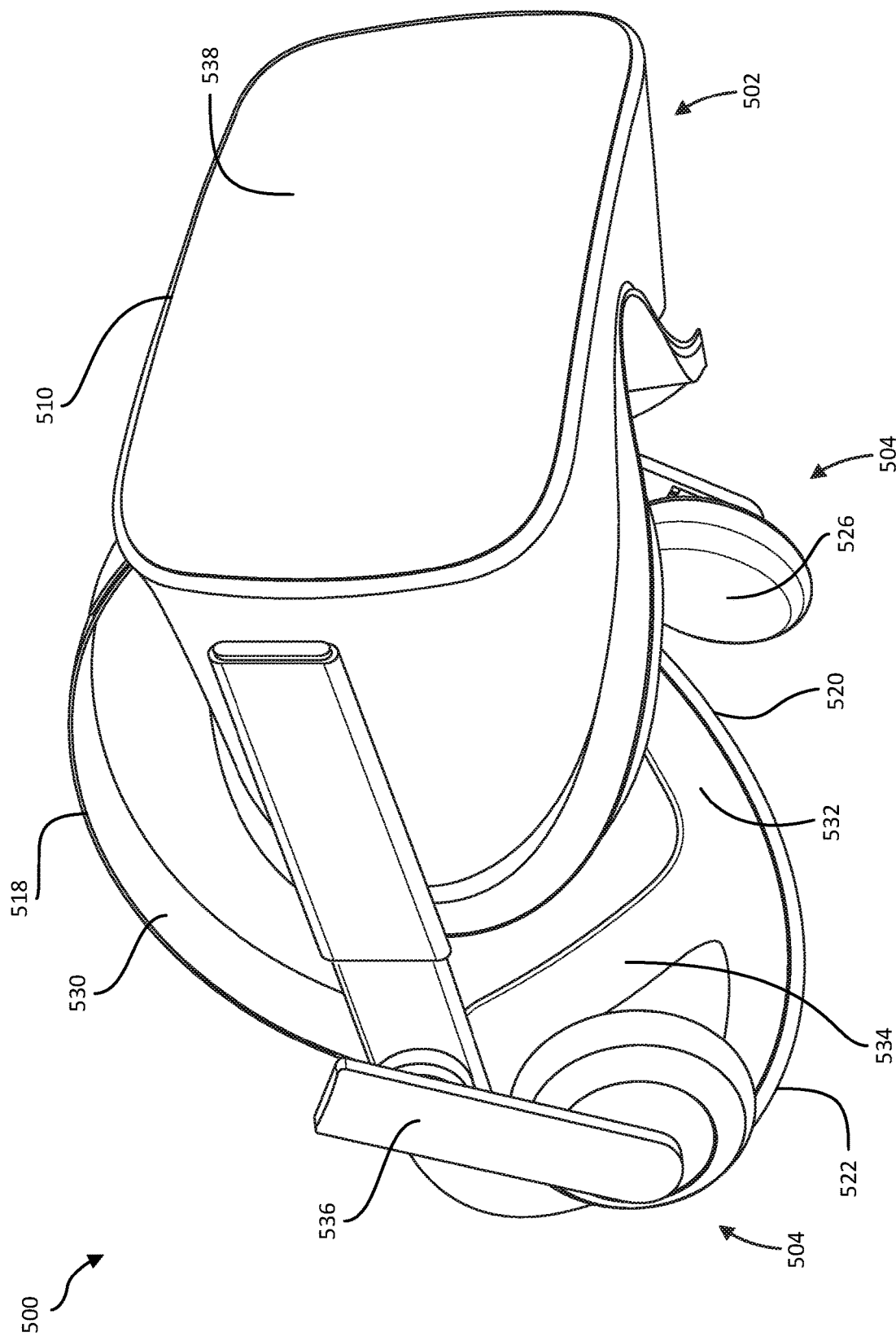
FIG. 6 is a perspective bottom view of the exemplary head-mounted-display device illustrated in FIG. 6 in accordance with some embodiments.

FIGS. 5 and 6 are perspective views of a head-mounted-display device 500 in accordance with some embodiments.

head-mounted-display device 500 includes a head-mounted display 502 (e.g., a head-mounted display), audio subsystems 504, a strap assembly 506, and a facial-interface subsystem 508. In some embodiments, the term "head-mounted display" may refer to any type or form of display device or system that is worn on or about a user's head and displays visual content to a user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

In some embodiments, head-mounted display 502 may include an outer housing 510 that may surround, contain, and protect various display, optical, and other electronic components of head-mounted display 502. Examples of electronic components may include, without limitation, sensors, output devices (e.g., lights, display devices, audio devices, haptic devices, etc.), wireless communication devices (e.g., antennae), and electrical signal or power transfer mediums (e.g., wires or cables). Examples of sensors that may be included in head-mounted display 502 may include, without limitation, gyroscopic sensors, accelerometers, altimeters, global positioning system devices, light sensors, audio sensors, power sensors, and/or any other sensor. Outer housing 510 may be attached to strap assembly 506 by interfaces 512. Facial-interface subsystem 508 may be configured to comfortably rest against a region of a user's face, including a region surrounding the user's eyes, when head-mounted-display device 500 is worn by the user. In these embodiments, facial-interface subsystem 508 may include a facial-interface cushion 514. Facial-interface cushion 514 may surround a viewing region 516 that includes the user's field of vision while the user is wearing head-mounted-display device 500.

In some embodiments, strap assembly 506 may be used to mount head-mounted display 502 on a user's head. As shown in FIG. 5, strap assembly 506 may include an upper strap 518 and lower straps 520. Lower straps 520 may each be coupled to one of strap interfaces 512, which are shown coupled to head-mounted display 502. Strap assembly 506 may adjustably conform to the top and/or sides of a user's head when the user is wearing head-mounted display 502. In some embodiments, strap assembly 506 may include a back piece 522 coupled with upper strap 518 and lower straps 520 to rest against the back of the user's head (e.g., around the user's occipital lobe).

In some embodiments, strap assembly 506 may include various electronic components. As shown in FIG. 5, strap assembly 506 may include motion-tracking lights 524 integrated into back piece 522 and audio subsystems 504 coupled to lower straps 520. In some embodiments, motion-tracking lights 524 may be light-emitting-diode markers that are used by an external motion-tracking system to track the position and/or motion of head-mounted-display device 500.

Electrodes made of various conductive elements for transmitting and/or receiving body-bound signals via a user's body, such as electrodes 114, 116, 120, and 122 in FIG. 1 or electrodes 214, 216, 220, and 222 in FIG. 2, may be incorporated into head-mounted-display device 500. In some embodiments, these conductive elements may receive and/or transmit body-bound signals through a user's body. Conductive elements may be incorporated into any suitable medial or lateral surface of head-mounted-display device 500. The term "medial surface" may refer to any surface of a wearable device that faces or points towards a user's body, and the term "lateral surface" may refer to any surface of a wearable device that faces a user's environment and/or face's away from the user's body. In some examples, the medial surfaces of head-mounted-display device 500 may include one or more conductive elements positioned to rest against or near a user's head, face, or ears. For example, conductive elements may be incorporated into some or all of medial surfaces 526 of audio subsystems 504, a medial surface 528 of facial-interface subsystem 508, a medial surface 530 of upper strap 518, medial surfaces 532 of lower straps 520, and/or a medial surface 534 of back piece 522. In some examples, the lateral surfaces of head-mounted-display device 500 may include one or more conductive elements positioned to face away from a user's head. For example, conductive elements may be incorporated into some or all of lateral surfaces 536 of audio subsystems 504, a lateral surface 538 of outer housing 510, lateral surfaces 540 of strap interfaces 512, a lateral surface 542 of upper strap 518, lateral surfaces 544 of lower straps 520, and/or a lateral surface 546 of back piece 522.

Figure 7A:
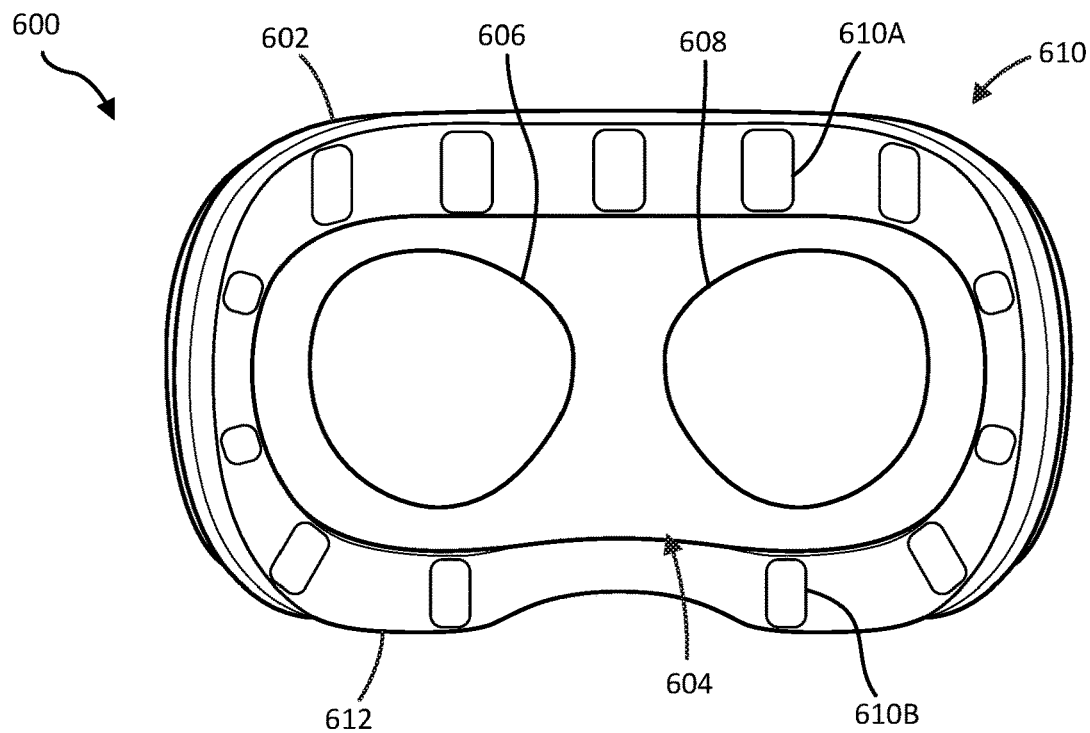
FIGS. 7A and 7B are front views of exemplary head-mounted-display devices in accordance with some embodiments.
Figure 7B:
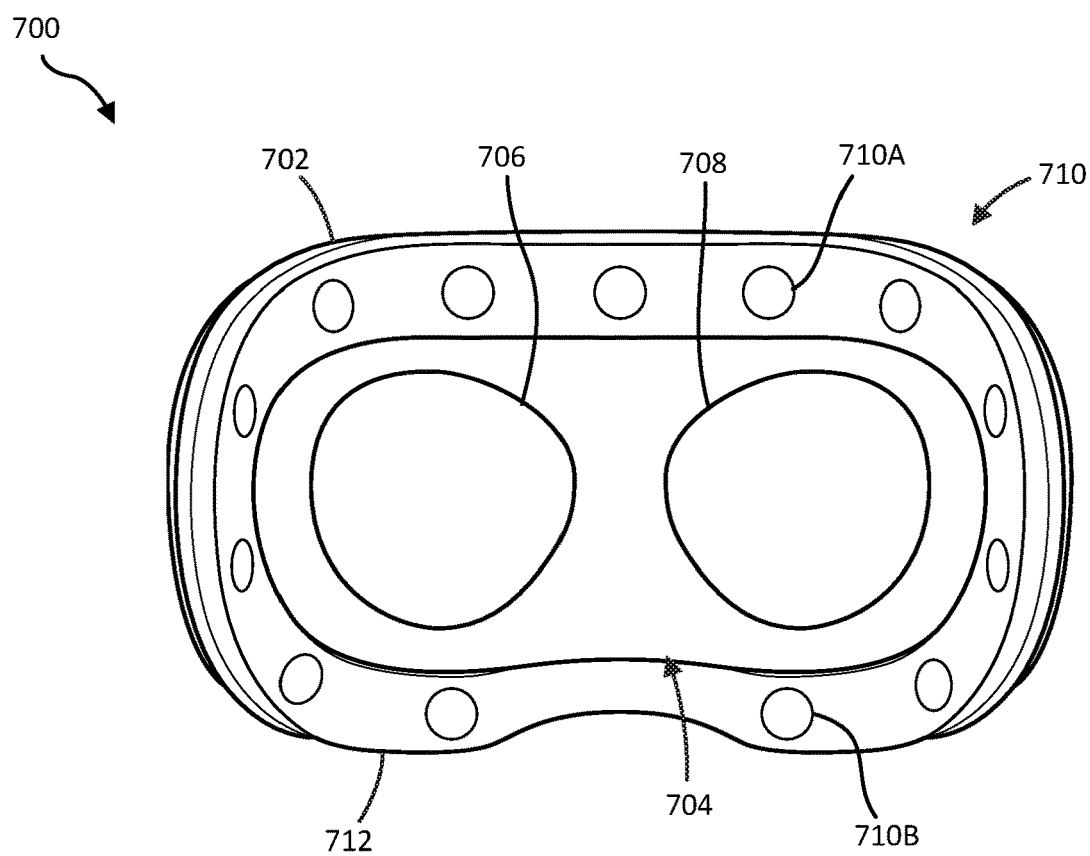

FIGS. 7A and 7B are front views of exemplary head-mounted-display devices in accordance with some embodiments. Head-mounted-display devices, such as head-mounted-display device 500 shown in FIGS. 5 and 6, may include facial interfaces having electrodes of a human-body coupling subsystem as described herein. Such facial interfaces may include any suitable number of electrodes having any suitable size, shape, and configuration.

According to at least one embodiment, as shown in FIG. 7A, a head-mounted-display device 600 may include a facial interface 602 surrounding a viewing region 604, which includes a user's field of vision, allowing the user to look through left-eye lens 606 and right-eye lens 608 of head-mounted-display device 600 without interference from outside light while the user is wearing head-mounted-display device 600. Images displayed by one or more display screens of head-mounted-display device 600 may be visible to a user through left-eye lens 606 and right-eye lens 608.

As illustrated in FIG. 7A, facial interface 602 may also include a plurality of electrodes 610 that are positioned to abut various regions of a user's face when head-mounted-display device 600 is worn by the user. For example, as will be described in greater detail below, electrodes 610 may be positioned to abut portions of the user's nasal, cheek, temple, and/or forehead facial regions. In at least one embodiment, one or more of electrodes 610 may be elongated electrodes having a rectangular or generally rectangular periphery, as shown in FIG. 7A. In some examples, electrodes 610 may be disposed in a facial-interface cushion 612 of facial interface 602 such that surfaces of electrodes 610 positioned to abut the user's face are aligned or generally aligned with adjacent surface regions of facial-interface cushion 612 positioned to abut the user's face. Electrodes 610 may be positioned apart from each other such that adjacent electrodes 610 do not contact each other. In some examples, facial-interface cushion 612 may include an insulative material that prevents an electrical current from being conducted between separate electrodes 610 via facial-interface cushion 612.

Electrodes 610 may be galvanically or capacitively coupled to a user when head-mounted-display device 600 is worn by the user such that body-bound signals may be transmitted between selected transmitting and receiving electrodes of electrodes 610 and/or between selected electrodes of electrodes 610 and two or more electrodes of another electronic device mounted to a separate portion of the user's body. Electrodes 610 may be configured to transmit and/or receive body-bound signals when electrodes 610 contact user's skin and/or when electrodes 610 are disposed and within sufficiently close proximity to the user's skin.

According to at least one embodiment, electrodes 610 may include at least one electrode 610A configured to apply, at a selected point in time, a body-bound signal from an electrically connected transmitting and receiving (e.g., transmitting and receiving subsystem 106 or transmitting and receiving subsystem 206 shown in FIGS. 1 and 2) to a user's face. Electrode 610 may also include at least one electrode 610B, which is electrically connected to a transmitting and receiving subsystem, that is configured to receive, at a selected point in time, a body-bound signal from the user's body. In some examples, body-bound signals applied to the user's face by the at least one electrode 610A may be received by the at least one electrode 610B at a selected point in time. Additionally or alternatively, body-bound signals applied to the user's face by the at least one electrode 610A may be received by at least one electrode of an electronic device positioned abutting a separate portion of the user's body (e.g., a non-facial region of the user's body), as will be described in greater detail below. In at least one example, body-bound signals applied to a separate portion of the user's body, such as a non-facial region of the user's body, may be received by the at least one electrode 610B.

According to some embodiments, head-mounted-display device 600 may be configured to transmit and/or receive body-bound signals for detecting facial gestures (e.g., facial expressions, facial positions, facial movements, etc.). For example, a body-bound signal may be transmitted between at least one electrode 610A and at least one electrode 610B via a user's body. In this example, at least a portion of the body-bound signal transmitted between the at least one electrode 610A and the at least one electrode 610B may pass through portions of the user's face, allowing for determination of changes in the body-bound signal resulting from changes in at least a portion of the user's face, as will be discussed in greater detail below with reference to FIG. 8.

In at least one embodiment, various electrodes 610 may be selected as either a transmitting electrode or a receiving electrode during different time periods. In such examples, head-mounted-display device 600 may be configured such that one or more of electrodes 610 may alternate between applying a body-bound signal to a user's face and receiving a body-bound signal from the user's face. For example, exemplary electrode 610A shown in FIG. 7A may alternatively be utilized by head-mounted-display device 600 to receive a body-bound signal by electrically connecting the electrode to a transmitting and receiving subsystem. Additionally or alternatively, exemplary electrode 610B shown in FIG. 7A may alternatively be utilized by head-mounted-display device 600 to transmit a body-bound signal by electrically connecting the electrode to a transmitting and receiving subsystem. Electrodes 610 may be utilized as transmitting electrodes and/or receiving electrodes in any suitable combination, without limitation. In some examples, a body-bound signal may not be transmitted or received via one or more of electrodes 610 during a time period in which at least one body-bound signal is transmitted and/or received by one or more other electrodes 610. According to at least one example, combinations of electrodes 610 utilized for transmitting and/or receiving body-bound signals from the user's face may be varied at different time periods. In some examples, different numbers of electrodes 610 may be utilized to apply body-bound signals and to receive body-bound signals. For example, a body-bound signal applied by a single electrode 610 may be received at a plurality of electrodes 610 coupled to a transmitting and receiving subsystem.

In some embodiments, a plurality of body-bound signals having different frequencies may be transmitted and/or received via one or more of electrodes 610 of head-mounted-display device 600. For example, body-bound signals having different frequencies may be consecutively applied to a user's face via electrode 610A and/or may be consecutively received from the user's face via receiving electrode 610B. Additionally or alternatively, body-bound signals having different frequencies may be consecutively and/or simultaneously transmitted and/or received via separate electrodes 610. According to at least one example, frequencies and/or combinations of frequencies of body-bound signals transmitted and/or received by various electrodes 610 may be varied at different time periods. In some examples, a frequency scan or sweep that includes a range of frequencies applied by one or more electrodes 610 may be utilized in the determination of user gestures.

FIG. 7B shows a head-mounted-display device 700 having a facial interface 702 surrounding a viewing region 704, which includes a user's field of vision, allowing the user to look through left-eye lens 706 and right-eye lens 708 of head-mounted-display device 700 without interference from outside light while the user is wearing head-mounted-display device 700. Images displayed by one or more display screens of head-mounted-display device 700 may be visible to a user through left-eye lens 706 and right-eye lens 708.

As illustrated in FIG. 7B, facial interface 702 may also include a plurality of electrodes 710 that are positioned to abut various regions of a user's face when head-mounted-display device 700 is worn by the user. For example, as will be described in greater detail below, electrodes 710 may be positioned to abut portions of the user's nasal, cheek, temple, and/or forehead facial regions. In at least one embodiment, one or more of electrodes 710 may have a periphery, such as a circular periphery as shown in FIG. 7B. In some examples, electrodes 710 may be disposed in a facial-interface cushion 712 of facial interface 702 such that surfaces of electrodes 710 positioned to abut the user's face are aligned or generally aligned with adjacent surface regions of facial-interface cushion 712 positioned to abut the user's face. Electrodes 710 may include at least one electrode 710A configured to apply, at a selected point in time, a body-bound signal from an electrically connected transmitting and receiving (e.g., transmitting and receiving subsystem 106 or transmitting and receiving subsystem 206 shown in FIGS. 1 and 2) to a user's face. Electrode 710 may also include at least one receiving electrode 710B, which is electrically connected to a receiving subsystem, that is configured to receive, at a selected point in time, a body-bound signal from the user's body.

Figure 8:
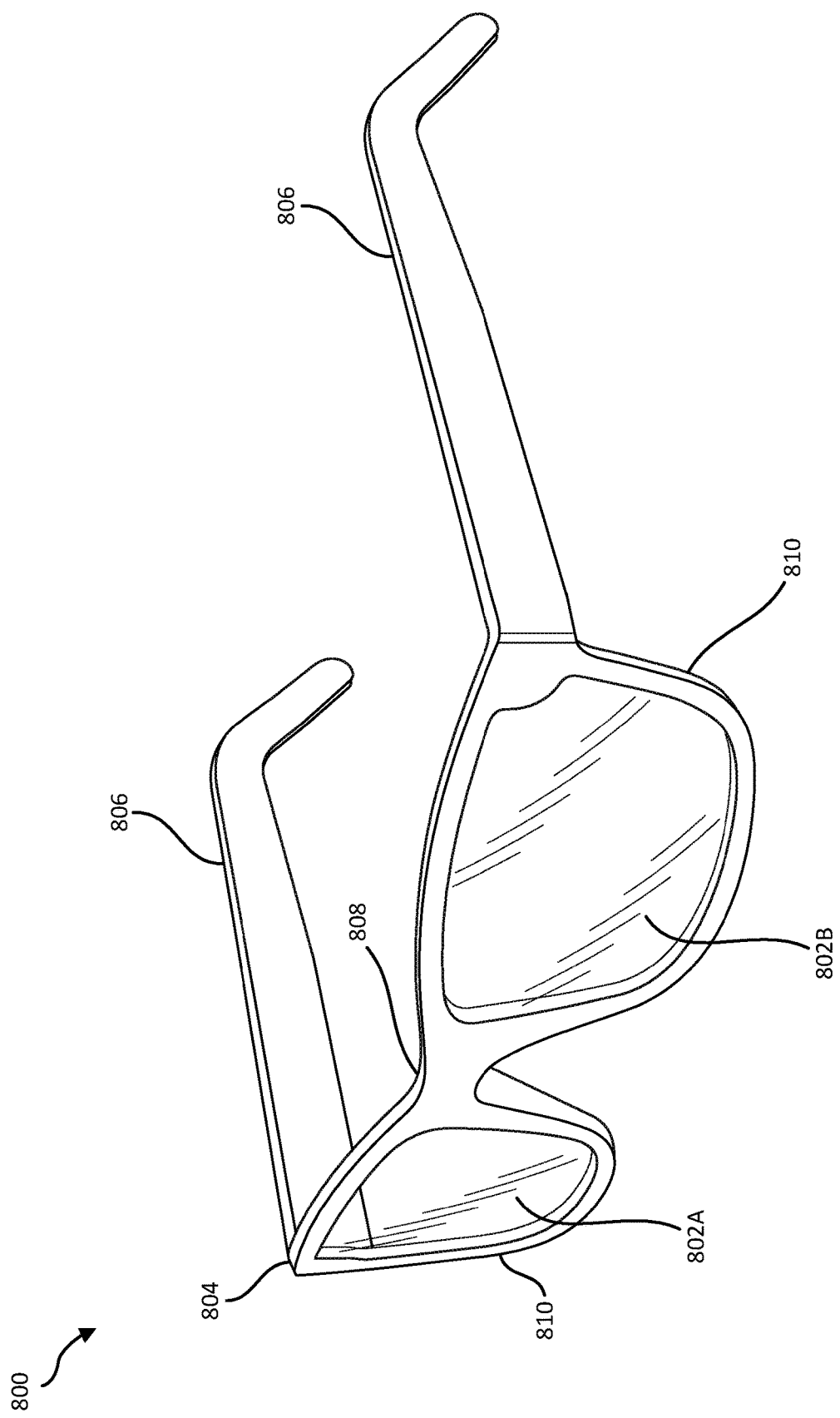
FIG. 8 is a perspective view of another exemplary head-mounted-display device in accordance with some embodiments.
Figure 9:
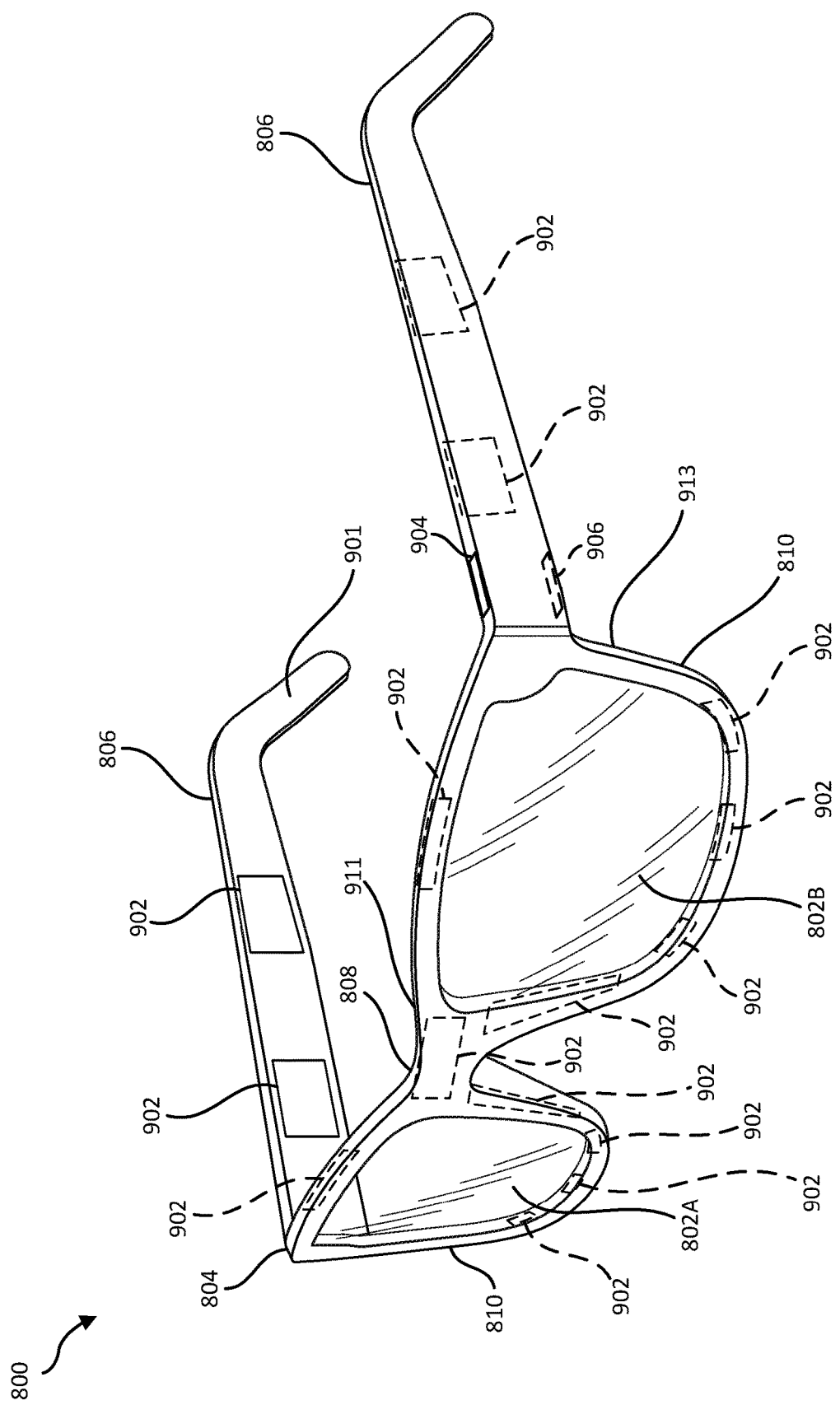
FIG. 9 is a perspective view of exemplary electrodes of the head-mounted-display device illustrated in FIG. 8 in accordance with some embodiments.

FIGS. 8 and 9 are diagrams of a head-mounted-display device 800 according to some embodiments. The depicted embodiment includes a right near-eye display 802A and a left near-eye display 802B, which are collectively referred to as near-eye displays 802. Near-eye displays 802 may be transparent or semi-transparent lenses that include or utilize a display system (e.g., a projection display system) to present media to a user. Examples of media presented by near-eye displays 802 include one or more images, a series of images (e.g., a video), audio, or some combination thereof. Near-eye displays 802 may be configured to operate as an AR near-eye display, such that a user can see media projected by near-eye displays 802 and see the real-world environment through near-eye displays 802. However, in some embodiments, near-eye displays 802 may be modified to also operate as VR near-eye displays, MR near-eye displays, or some combination thereof. Accordingly, in some embodiments, near-eye displays 802 may augment views of a physical, real-world environment with computer-generated elements (e.g., images, video, sound, etc.).

As shown in FIG. 8, head-mounted-display device 800 may include a support or frame 804 that secures near-eye displays 802 in place on the head of a user, in embodiments in which near-eye displays 802 includes separate left and right displays. In some embodiments, frame 804 may be a frame of eye-wear glasses. Frame 804 may include temples 806 configured to rest on the top of and/or behind a user's ears, a bridge 808 configured to rest on the top on the bridge of the user's nose, and rims 810 sized and configured to rest on or against the user's cheeks. Although not illustrated in FIG. 8, in some embodiments, head-mounted-display device 800 may include nose pads for resting on the bridge of the user's nose. Head-mounted-display device 800 may additionally or alternatively include various other features and/or components, including, for example, directional speakers to provide audio to a user, bone conduction transducers for providing sound signals to a user via vibrational bone conduction in an auditory region of the user's head, tracking and/or recording cameras, passive and/or active front and/or rear facing cameras to capture images from the user's environment, eye tracking cameras, ambient light, night vision, and/or thermal imaging sensors, multimode connectivity antennas for wireless communication, audio microphones for capturing sound in the user's environment, lights for illuminating a user's environment, inertial, haptic, environmental, and/or health monitoring sensors, and/or any other suitable components, without limitation.

Conductive elements, such as electrodes, for transmitting and/or receiving body-bound signals via a user's body and/or for sensing facial and/or other bodily gestures of the user may be incorporated into head-mounted-display device 800 at various locations. FIG. 9 illustrates exemplary placements of electrodes for head-mounted-display device 800. In this example, a medial surface 901 of one or both of temples 806 may include electrodes 902 positioned, for example, to rest against or near the temple region of a user's face, against or near the region of a user's head above the user's ear, and/or against or near the region of a user's head behind the user's ear. In some examples, a medial surface 911 of bridge 808 may include electrodes 902 configured to rest on the top and/or sides of a bridge of the user's nose. In at least one example, a medial surface 913 of rims 810 may include electrodes 902 configured to rest against or near the user's cheeks and/or portions of the user's face surrounding the user's eyes. In embodiments where head-mounted-display device 800 has nose pads, some or all of the nose pads may include electrodes for transmitting and/or receiving body-bound signals via a user's body and/or for sensing facial and/or other bodily movements of the user.

In some embodiments, head-mounted-display device 800 may also include electrodes that may be contacted by portions of a user's hand to form, for example, a galvanic pathway between the user's hand and head-mounted-display device 800. For example, head-mounted-display device 800 may include electrodes 904 and 906 on a temple 806, as shown in FIG. 9, and/or on any other suitable portion of head-mounted-display device 800. The user may, for example, simultaneously contact electrodes 904 and 906 with their fingers to form a conductive pathway for purposes of, for example, bodily gesture detection as will be described in greater detail below. In some embodiments, a bodily gesture may be detected when, for example, the user touches electrodes 904 and 906 with an index finger and thumb, thereby shortening a body-bound signal pathway, and a gesture-detection subsystem of a galvanically coupled system (see, e.g., gesture-detection subsystem 104 of system 100 shown in FIG. 1) may detect a gesture made by the arm of the user.

Figure 10:
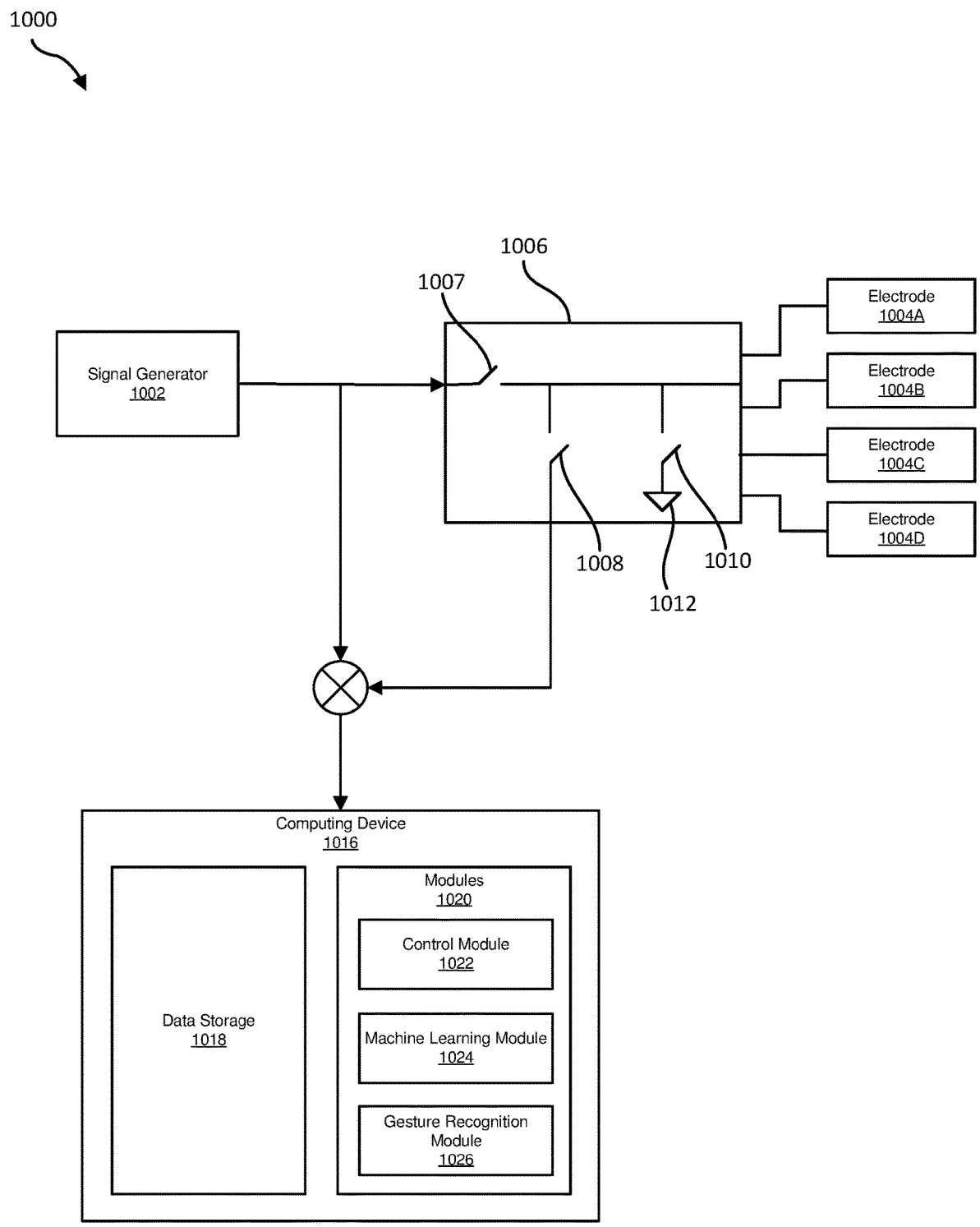
FIG. 10 is a block diagram of an exemplary gesture-detection system in accordance with some embodiments.

FIG. 10 illustrates an exemplary gesture-detection system 1000 for detecting facial expressions and/or other bodily gestures. Gesture-detection system 1000 may be included in at least a portion any of the systems (see, e.g., FIGS. 1 and 2) and/or head-mounted-display devices described herein (see, e.g., FIGS. 5-9, 13, 14, and 16A-17).

As illustrated in FIG. 10, gesture-detection system 1000 may include a signal generator 1002 that generates signals to be transmitted via one or more of electrodes 1004A, 1004B, 1004C, and 1004D. Signal generator 1002 may transmit signals having any suitable frequency and amplitude to configuration circuit 1006 and to mixer 1014. Configuration circuit 1006 may be electrically connected to electrodes 1004A-D and may select various electrodes 1004A-D for use in transmitting and receiving signals. Configuration circuit 1006 may include, for each connection to electrodes 1004A-D, respectively, a transmitter switch 1007, a receiver switch 1008, and a reference switch 1010 electrically connected to a signal common 1012.

In at least one embodiment, electrodes 1004A-D may be alternately utilized as transmitting electrodes, receiving electrodes, and reference electrodes. While four electrodes 1004A-D are shown in FIG. 10, gesture-detection system 1000 may include any suitable number of electrodes, including as few as three electrodes or greater than four electrodes. To utilize an electrode of electrodes 1004A-D as a transmitter electrode, transmitter switch 1007 for the electrode may be closed while receiver switch 1008 and reference switch 1010 are open such that a signal from signal generator 1002 is sent to the electrode. An electrode of electrodes 1004A-D may be utilized as a receiver electrode by closing receiver switch 1008 for the electrode while transmitter switch 1007 and reference switch 1010 are open. Additionally, an electrode of electrodes 1004A-D may be utilized as a reference electrode by closing reference switch 1010 for the electrode while transmitter switch 1007 and receiver switch 1008 are open.

In some embodiments, as few as three electrodes may be utilized at any point in time to obtain a signal measurement using gesture-detection system 1000. For example, one of electrodes 1004A-D may be selected as a transmitter electrode, a second electrode of electrodes 1004A-D may be selected as a receiver electrode, and a third electrode of electrodes 1004A-D may be selected as a reference electrode. In some embodiments, various electrodes and combinations of electrodes 1004A-D may be alternately selected as transmitter electrodes, receiver electrodes, and reference electrodes at different times, allowing for signals to be transmitted and received from various locations on a user's body (e.g., various head and/or facial regions) at different points in time. Additionally or alternatively, signal generator 1002 may apply different frequencies and/or wavelengths at different times. For example, signal generator may apply and receive any suitable number of different frequencies, such as frequencies in a range of from approximately 1 kHz to approximately 150 MHz, via various combinations of electrodes 1004A-D at various time intervals. In at least one example, each of electrodes 1004A-D may be alternately utilized as a transmitter, a receiver, and a reference electrode during different time intervals within a selected window of time.

In at least one example, during a particular time interval, a first one of electrodes 1004A-D (e.g., electrode 1004A) may transmit a signal from signal generator 1002, another of electrodes 1004A-D (e.g., electrode 1004B) may act as a reference electrode, and the remaining electrodes of electrodes 1004A-D (e.g., electrodes 1004C and 1004D) may act as receiving electrodes that receive the signal transmitted by the transmitting electrode. Then, during a subsequent time interval, a second one of electrodes 1004A-D (e.g., electrode 1004B) may transmit a signal from signal generator 1002 and the remaining electrodes of electrodes 1004A-D may each respectively act as either a reference electrode or receiving electrodes. During additional subsequent time intervals, electrodes 1004A-D may continue to alternate as transmitting electrode, reference electrode, and receiving electrodes (e.g., electrode 1004C may act as a transmitting electrode during a third time interval, electrode 1004D may act as a transmitting electrode during a fourth time interval, electrode 1004A may act as a transmitting electrode during a fifth time interval, etc.). Electrodes 1004A-D may alternate as transmitting, reference, and receiving electrodes in any suitable manner and configuration and in any suitable order, without limitation. Accordingly, gesture-detection system 1000 may allow for collection of multiple data points using electrodes 1004A-D (and any other suitable number of electrodes, without limitation), allowing for, for example, multiplexing (e.g., multiplexing in time) of the signals applied and received via electrodes 1004A-D.

According to at least one embodiment, mixer 1014 of gesture-detection system 1000 may receive signals directly from signal generator 1002 and from one or more of electrodes 1004A-D via configuration circuit 1006. Mixer 1014 may, for example, include a gain and phase detector that measures gain/loss and phase of signals transmitted and received via electrodes 1004A-D based on the signals received from electrodes 1004A-D and corresponding generated signals received from signal generator 1002.

Measurement data, including gain and phase data, output from mixer 1014 may be sent to computing device 1016 of gesture-detection system 1000. Computing device 1016 generally represents any type or form of one or more computing devices capable of reading computer-executable instructions. Computing device 1016 or at least a portion of computing device 1016 may be included in a head-mounted-display device as disclosed herein. Additionally or alternatively, at least a portion of computing device 1016 may be external to a disclosed head-mounted-display device. In some embodiments, computing device 1016 may include data storage 1018 for storing measurement data from controller 1016 as well as any other suitable data generated, received, and/or utilized by computing device 1016. In at least one example, computing device 1016 may include one or more modules 1020 for performing one or more tasks. For example, computing device 1016 may include a control module 1022 that controls, via control signals, at least a portion of gesture-detection system 1000, including signal generator 1002, configuration circuit 1006, and/or mixer 1014. For example, control module 1022 may control signal generator 1002, configuration circuit 1006, and mixer 1014 to send and receive signals via selected electrodes 1004A-D at various time periods in a selected manner (e.g., according to a multiplexing strategy).

Computing device 1016 may also include a machine learning module 1024 that performs machine learning based on measurement data received by computing device 1016. For example, machine learning module 1024 may associate measurement data with various facial and/or bodily gestures made by one or more users. In some examples, machine learning module 1024 may be trained, at least initially, for purposes of modeling measurement data based on known gestures made by a user or set of users. In at least one embodiment, a previously generated model may be modified by machine learning module 1024 to cater the modelled machine learning data to a particular user and/or set of users. Machine learning module 1024 may update machine learning data for one or more users periodically or continuously to ensure proper recognition of user gestures and/or to allow for recognition of previously unrecognized gestures.

Additionally, computing device 1016 may include a gesture recognition module 1026 for identifying one or more gestures based on measurement data received by computing device 1016. For example, computing device 1016 may utilize machine learning data from machine learning module 1024 to identify a particular gesture or combination of gestures, including facial and/or other bodily gestures, made by a user based on measurements received from mixer 1014 and corresponding to various electrodes or combinations of electrodes 1004A-D utilized as transmitter, receiver, and reference electrodes during a particular time period.

Gesture-detection system 1000 may use any suitable signal parameters for feature extraction. According to some embodiments, gesture-detection system 1000 may sweep the frequency of a signal over time from a low frequency (e.g., approximately 1 kHz) to a high frequency (e.g., approximately 150 MHz). For example, the frequency may be incrementally raised and/or lowered over time between the low frequency and the high frequency. The swept frequency may be applied to one or more of electrodes 1004A-1004D in any suitable manner as described herein. For example, the swept frequency may be applied to various electrodes 1004A-D (and to any additional electrodes, without limitation) in an alternating manner over a period of time as described above. The computing device 1016 of gesture-detection system 1000 may use the corresponding received signals to determine a frequency response (e.g., via a Fourier transform) of the received signals. The frequency response may be input to gesture detection module 1026 as a characteristic for detecting bodily gestures, such as facial expressions. Such an approach may share similarities with a frequency-modulated continuous-wave (FMCW) approach, which may be used for ranging in radar-based technologies. Machine learning module 1024 and gesture recognition module 1026 of gesture-detection system 1000 may use amplitude change over time, phase shift, round trip propagation delay of the signal, and/or any other suitable parameters as parameters to train gesture recognition module and/or to identify bodily gestures as described herein.

Figure 11:
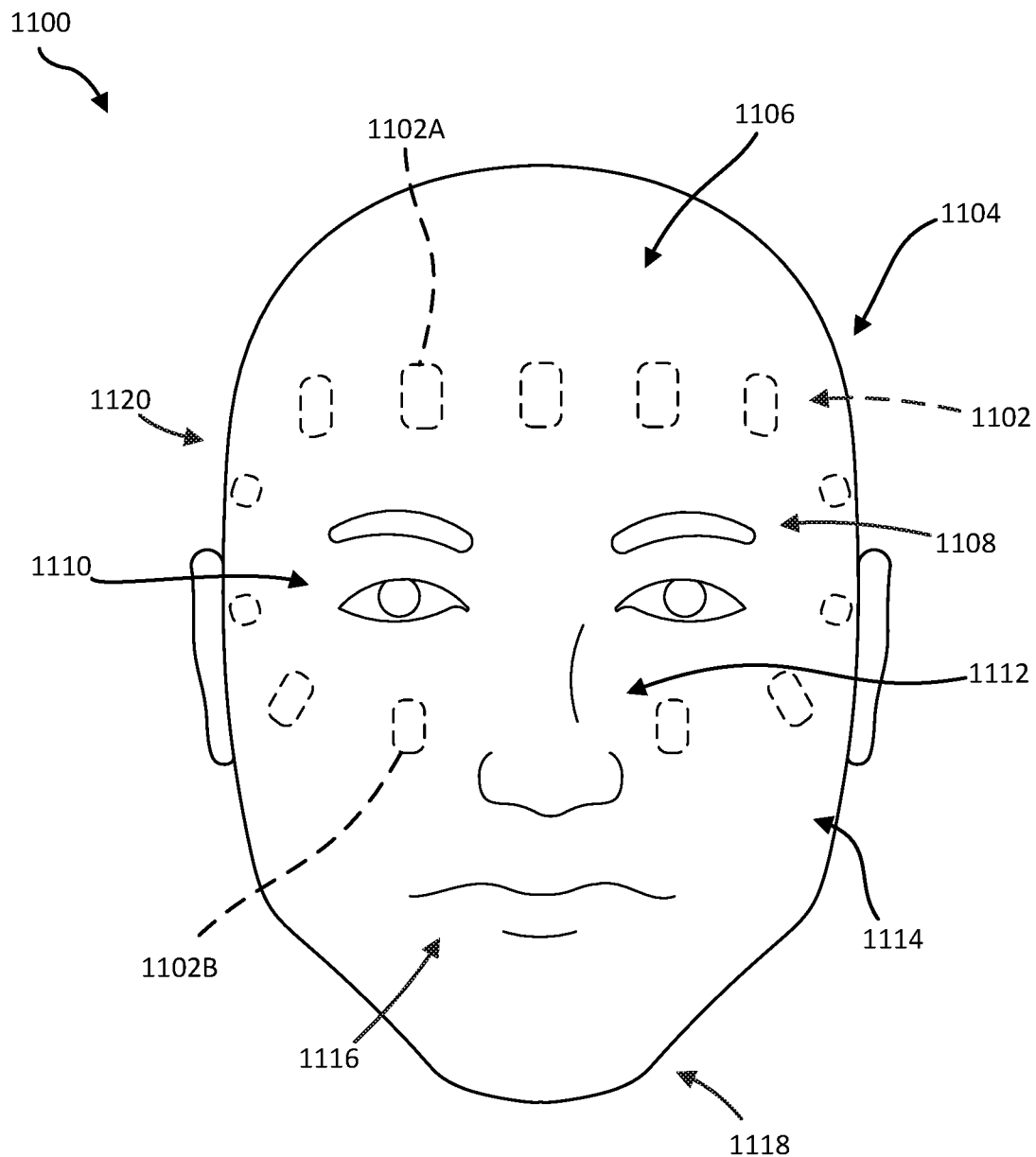
FIG. 11 is a view of a head of a user showing exemplary locations of electrodes of a head-mounted-display device worn by the user in accordance with some embodiments.
Figure 13:
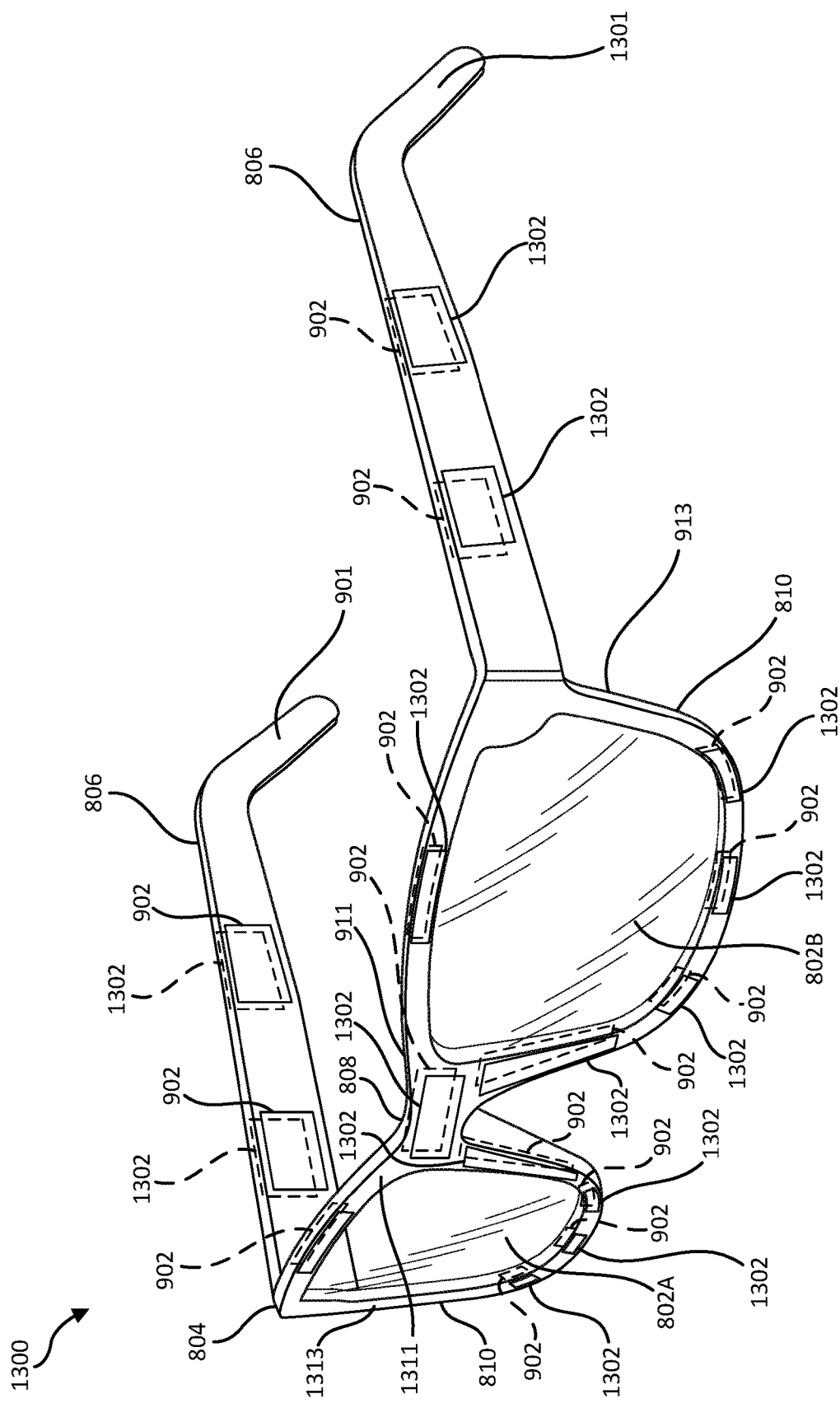
FIG. 13 is a perspective view of another exemplary head-mounted-display device in accordance with some embodiments.

FIG. 11 shows a head 1100 of a user interacting with an exemplary head-mounted-display device, such as head-mounted-display device 600 shown in FIG. 7A (see also head-mounted-display device 700 shown in FIG. 7B, headmounted-display device 800 shown in FIG. 9, and head-mounted-display device 1300 shown in FIG. 13). As shown in this FIG. 11, a head-mounted-display device may be positioned on head 1100 of the user such that electrodes (e.g., electrodes 610 shown in FIG. 7A, electrodes 710 shown in FIG. 7B, or electrodes 902 shown in FIGS. 9 and 13) of the head-mounted-display device abut various contact regions 1102 of the user's face 1104. For reference, an exemplary contact region 1102A corresponding to electrode 610A of head-mounted-display device 600 and an exemplary contact region 1102B corresponding to electrode 610B of head-mounted-display device 600 are illustrated.

Electrodes 610 of head-mounted-display device 600 may be utilized, as part of an interactive system (e.g., systems 100, 200, 1000, 1800, and/or 1900 shown in FIGS. 1, 2, 10, 18, and 19, respectively) to detect gestures in any suitable regions of head 1100 of the user, including facial gestures in various portions of face 1104 of the user. For example, electrodes 610 may be utilized by a gesture-detection system (e.g., gesture-detection subsystem 104 or 204 shown in FIGS. 1 and 2 or gesture-detection system 1000 shown in FIG. 10) to detect facial and/or head gestures in and/or near one or more regions of head 1100 of the user, including forehead region 1106, brow region 1108, eye region 1110, nasal region 1112, cheek region 1114, mouth region 1116, chin region 1118, temple region 1120, and/or any other suitable region.

In some embodiments, body-bound signals may be applied to and/or received from various contact regions 1102 of the user's face 1104 via one or more electrodes 610 of head-mounted-display device 600. For example, body-bound signals may be applied by head-mounted-displayed device 600 to one or more contact regions 1102 of face 1104 of the user via one or more electrodes 610. The applied body-bound signals may pass through head 1100 of the user, including at least a portion of face 1104, and/or through other portions of a user's body and may be received by head-mounted-display device 600 at one or more other contact regions 1102 of face 1104 of the user via one or more other electrodes 610. As the body-bound signals pass through the user's head 1100 and/or through other portions of the user's body, the body-bound signals may be attenuated due to various dielectric properties of the user's head 1100 and/or body such that the magnitudes of the received signals are decreased in comparison to the transmitted signals and/or such that the phases of the received signals are shifted in comparison to the transmitted signals.

In some examples, an amount of body-bound signal attenuation may be affected by positions and/or movements of various portions of face 1104, head 1100, and/or the neck region of the user. Accordingly, received body-bound signals may be evaluated and correlated to various facial gestures, (e.g., facial expressions, combinations of facial expressions, and/or other facial positions) of the user. For example, facial positions corresponding to various facial gestures may correlate to relatively longer or shorter path lengths for body-bound signals passing through the user's body, resulting in greater or lesser amounts of attenuation of the body-bound signals. For example, a path length of body-bound signals transmitted between one or more electrodes 610 applying the body-bound signals to face 1104 of the user and one or more electrodes 610 subsequently receiving the body-bound signals from face 1104 may be decreased when the user closes an eye (e.g., to make a winking gesture) in comparison to a state in which the user's eye is open. The decreased path length may result in less attenuation in the body-bound signals between electrodes 610 applying and receiving the body-bound signals. Accordingly, in this example, measured strengths (e.g., measured in decibels (dB) units) of the received signals may be greater and/or amounts of phase shift of the received signals may be less when the user's eye is closed than with the user's eye is open. Additionally or alternatively, a path length between one or more electrodes 610 applying body-bound signals to face 1104 of the user and one or more electrodes 610 subsequently receiving the body-bound signals from face 1104 may be increased when the user raises an eyebrow in comparison to a state in which the user's eyebrow is not raised. The increased path length may result in less attenuation in the body-bound signals between electrodes 610 applying and receiving the body-bound signals. Thus, measured strengths of the received signals may be less and/or amounts of phase shift of the received signals may be greater when the user's eyebrow is raised than when the user's eyebrow is not raised.

Characteristics of received body-bound signals may be correlated to user gestures, such as facial gestures and/or other bodily gestures, in any suitable manner. For example, observations of received body-bound signals may be correlated to user gestures using, for example, machine learning (e.g., supervised or unsupervised learning), computational statistics, and/or any other suitable analytical methodology. In some embodiments, a gesture-detection subsystem (e.g., gesture-detection subsystem 104 and/or 204 shown in FIGS. 1 and 2 and/or gesture-detection system 1000 shown in FIG. 10) may utilize a machine-learning model that uses measured body-bound signals having one or more frequencies that have been transmitted and/or received by various electrodes 610 and/or combinations of electrodes 610. Amplitudes, phase-shifts, propagation delay, and/or any other suitable characteristics of such body-bound signals may be correlated through such a methodology to various user gestures and/or combinations of gestures. Such a model may be specific to a particular user and/or may be more generally applied to multiple users. In some examples, the gesture-detection subsystem may be configured to identify various bodily gestures based on a comparison between at least one characteristic of one or more received body-bound signals and at least one predetermined signal characteristic. For example, threshold signal magnitudes and/or phase shift amounts may be utilized to determine whether one or more received body-bound signals are indicative of a user gesture, such as a facial expression. In at least one example, at least one predetermined signal characteristic, such as a signal threshold value, may be based on at least one characteristic of one or more body-bound signals received during at least one of a time period during which a user is making a bodily gesture and a time period during which the user is not making a bodily gesture (e.g., during training of a machine-learning model or other model).

Figure 12A:
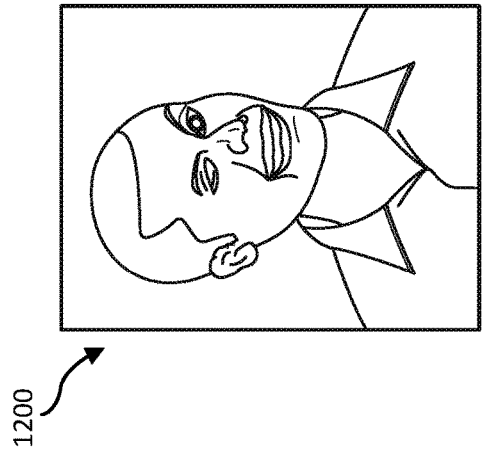
FIGS. 12A-12O are front views of exemplary facial expressions that are detectable by a gesture-detection system in accordance with some embodiments.
Figure 12B:
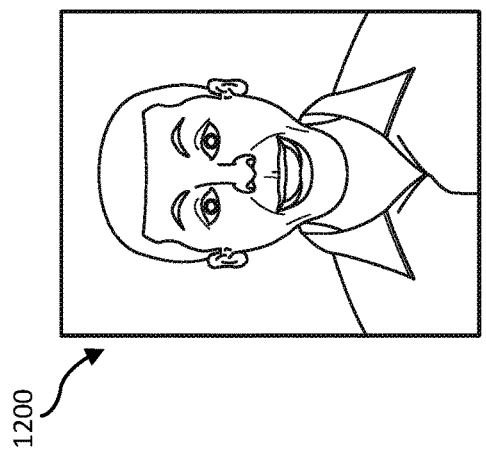
Figure 12C:
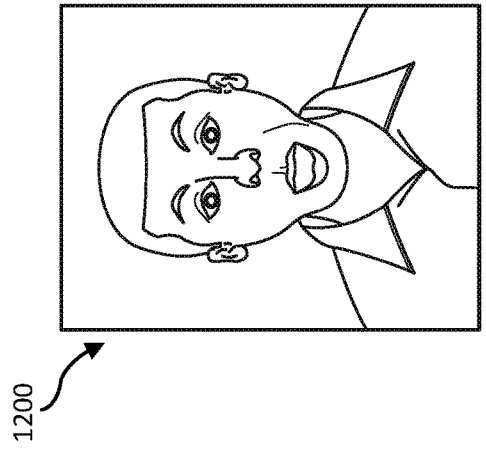
Figure 12D:
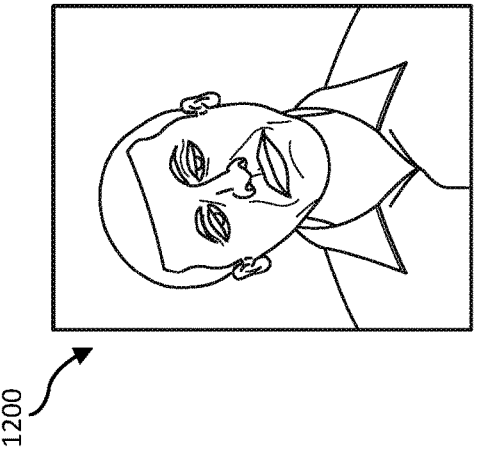
Figure 12E:
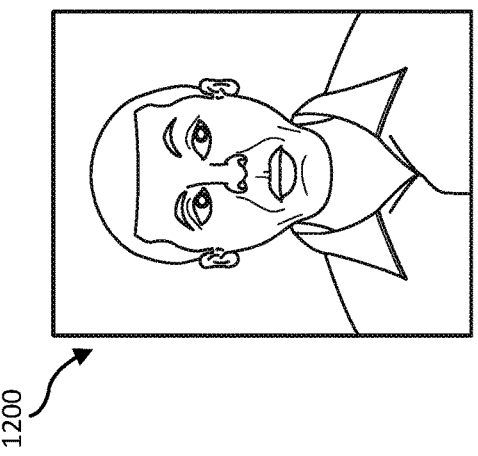
Figure 12F:
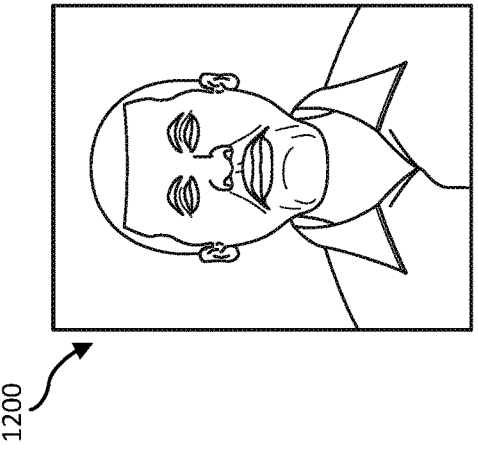
Figure 12I:
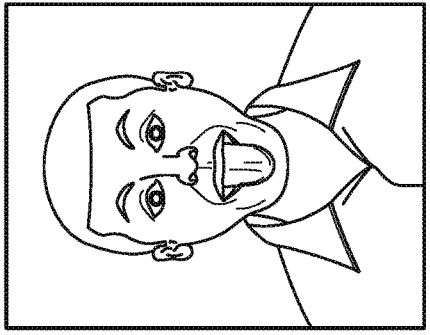
Figure 12L:
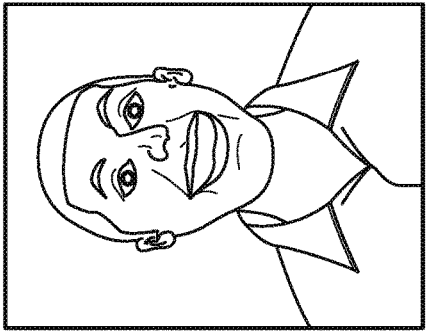
Figure 12H:
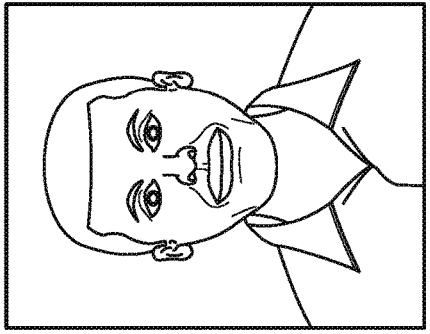
Figure 12K:
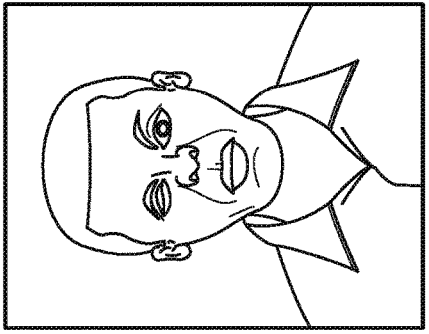
Figure 12G:
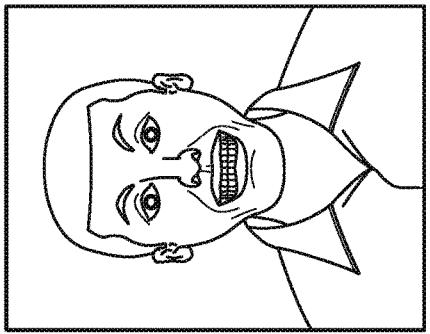
Figure 12J:
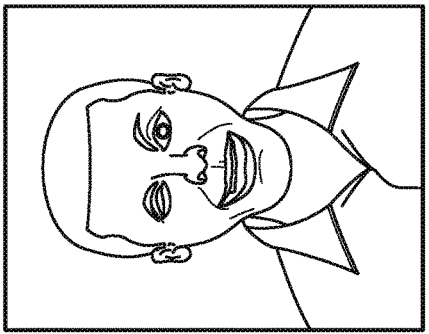
Figure 12O:
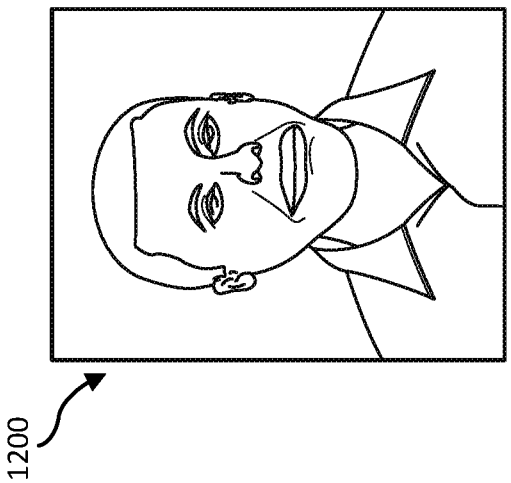

FIGS. 12A-12O illustrate examples of various facial expressions that may be detected by the disclosed systems. Such facial expressions may be, for example, detected using a head-mounted-display device (see, e.g., FIGS. 1-10 and 13) having an array of electrodes positioned abutting various regions of a user's face and/or other portions of the user's head (see, e.g., FIG. 11) using any of the techniques described herein. Such electrodes may be galvanically and/or capacitively coupled to the user as disclosed herein. While a head-mounted-display device is not illustrated on the head of user 1200 shown in FIGS. 12A-12O for ease in illustrating and visualizing the exemplary expressions, such expressions may be detected by a head-mounted-display device while the head-mounted-display device is worn on the user's head in the manner illustrated in, for example, in FIGS. 3 and 4 with electrodes of the head-mounted-display device abutting the user's head as shown, for example, in FIG. 11. While FIGS. 12A-12O show a number of exemplary facial expressions that may be detected by a gesture-detection system (e.g., gesture-detection subsystem 104 and/or 204 shown in FIGS. 1 and 2 and/or gesture-detection system 1000 shown in FIG. 10) in conjunction with a head-mounted-display device, a gesture-detection system may be configured to additionally or alternatively detect any other suitable facial expressions, without limitation.

As discussed above in relation to FIG. 11, a disclosed gesture-detection system may detect position and/or movement in various regions of the user's face, head, and/or regions near the user's head (e.g., a neck region). As illustrated in FIG. 12A, the gesture-detection system may detect user 1200 closing one eye in a winking gesture. Additionally or alternatively, the gesture-detection system may detect user 1200 tilting their head and/or raising one cheek and/or one corner of their mouth as shown in FIG. 12A. As illustrated in FIG. 12B, the gesture-detection system may detect user 1200 raising their eyebrows and/or smiling with corners of the mouth and cheeks raised, either with an open mouth, as shown, or with a closed mouth.

As illustrated in FIG. 12C, the gesture-detection system may detect user 1200 raising their eyebrows and opening their mouth in, for example, an expression of surprise. As illustrated in FIG. 12D, the gesture-detection system may detect user 1200 lowering their eyebrows, eyes, cheeks and/or corners of the mouth in, for example, an expression of sadness or dismay. Additionally or alternatively, the gesture-detection system may detect user 1200 tilting their head as shown in FIG. 12D. As illustrated in FIG. 12E, the gesture-detection system may detect user 1200 raising one eyebrow in, for example, an expression of curiosity or surprise. Additionally or alternatively, the gesture-detection system may detect user 1200 moving their eyes to look in a sideward direction. As illustrated in FIG. 12F, the gesture-detection system may detect user 1200 closing their eyes and/or lowering their cheeks and/or the corners of their mouth in an expression of, for example, disgust. Additionally or alternatively, the gesture-detection system may detect user 1200 tilting their head backward as shown in FIG. 12F.

As illustrated in FIG. 12G, the gesture-detection system may detect user 1200 raising their eyebrows and/or opening their mouth with closed teeth, with their cheeks and/or the corners of their mouth raised, in an expression of, for example, excitement or surprise. As illustrated in FIG. 12H, the gesture-detection system may detect user 1200 with their mouth closed in, for example, a generally neutral expression. As illustrated in FIG. 12I, the gesture-detection system may detect user 1200 making, for example, a humorous expression by sticking out their tongue and/or raising their eyebrows. As illustrated in FIG. 12J, the gesture-detection system may detect user 1200 closing one eye, raising one eyebrow, raising one cheek, and/or raising one corner of their mouth as shown in FIG. 12J. As illustrated in FIG. 12K, the gesture-detection system may detect user 1200 closing one eye and raising one eyebrow while their mouth is closed and generally neutral.

Figure 12N:
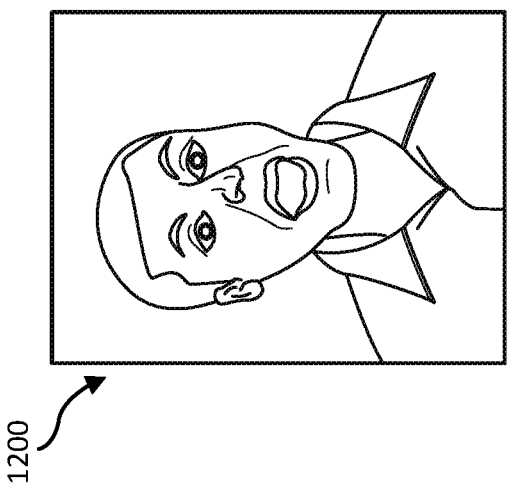
Figure 12M:
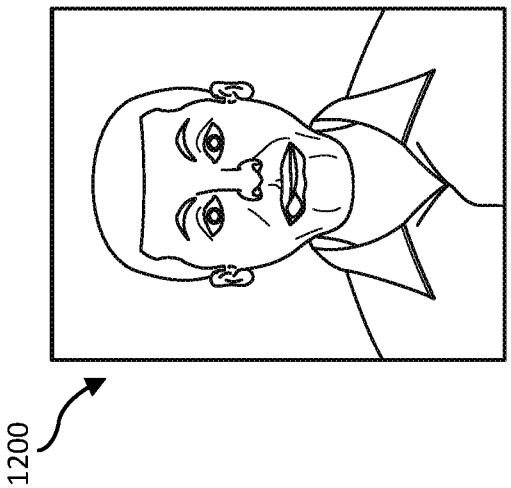

As illustrated in FIG. 12L, the gesture-detection system may detect user 1200 with their mouth open in a wide smile, with their cheeks, the corners of their mouth, and/or their eyebrows raised in, for example, an excited expression. Additionally or alternatively, the gesture-detection system may detect user 1200 tilting their head backward and to the side as shown in FIG. 12L. As illustrated in FIG. 12M, the gesture-detection system may detect user 1200 raising their eyebrows and/or sticking out their tongue slightly from a side of their mouth. As illustrated in FIG. 12N, the gesture-detection system may detect user 1200 raising their eyebrows and/or opening their mouth in, for example, an expression of shock or surprise. Additionally or alternatively, the gesture-detection system may detect user tilting their head backward and to the side as shown in FIG. 12N. As illustrated in FIG. 12O, the gesture-detection system may detect user 1200 partially closing their eyes with their lips closed in, for example, a tired or frustrated expression.

In some embodiments, bodily gestures, such as facial expressions shown in FIGS. 12A-12O and or any other suitable facial expressions, may be identified by a gesture-detection system (e.g., gesture-detection subsystem 104 and/or 204 shown in FIGS. 1 and 2 and/or gesture-detection system 1000 shown in FIG. 10) and used as input for performing one or more functions. According to at least one embodiment, facial expressions detected by one or more of the systems and/or configurations disclosed herein may be utilized to facilitate interaction between a user and at least one electronic device. For example, a user may make a facial expression to interact with at least one visual, audio, and/or haptic element presented to the user by a head-mounted-display device (e.g., head-mounted-display device 500 shown in FIGS. 5 and 6, head-mounted-display device 800 shown in FIG. 9, head-mounted-display device 1300 shown in FIG. 13, or any other head-mounted-display device shown and/or described herein). For example, a user may make a facial gesture indicating a selection and/or other interaction with a displayed image element visible to the user via a display region of a head-mounted-display device. The gesture-detection subsystem may detect the facial gesture and may send a signal indicating the selection and/or other interaction to the head-mounted-display device and/or to an external device other than the head-mounted-display device. In at least one example, the head-mounted-display device may modify visual, audio, and/or haptic elements presented to the user in response to the signal indicating the selection and/or other interaction. For example, the head-mounted-display device of the head-mounted-display device may include a display controller that modifies images displayed in a display region of the head-mounted-display device in response to the signal indicating the selection and/or other interaction.

In some embodiments, bodily gestures, such as facial expressions shown in FIGS. 12A-12O and/or any other suitable facial expressions, detected by one or more of the systems and/or configurations disclosed herein may be utilized to facilitate interaction between a user and at least one other user. For example, a user may make a facial expression that is detected and utilized for driving a visual representation of the user, such as an avatar, for purposes of interaction with other users. For example, the facial and/or other bodily gesture made by the user may be detected by the gesture-detection subsystem, which may send data indicating a change in the visual representation of the user to the head-mounted-display device and/or to an external device other than the head-mounted-display device. The data indicating the change in the visual representation of the user may be utilized by the head-mounted-display device and/or the external device to change the appearance of the visual representation of the user. For example, an avatar of the user may be modified to visually represent a facial expression corresponding to a detected facial gesture made by the user. Such a visual representation of the user may, for example, be visible to the user via a display region of the head-mounted-display device and/or may be visible to one or more other remote users via at least one display device visible to the other or more other remote users, thereby facilitating interaction between the user and the one or more other remote users.

FIG. 13 is a diagram of a head-mounted-display device 1300 according to some embodiments. The depicted embodiment includes near-eye displays 802, a frame 804, temples 806, a bridge 808, and rims 810 (see FIGS. 8 and 9). Conductive elements, such as electrodes, for capacitively transmitting and/or receiving signals for sensing bodily gestures of a user may be incorporated into head-mounted-display device 1300 at various locations. FIG. 13 illustrates exemplary placements of electrodes for head-mounted-display device 1300. In this example, medial surfaces 901, 911, and 913 may include electrodes 902 positioned, for example, to rest against or near various regions of a user's head (see FIG. 9).

Additionally, in at least one embodiment, head-mounted-display device 1300 may include electrodes 1302 disposed on lateral surfaces at locations near electrodes 902. Electrodes 1302 may each be capacitively coupled with a corresponding electrode 902. Additionally, each of electrodes 1302 may be oriented such that they are exposed to the environment surrounding the user without contacting the user's head. For example, lateral surfaces 1301 of temples 806, a lateral surface 1311 of bridge 808, and lateral surfaces 1313 of rims 810 of head-mounted-display device 1300 may include electrodes 1302 disposed at locations corresponding to some or all of electrodes 902 included in adjacent medial surfaces of head-mounted-display device 1300. In some embodiments, head-mounted-display device 1300 may also include one or more electrodes that may be touched with a portion of a user's hand, such as the user's finger (see, e.g., electrodes 904 and 906 in FIG. 9).

Figure 14:
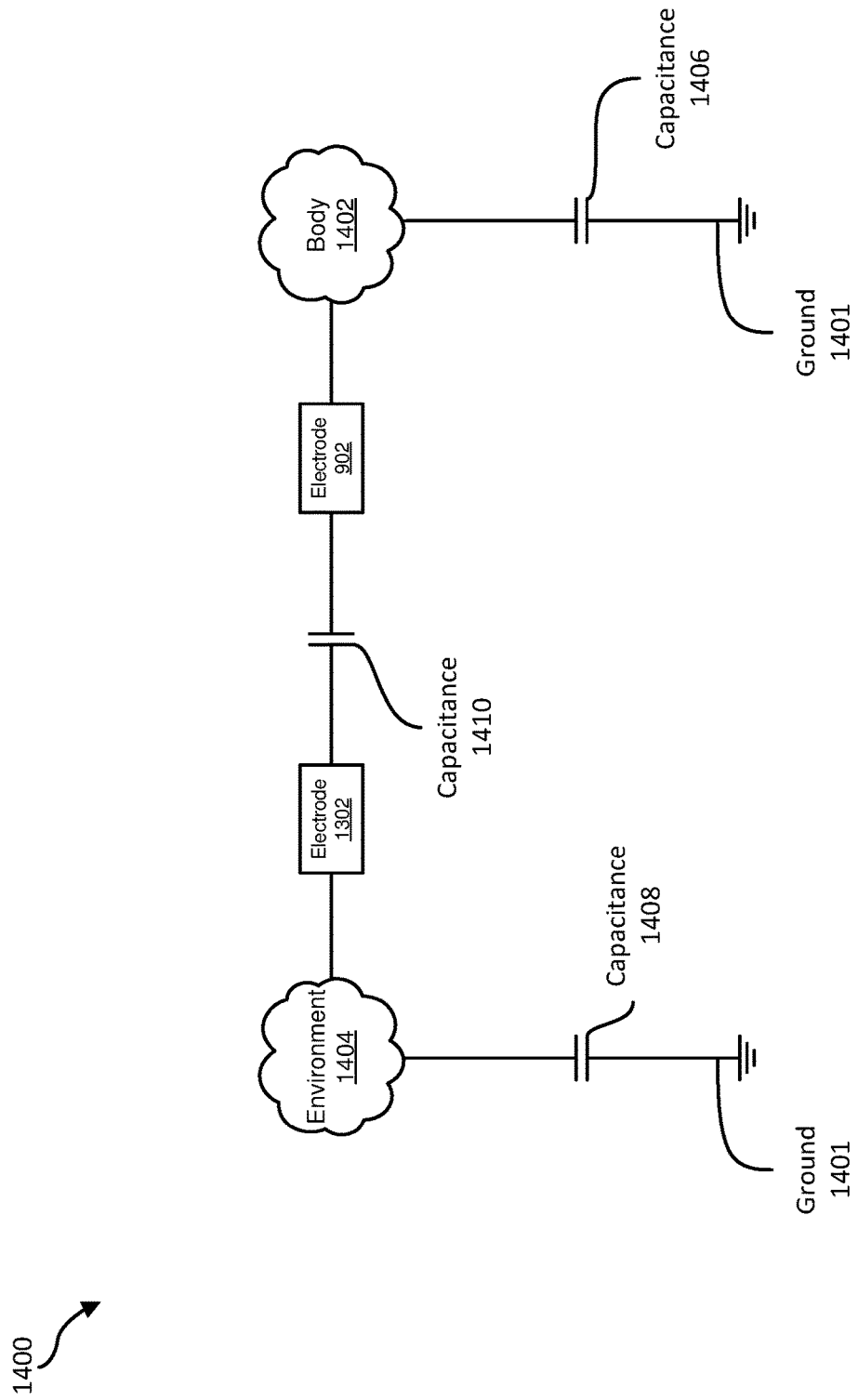
FIG. 14 is a model diagram of the head-mounted-display device illustrated in FIG. 13 in accordance with some embodiments.

FIG. 14 illustrates an exemplary approximated model 1400 of some of the interactions of pairs of capacitively coupled electrodes 902 and 1302 of head-mounted-display device 1300 in FIG. 13, a body 1402 of a user, an environment 1404 of the user, and ground 1401. As illustrated in FIG. 14, a capacitance 1406 may represent a capacitance between an electrode 902 and ground 1401, and a capacitance 1408 may represent a capacitance between an electrode 1302 and ground 1401. Additionally, a capacitance 1410 may represent a capacitance between electrode 1302 and electrode 902, which is in contact with body 1402.

Returning to FIG. 13, head-mounted-display device 1300 may be utilized in any suitable manner to detect bodily gestures, including facial and/or limb gestures, made by a user wearing head-mounted-display device 1300. In at least one example, electrodes 902 located at medial surfaces of head-mounted-display device 1300 may contact various surface portions of a user's face and/or other portions of a user's head (see, e.g., FIG. 11), providing capacitance between electrodes 902 and ground via the user's body as shown in FIGS. 2 and 14. Additionally, electrodes 1302 located at lateral surfaces of head-mounted-display device 1300 may each be capacitively coupled with corresponding electrodes 902 and may be exposed to the user's environment without contacting the user's head, providing capacitance between electrodes 1302 and ground via the environment surrounding the user as shown in FIGS. 2 and 14.

Head-mounted-display device 1300 may include a gesture-detection system and/or at least a portion of gesture-detection system, such as gesture-detection system 1000 shown in FIG. 10. Signals from a signal generator (e.g., signal generator 1002 of FIG. 10) may be transmitted via one or more pairs of electrodes, such as pairs of corresponding capacitively-coupled electrodes 902 and 1302 of head-mounted-display device 1300. Signals may be transmitted and received according to any of the scenarios described above in reference to gesture-detection system 1000 of FIG. 10 (see also, FIGS. 1-9 and 11-12O). For example, the gesture-detection system may sweep a frequency of signals applied to pairs of electrodes 902 and 1302 over time from a low frequency (e.g., approximately 1 kHz) to a high-frequency (e.g., approximately 150 MHz) to training a machine learning model and/or to detect bodily gestures, such as facial expressions. Various combinations of pairs of capacitively-coupled electrodes 902 and 1302 may be selected as transmitting electrodes and receiving electrodes at different time intervals, allowing for multiplexing in time as described above in reference to FIG. 10. The gesture-detection system may utilize various parameters for machine learning and/or gesture detection, including amplitude change overtime, phase shift, round trip propagation delay of the signal, and/or any other suitable parameters. Such techniques may be utilized by a user wearing head-mounted-display device 1300 (see, e.g., FIG. 4) to detect various facial gestures, such as facial expressions 12A-12O and/or any other suitable facial expressions.

In some embodiments, head-mounted-display device 1300 may additionally or alternatively be utilized, using the above-described methodologies, to detect various other bodily gestures. For example, by using capacitive coupling of head-mounted-display device 1300 between the electrodes 902 and 1302 and ground via the user's body and the user's environment, various bodily gestures, such as arm, hand, head, neck, shoulder, and/or torso gestures may be detected based on signal differences, such as signal attenuation, between transmitted and received signals that have been transmitted and received by separate capacitively-coupled pairs of electrodes 902 and 1302.

In at least one embodiment, head-mounted-display device 1300 may utilize phased array electric field (EF) sensing to detect various bodily gestures. For purposes of phased array EF sensing, each of the capacitively-coupled pairs of electrodes 902 and 1302 may act as a separate passive sensor of head-mounted-display device 1300. Rather than transmitting a signal between pairs of electrodes 902 and 1302 (with the signal receiving electrodes 902 and 1302 acting as active sensors as described above), each pair of electrodes 902 and 1302 may instead passively detect changes in voltage, which may be then be associated with user gestures. Such an approach may use a minimal amount of power for purposes of detecting user gestures. A gesture-detection system utilizing head-mounted-display device 1300 in phased array EF sensing may rely on an existing static electric field between the user's body and the environment. For each capacitively-coupled pair of electrodes 902 and 1302, the gesture-detection subsystem may measure a voltage across a capacitance between electrode 902 and 1302 (see, e.g., capacitance 1410 in FIG. 14). A small bias current may be supplied to each capacitively-coupled pair of electrodes 902 and 1302 to establish a static electric field across each pair of electrodes 902 in 1302.

Changes in the user's body and/or in the user's environment may produce changes in voltage across one or more capacitively-coupled pairs of electrodes 902 and 1302 due to, for example, changes in coupling between the user's body and the environment or ground. With an array of capacitively-coupled pairs of electrodes 902 and 1302 each acting as sensors, various detected changes in voltages across one or more of the pairs of electrodes 902 and 1302 may be correlated to different bodily gestures made by user.

Phased array EF sensing using capacitively-coupled pairs of electrodes 902 and 1302 distributed at various locations of head-mounted-display device 1300 in X, Y, and Z planes may be capable of detecting a variety of bodily gestures, including relatively complex user gestures, in any suitable portion of the user's body.

In some embodiments, head-mounted-display device 1300 may utilize radio-reflectometry sensing to detect interactions of a user with one or more passive objects (e.g., toys, clothes, electronic devices, etc.) in the user's environment. For example, one or more electrodes of head-mounted-display device 1300, such as electrodes 1302, may be utilized to transmit signals at one or more frequencies. Additionally, one or more additional electrodes of head-mounted-display device 1300, such as electrodes 1302, may be utilized as receiving electrodes to the transmitted signals reflected from one or more objects in the user's vicinity. Characteristics of the received signals may be analyzed by a gesture-detection system according to any of the methodologies described herein to identify interactions of the user with the one or more objects (see, e.g., FIG. 15L).

FIGS. 15A-15L illustrate examples of various bodily gestures, movements, and/or positions that may be detected by the disclosed systems. Such bodily gestures may be, for example, detected using a head-mounted-display device (see, e.g., FIGS. 3-11 and 13) having an array of electrodes positioned abutting various regions of a user's face and/or other portions of the user's head (see, e.g., FIG. 11) using any of the techniques described herein. Such electrodes may be galvanically and/or capacitively coupled to the user as disclosed herein. In some embodiments, a phased array may be utilized as described above to detect relatively complicated bodily gestures and/or movements.

As shown in FIGS. 15A-15K, a gesture-detection system of head-mounted-display device 1502 may detect various bodily gestures made by a user 1500 wearing head-mounted-display device 1502. For example, the gesture-detection system may detect positions and/or movements in the user's head 1504, arms 1506, torso 1508, and/or any other suitable portion of the body of user 1500. While FIGS. 15A-15K show a number of exemplary bodily gestures, positions, and/or movements that may be detected by a gesture-detection system (e.g., gesture-detection subsystem 104 and/or 204 shown in FIGS. 1 and 2 and/or gesture-detection system 1000 shown in FIG. 10) in conjunction with head-mounted-display device 1502 (see, e.g., FIGS. 5-10, 13, and 14), the gesture-detection system may be configured to additionally or alternatively detect any other suitable bodily gestures, positions, and/or movements, without limitation.

Figure 15A:
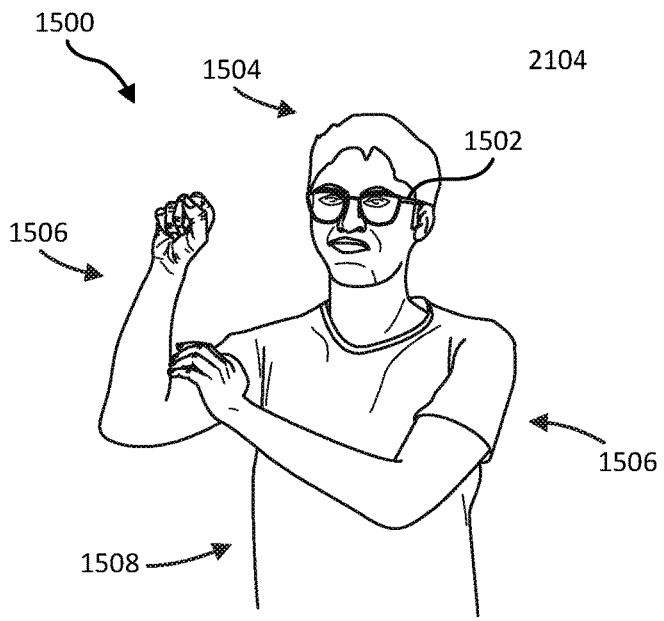
FIGS. 15A-15L are front views of exemplary bodily gestures, movements, and positions that are detectable by a gesture-detection system in accordance with some embodiments.
Figure 15B:
Figure 15C:

As illustrated in FIG. 15A, the gesture-detection system may detect user 1500 raising a forearm of an arm 1506 with a closed fist. Additionally or alternatively, the gesture-detection system may detect user 1500 positioning the opposite arm 1506 across their chest. As illustrated in FIG. 15B, the gesture-detection system may detect user 1500 placing a hand of an arm 1506 on a portion of their head 1504. Additionally or alternatively, the gesture-detection system may detect user 1500 positioning the opposite arm 1506 across the midsection of their torso 1508. As illustrated in FIG. 15C, the gesture-detection system may detect user 1500 with an arm 1506 lowered and forearm raised. Additionally or alternatively the gesture-detection system may detect user 1500 positioning opposite arm 1506 across the midsection of their torso 1508.

Figure 15D:
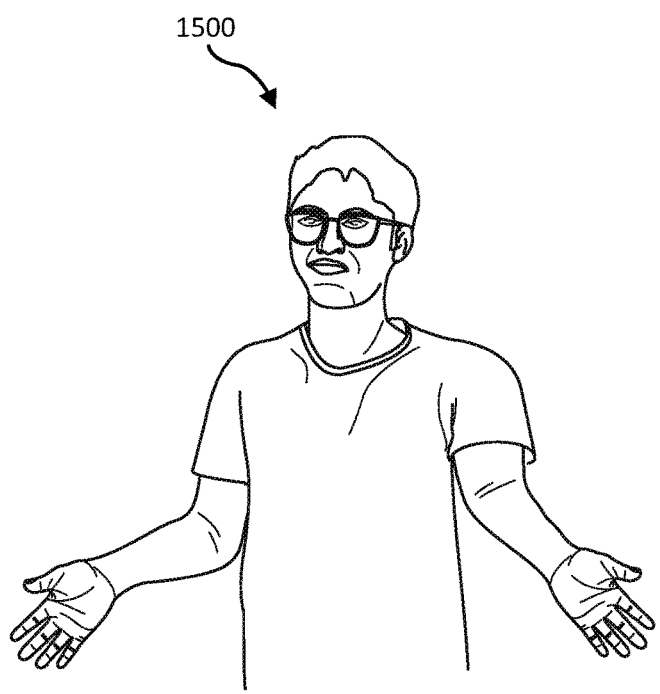
Figure 15E:
Figure 15F:
Figure 15G:
Figure 15H:

As illustrated in FIG. 15D, the gesture-detection system may detect user 1500 with both arms 1506 lowered and directed outward with the fingers splayed. As illustrated in FIG. 15E, the gesture-detection system may detect user 1500 positioning hands of both arms 1506 together in front of the user's chest in, for example, a supplication gesture. As illustrated in FIG. 15F, the gesture-detection system may detect user 1500 with both arms 1506 crossed in front of the user's chest. As illustrated in FIG. 15G, the gesture-detection system may detect user 1500 with hand of both arms 1506 brought together in, for example, a time-out gesture. As illustrated in FIG. 15H, the gesture-detection system may detect user 1500 crossing both arms 1506 in, for example, a gesture indicating an end or stop.

Figure 15K:
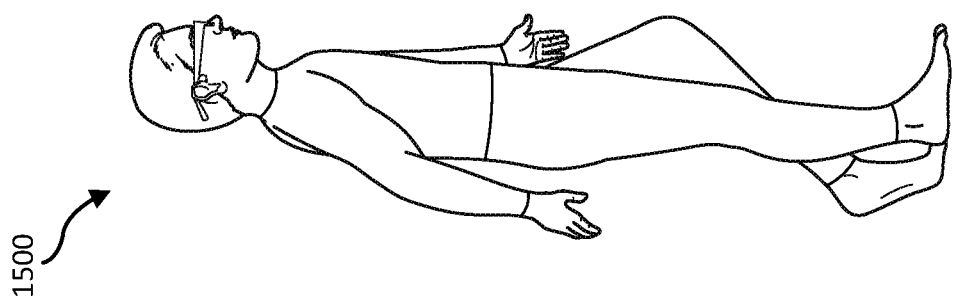
Figure 15J:
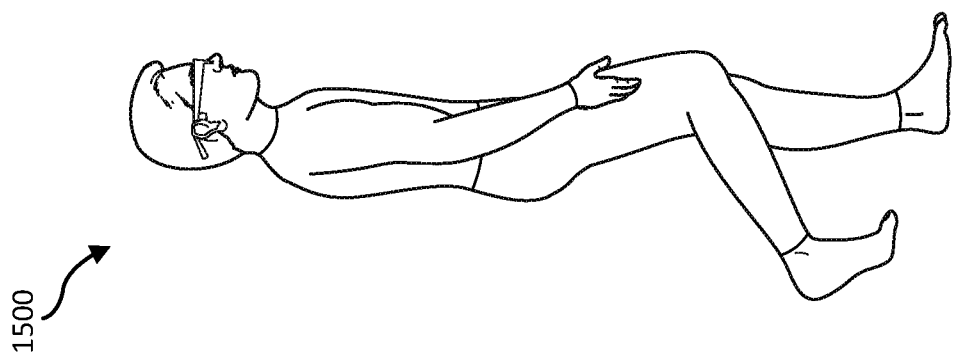
Figure 15I:
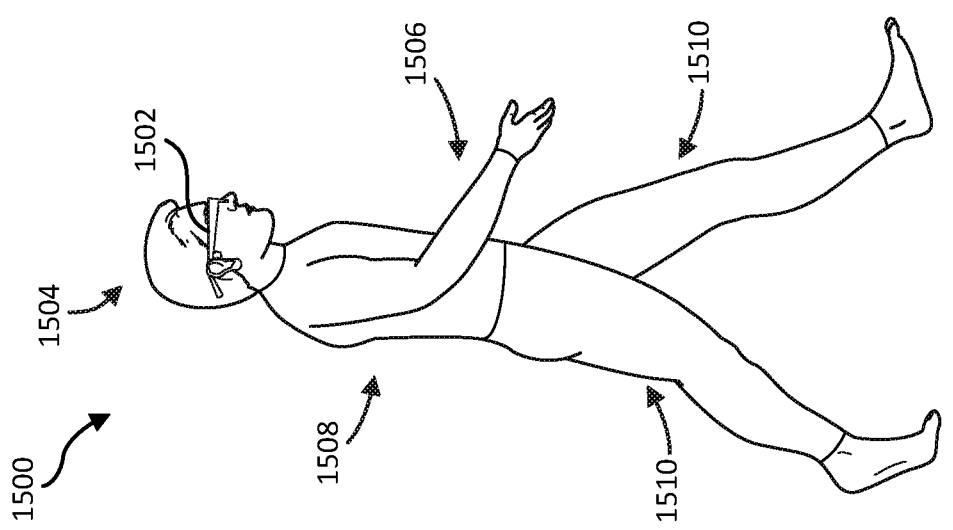

FIGS. 15I-15K illustrate movements and/or positions of the body of user 1500, including leg 1510 movements, that may be detected by the gesture-detection system. For example, the gesture-detection system may detect a user moving their arms 1506, torso 1508, and legs 1510 while walking and/or mimicking walking movements. Additionally or alternatively, the gesture-detection system may detect any other suitable positions and/or movements of legs 1510 of user 1500.

Figure 15L:
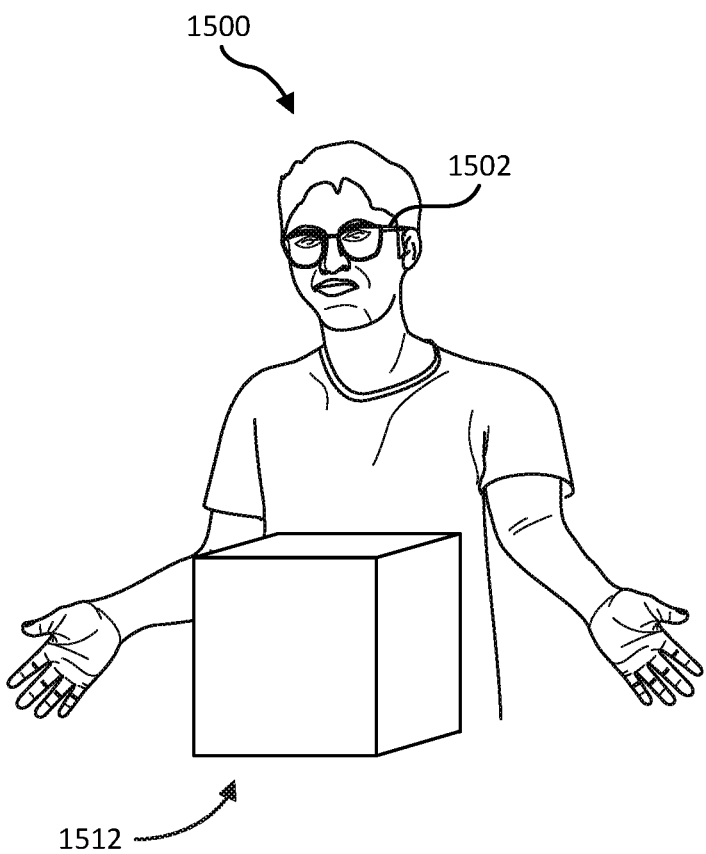

FIG. 15L illustrates a user interacting with a passive object 1512 according to some embodiments. As shown in this figure, object 1512 may be positioned in front of user 1500. Head-mounted-display device 1502 on the user's head may utilize radio-reflectometry sensing to detect interactions of user 1500 with object 1512 as described herein. For example, signals transmitted from one or more electrodes of head-mounted-display device 1502 may be reflected from one or more surfaces of object 1512. The reflected signals may be received by one or more additional electrodes of head-mounted-display device 1502 and may be used to identify interactions between user 1500 and object 1512. For example, the gesture-detection system may detect a proximity of at least a portion of the user and/or head-mounted-display device 1502 to object 1512 and/or may detect manipulation of object 1512 (e.g., movement, lifting, rotation, etc.) by user 1500.

In some embodiments, bodily gestures, movements, and/or positions, such as those shown in FIGS. 15A-15L, may be identified by a gesture-detection system (e.g., gesture-detection subsystem 104 and/or 204 shown in FIGS. 1 and 2 and/or gesture-detection system 1000 shown in FIG. 10) and used as input for performing one or more functions. In some embodiments, such bodily gestures, movements, and/or positions detected by one or more of the systems and/or configurations disclosed herein may be utilized to facilitate interaction between a user and at least one electronic device and/or to facilitate interaction between a user and at least one other user as described herein.

Figure 16A:
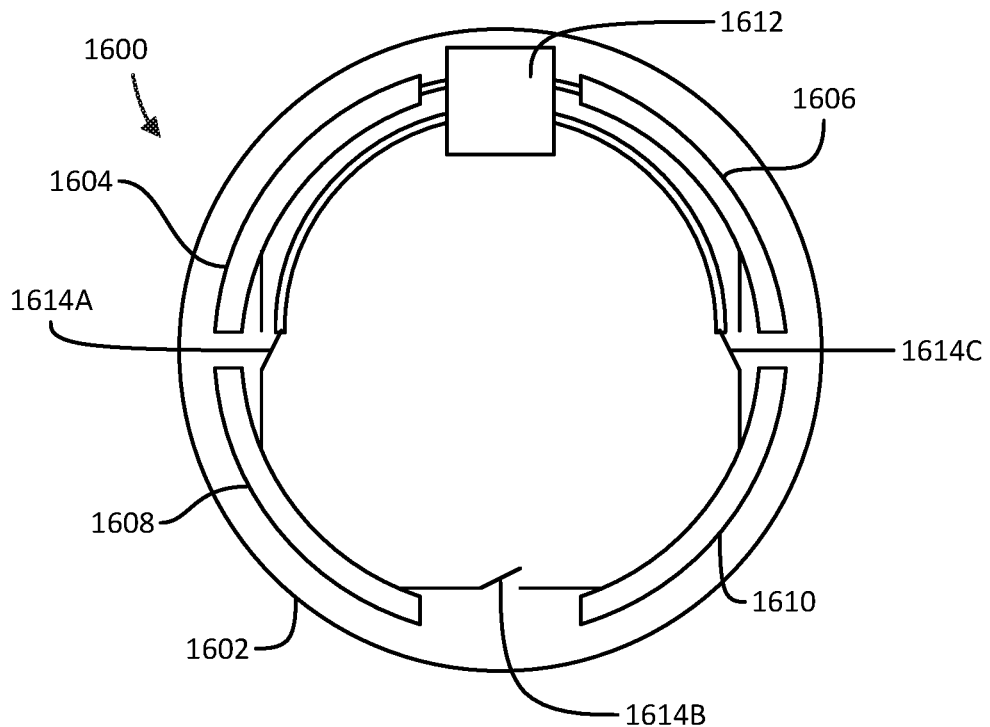
FIGS. 16A and 16B are front and cross-sectional views of an exemplary smart contact lens in accordance with some embodiments.
Figure 16B:
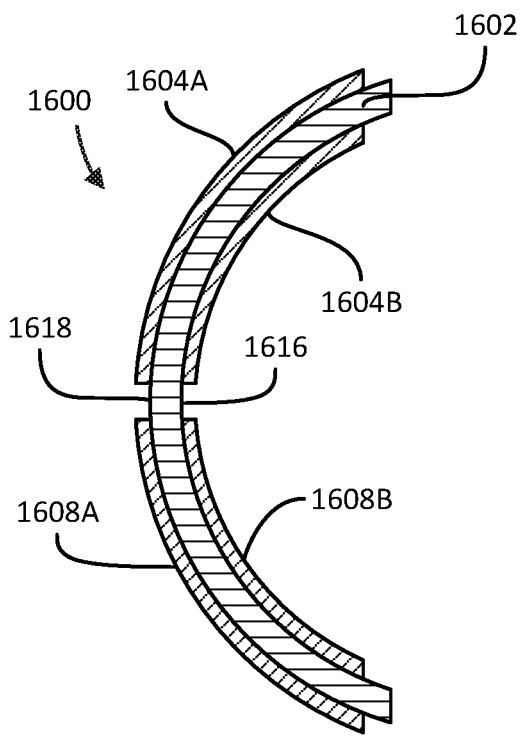

FIGS. 16A and 16B are a front and a cross-sectional view, respectively, of a smart contact lens 1600 (e.g., for correcting a user's vision, displaying images to the user, recording images viewed by the user, etc.) according to some embodiments. As shown by the depicted embodiment, smart contact lens 1600 may include a dielectric substrate 1602 (e.g., a dielectric material such as plastic, glass, etc.), two or more electrodes (e.g., electrodes 1604, 1606, 1608, and/or 1610) for receiving power via a user's body, and circuitry 1612 (e.g., an electronic component, a receiver, a rectifier, and/or other control systems for managing smart contact lens 1600). In some embodiments, electrodes 1604-1610 may be constructed from any conductive material, which may be transparent.

As shown in FIG. 16A, smart contact lens 1600 may include one or more switches 1614 that are configured to dynamically or optionally connect two or more of electrodes 1604, 1606, 1608, and/or 1610 so that the two or more of electrodes 1604, 1606, 1608, and/or 1610 act as a single electrode. For example, switch 1614A may connect electrodes 1604 and 1608 such that they act as a single electrode, switch 1614B may connect electrodes 1608 and 1610 such that they act as a single electrode, and switch 1614C may connect electrodes 1606 and 1610 such that they act as a single electrode. In at least one embodiment, switches 1614 may connect electrodes 1604, 1606, 1608, and 1610 such that they act as a single electrode. Switches 1614 may be Complementary Metal-Oxide-Semiconductor (CMOS) switches, thin-film switches, and/or any other suitable switch. As shown in FIG. 16B, electrodes 1604, 1606, 1608, and/or 1610 may be coupled to a medial surface 1616 and/or a lateral surface 1618 of smart contact lens 1600. In the illustrated embodiment, medial surface 1616 may include electrodes 1604B and 1608B positioned to rest against or near a user's eye, and/or lateral surface 1618 of smart contact lens 1600 may include electrodes 1604A and 1608A positioned to face away from the user's eye.

Figure 17:
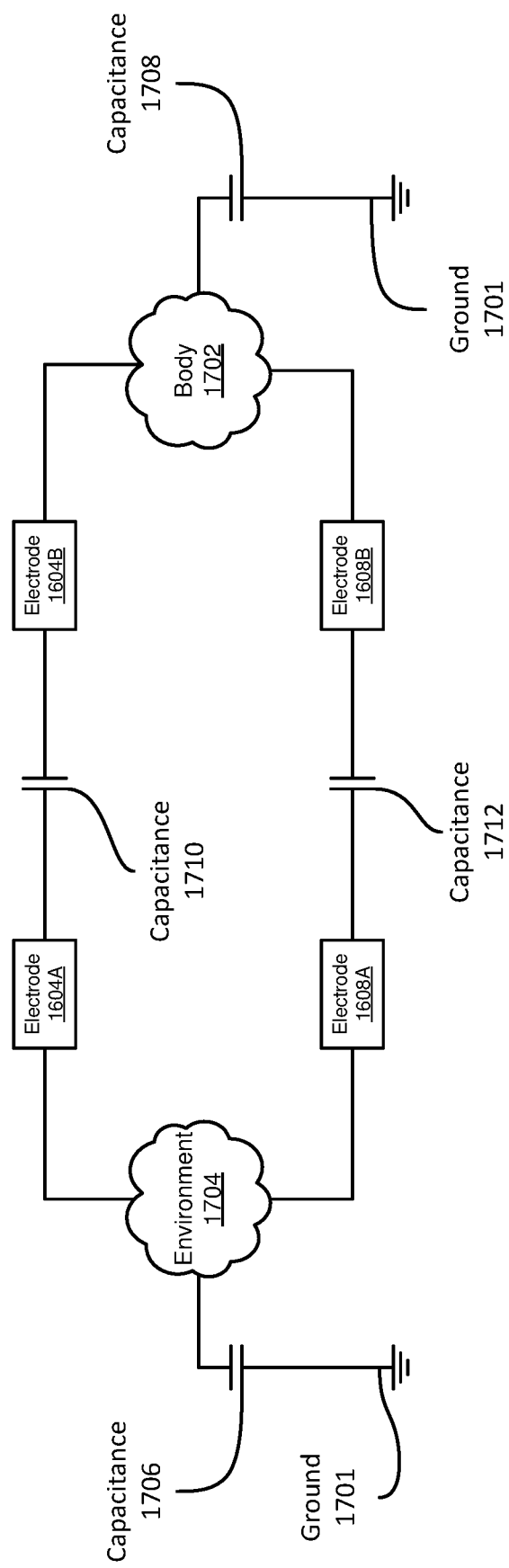
FIG. 17 is a model diagram of the smart contact lens illustrated in FIGS. 16A and 16B in accordance with some embodiments.

FIG. 17 illustrates an exemplary approximated model 1700 of some of the interactions of smart contact lens 1600 in FIGS. 16A and 16B, a body 1702 of a user, an environment 1704 of the user, and ground 1701. As illustrated in FIG. 17, a capacitance 1706 may represent a capacitance between electrodes 1604A and 1608A and ground 1701, and a capacitance 1708 may represent a capacitance between electrodes 1604B and 1608B and ground 1701. Additionally, a capacitance 1710 may represent a capacitance between electrode 1604A and electrode 1604B, which is in contact with body 1702, and a capacitance 1712 may represent a capacitance between electrode 1608A and electrode 1608B, which is in contact with body 1702.

Smart contact lens 1600 may be utilized for any suitable type of gesture detection in accordance with any of the systems and methodologies described herein. In at least one example, electrodes of smart contact lens 1600 may be capacitively and/or galvanically coupled to a user's eye. In one embodiment, a user may wear a smart contact lens 1600 on each of the left and right eyes. Signals may be transmitted between one or more of electrodes 1604, 1606, 1608, and 1610 of each of smart contact lenses 1600 in any suitable manner. A gesture-detection subsystem that includes the pair of smart contact lenses 1600 may analyze the received signals and may extract information concerning an orientation and/or movement of the user's eyes. For example, the gesture-detection subsystem may determine a direction of orientation and/or movement of the user's eyes.

In some embodiments, a smart contact lens 1600 may be disposed on and may be capacitively coupled to at least one of a user's eyes. Smart contact lens 1600 may include at least one electrode (e.g., electrode 1604B and/or electrode 1608B) contacting the user's eye and at least one additional electrode (e.g., electrode 1604A and/or electrode 1068A) may be capacitively coupled to the at least one electrode contacting the user's eye. The capacitively coupled electrodes may be utilized to detect interactions in front of the user, such as gestures made by one or more of the user's arms (e.g., hand gestures) using capacitive sensing as described herein.

Figure 18:
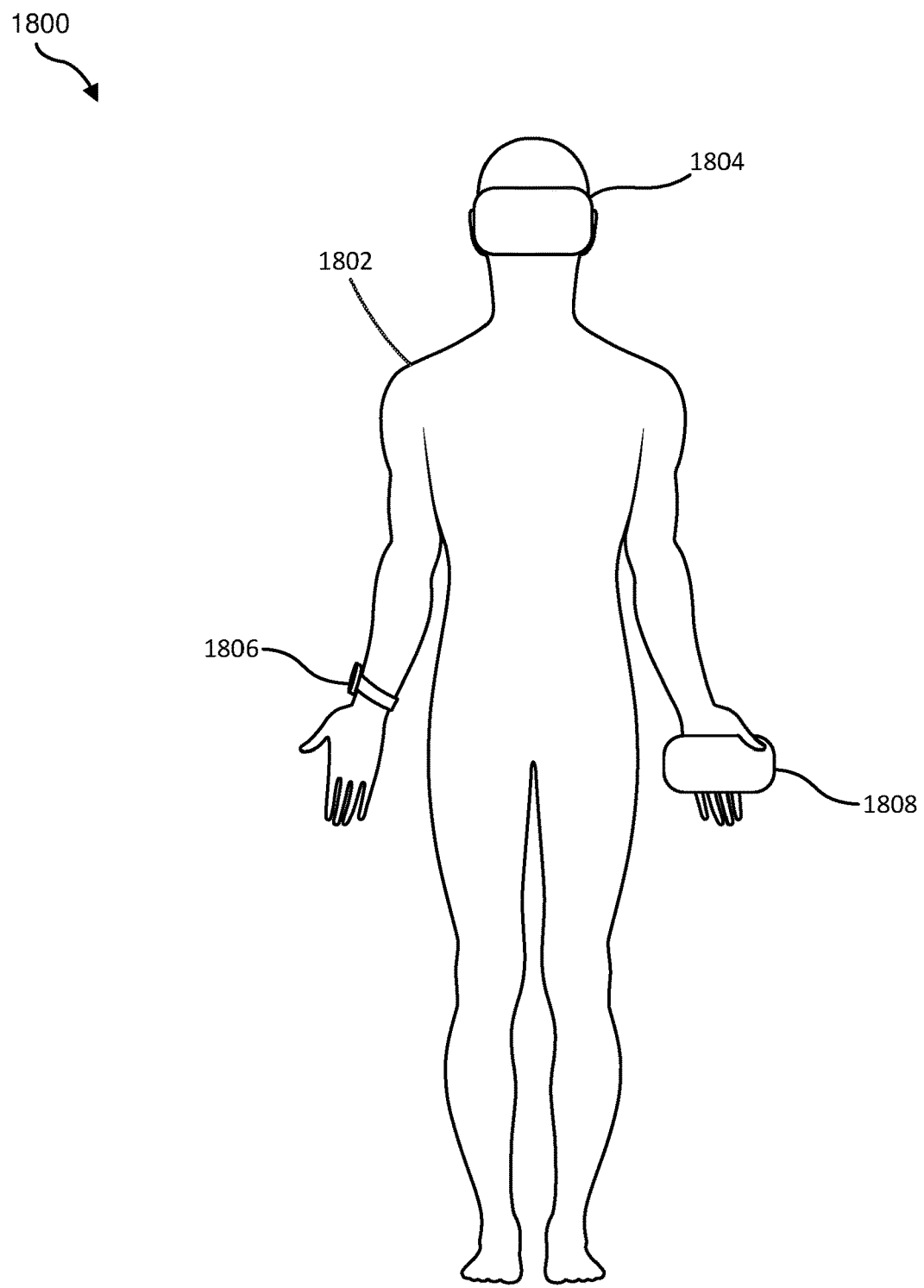
FIG. 18 is a front view of a user wearing components of an exemplary interactive system in accordance with some embodiments.
Figure 19:
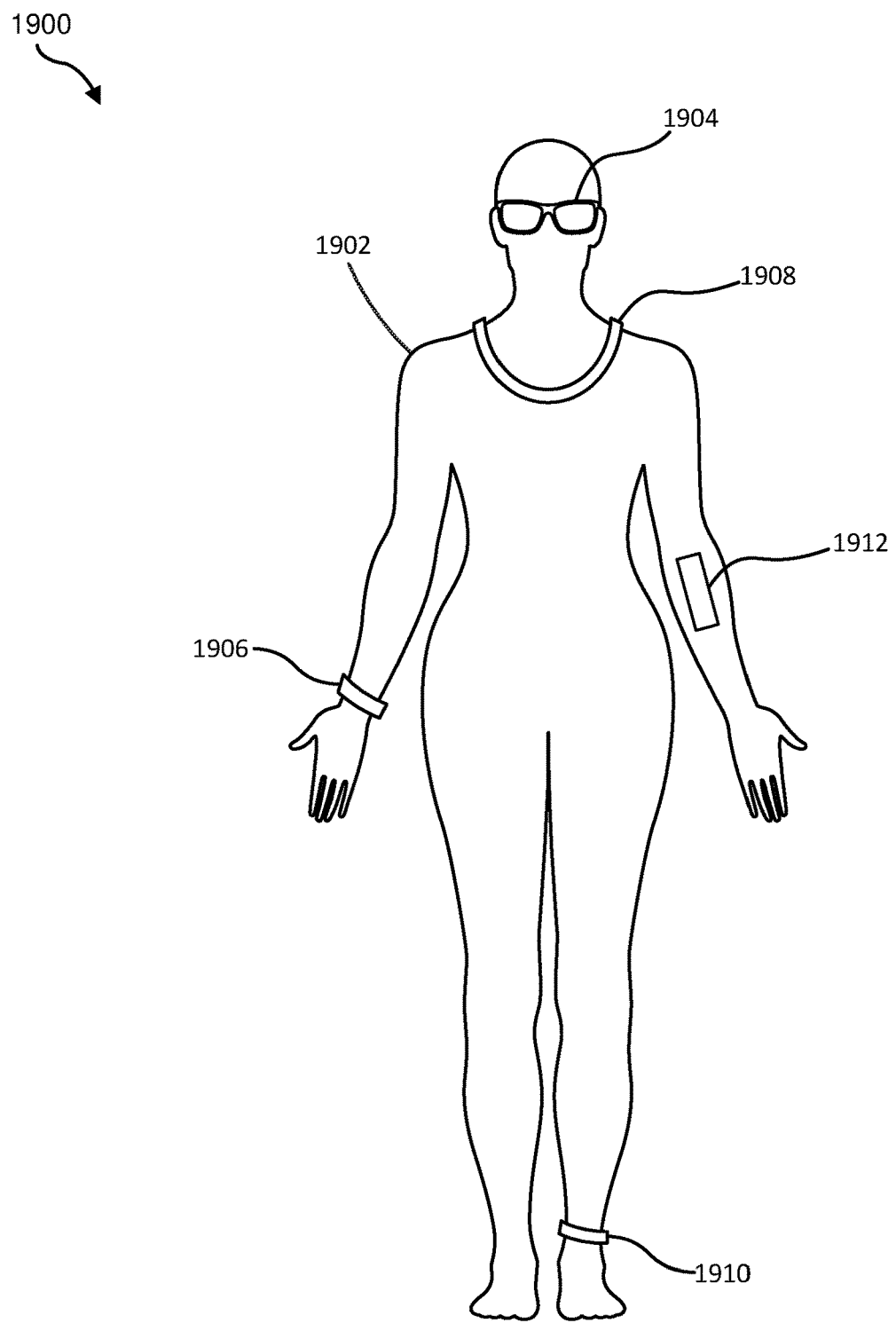
FIG. 19 is a front view of another user wearing components of another exemplary interactive system in accordance with some embodiments.

FIGS. 18 and 19 illustrate exemplary gesture-detection systems 1800 and 1900 that may be utilized for detecting bodily gestures in accordance with some embodiments. As shown in FIG. 18, gesture-detection system 1800 may include a user 1802 and various electronic devices that are worn or held by user 1802. For example, FIG. 18 illustrates a head-mounted-display device 1804, such as head-mounted-display device 700 illustrated in FIGS. 5-7B, worn on the head of user 1802, a smart watch 1806 worn on a wrist of user 1802, and a smart phone 1808 held in a hand of user 1802. In some embodiments, smart watch 1806 and/or smart phone 1808 may include an energy source (e.g., a battery) and may be galvanically and/or capacitively coupled via electrodes to the user's body as described herein.

As shown in FIG. 19, gesture-detection system 1900 may include a user 1902 and various electronic devices that are worn or held by user 1902. For example, FIG. 19 illustrates a head-mounted-display device 1904, such as head-mounted-display device 800 illustrated in FIGS. 8 and 9 or head-mounted-display device 1300 illustrated in FIG. 13, worn on the head of user 1902, an electronic device 1906 worn on a wrist of user 1902, an electronic device 1908 worn about a neck region of user 1902, an electronic device 1910 worn on an ankle of user 1902, and a flexible electronic device 1912 (e.g., epidermal electronic device 2400 in FIG. 24) printed or worn on a forearm of user 1902. In some embodiments, electronic device 1906, electronic device 1908, electronic device 1910, and/or flexible electronic device 1912 may include an energy source (e.g., a battery) and may galvanically and/or capacitively coupled via electrodes to the user's body as described herein.

Figure 20:
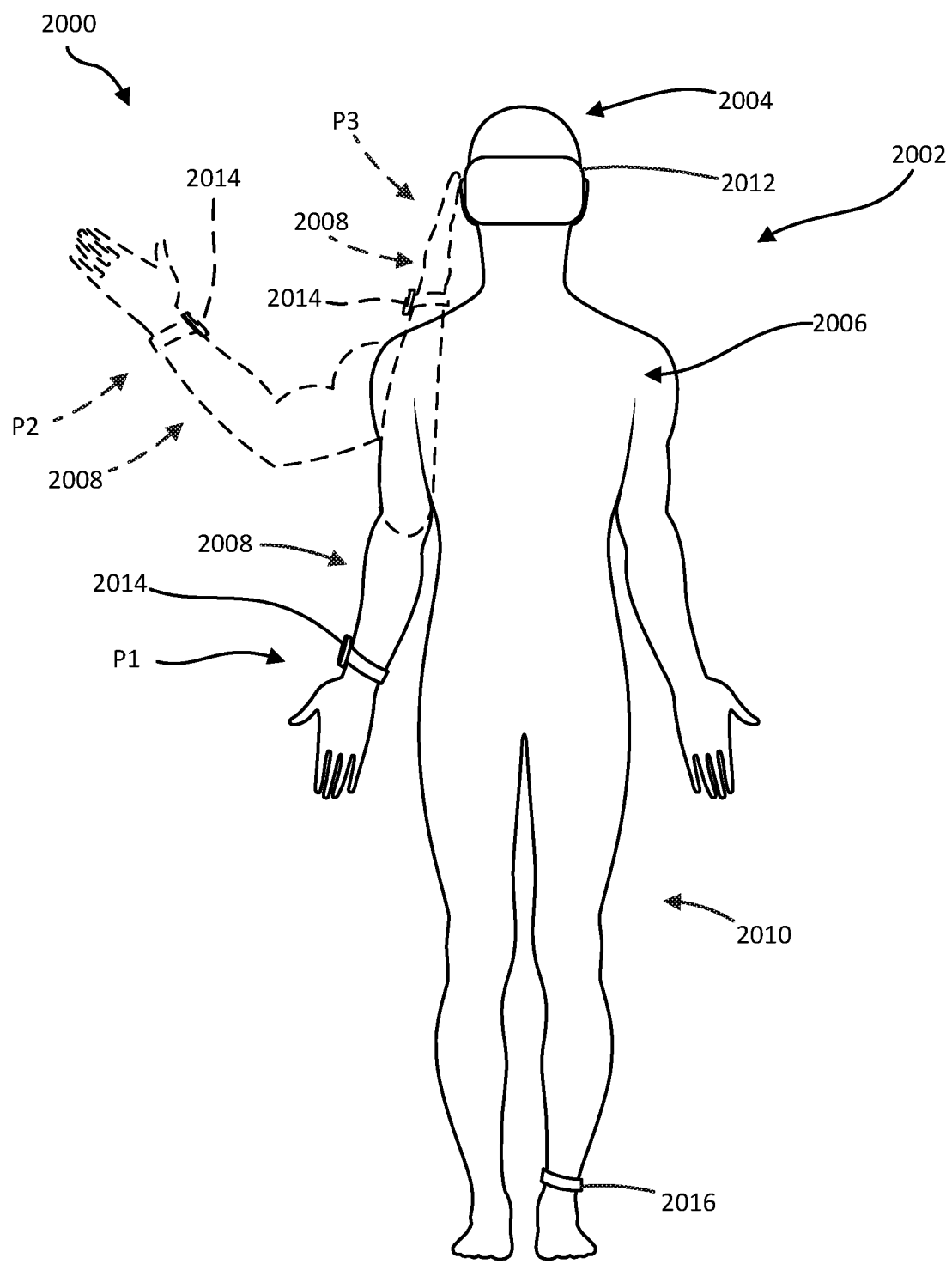
FIG. 20 is a front view of a user wearing and interacting with components of an exemplary interactive system in accordance with some embodiments.

FIG. 20 shows a system 2000 that includes a body 2002 of a user with an exemplary head-mounted-display device 2012 and exemplary electronic devices 2014 and 2016 worn by the user (see, e.g., FIGS. 18 and 19). While head-mounted-display device 2012 and electronic devices 2014 and 2016 are shown for purposes of illustration, any other suitable electronic devices and/or combination of electronic devices may be worn on body 2002 of the user. Head-mounted-display device 2012, electronic device 2014, electronic device 2016, and/or any other suitable electronic devices may be used to detect gestures in any suitable portion of body 2002 of the user. FIG. 20 illustrates exemplary regions of body 2002 of the user, including, for example, head 2004, torso 2006, arm 2008, and leg 2010.

As shown in FIG. 20, head-mounted-display device 2012 may be positioned on head 2004 of the user such that one or more electrodes (e.g., electrodes 114, 116, 120, and/or 122 shown in FIG. 1, electrodes 214, 216, 220, and/or 222 shown in FIG. 2, electrodes 610 shown in FIGS. 7A and 7B, and/or electrodes 902 shown in FIGS. 9 and 13) of head-mounted-display device 2012 abut the user's face. One or more electronic devices, such as electronic device 2014 (e.g., a wristband, watch, etc.) and/or electronic device 2016 (e.g., an ankle band, etc.) may be positioned on another portion of body 2002 of the user such that one or more electrodes of electronic device 2014 and/or electronic device 2016 contact any suitable portion of body 2002 of the user. For example, as shown in FIG. 20, electronic device 2014 may be positioned on arm 2008 of the user (e.g., on the wrist of arm 2008) and electronic device 2016 may be positioned on leg 2010 of the user (e.g., on the ankle of leg 2010). Head-mounted-display device 2012 may be galvanically coupled (see, e.g., FIG. 1) and/or capacitively coupled (see, e.g., FIG. 2) to electronic devices 2014 and 2016 via body 2002 of the user. Additionally or alternatively, one or more other electronic devices may be worn on one or more other regions of body 2002.

According to at least one embodiment, body-bound signals may be transmitted through at least a portion of body 2002 of the user between one or more electrodes of head-mounted-display device 2012 and one or more electrodes of electronic device 2014 and/or electronic device 2016. For example, body-bound signals may be applied by at least one electrode of head-mounted-display device 2012 and may be received by at least one electrode of electronic device 2014 and/or electronic device 2016. Additionally or alternatively, body-bound signals may be applied by at least one electrode of electronic device 2014 and/or electronic device 2016 and may be received by at least one electrode of head-mounted-display device 2012. Characteristics of body-bound signals received by head-mounted-display device 2012, electronic device 2014, and/or electronic device 2016 may be utilized to detect one or more gestures made by body 2002 of the user.

In some embodiments, an amount of body-bound signal attenuation may be affected by positions and/or movements of various portions of body 2002 of the user. Accordingly, received body-bound signals may be evaluated and correlated to various bodily gestures and/or combinations of bodily gestures of the user. For example, bodily positions corresponding to bodily gestures may correlate to relatively longer or shorter path lengths for body-bound signals passing through the user's body, resulting in greater or lesser amounts of attenuation of the body-bound signals. For example, a path length of body-bound signals transmitted through body 2002 of the user between one or more electrodes applying the body-bound signals to a portion of body 2002 and one or more electrodes subsequently receiving the body-bound signals from another portion of body 2002 may be increased or decreased when the user moves a portion of their body 2002 to another position. For example, FIG. 20 illustrates a user's arm 2008 disposed at a first position P1 and at a second position P2, which represents an arm gesture made by the user. In some examples, when the user's arm 2008 is disposed in second position P2, a path length for body-bound signals through body 2002 between head-mounted-display device 2012 and electronic device 2014 may be shortened in comparison to a state in which the user's arm 2008 is disposed in first position P1. The decreased path length may result in less attenuation in the body-bound signals transmitted between electrodes of head-mounted-display device 2012 and electrodes of electronic device 2014. Accordingly, in this example, measured strengths of received signals may be greater and/or amounts of phase shift of the received signals may be less when the user's arm 2008 is in second position P2 compared to when the user's arm is in first position P1. Changes in position in any other suitable portions of the user's body, such as changes in one or more legs 2010 and/or torso 2006, may alter transmitted signals as they pass through the user's body, allowing for detection of bodily gestures and/or movements.

Characteristics of received body-bound signals (e.g., signals received and/or transmitted by head-mounted-display device 2012 and/or by one or more electronic devices, such as electronic devices 2014, 2016, and/or any other suitable electronic devices positioned on the user's body) may be correlated to user gestures, such as bodily gestures and/or facial gestures (see, e.g., FIGS. 12A-12O and 15A-15L), in any suitable manner. Gesture-detection system 2000 may use any suitable signal parameters for gesture detection. According to some embodiments, gesture-detection system 2000 may sweep the frequency of a signal over time from a low frequency (e.g., approximately 1 kHz) to a high frequency (e.g., approximately 150 MHz). The swept frequency may be applied to and/or received by one or more of electrodes of a plurality of electrodes of head-mounted-display device 2012, electronic device 2014, electronic device 2016, and/or any other suitable electronic devices positioned on the user's body in any suitable manner as described herein, with signals being alternately transmitted or received by various electrodes of head-mounted-display device 2012, electronic device 2014, electronic device 2016, and/or any other electronic devices contacting the user's body over a period of time (e.g., for purposes of multiplexing in time) as described herein.

Observations of received body-bound signals may be correlated to user gestures using, for example, machine learning (e.g., supervised or unsupervised learning), computational statistics, and/or any other suitable analytical methodology. In some embodiments, a gesture-detection system (e.g., gesture-detection subsystem 104 or 204 shown in FIGS. 1 and 2 and/or gesture-detection system 1000 illustrated in FIG. 10) may utilize a machine-learning model that uses measured body-bound signals having one or more frequencies that have been transmitted and/or received by various electrodes of head-mounted-display device 2012, electronic device 2014, and/or any other suitable electronic device. Amplitude change over time, phase shift, round trip propagation delay of the signal, and/or any other suitable parameters of such received body-bound signals may be correlated through such methodologies to various user gestures and/or combinations of gestures. Such a model may be specific to a particular user and/or may be more generally applied to multiple users.

One or more electronic devices, such as head-mounted-display device 2012, electronic device 2014, and/or any other suitable electronic device worn, held, and/or otherwise physically interacted with by body 2002 of the user as disclosed herein may be utilized to detect one or more bodily gestures, positions, and/or movements made by at least a portion of body 2002 (see, e.g., FIGS. 12A-12O and 15A-15L). For example, system 2000 may be utilized to detect bodily gestures in and/or near one or more portions of body 2002, such as gestures in head 2004 (e.g., facial, neck, etc.), torso 2006 (e.g., shoulders, chest, back, abdomen, waist, etc.), one or more arms 2008 (e.g., upper arm, forearm, elbow, hand, etc.), and/or one or more legs 2010 (e.g., upper leg, hip, knee, lower leg, foot, etc.). In some examples, system 2000 may be utilized to detect bodily gestures in parts of body 2002 of the user located along a more direct body-bound signal path between at least one transmitting electrode and at least one receiving electrode. For example, a gesture made by an arm 2008 may be determined based on characteristics of a body-bound signal transmitted between head-mounted-display device 2012 and electronic device 2014 worn on the arm 2008, as shown in FIG. 20. In some examples, a gesture made by a leg 2010 may be determined based on characteristics of a body-bound signal transmitted between head-mounted-display device 2012 and electronic device 2016 worn on the leg 2010, as shown in FIG. 20. Additionally or alternatively, system 2000 may be utilized to detect bodily gestures in parts of body 2002 located along a less direct body-bound signal path between at least one transmitting electrode and at least one receiving electrode. For example, head-mounted-display device 2012, electronic device 2014 worn on arm 2008, and/or electronic device 2016 worn on arm 2010, as shown in FIG. 20, and/or any other electronic devices worn by the user may be utilized to detect bodily gestures in one or more other portions of body 2002 other than the arm 2008 on which electronic device 2014 is worn or leg 2010 on which electronic device 2016 is worn. Characteristics of body-bound signals transmitted between head-mounted-display device 2012 and electronic devices 2014, 2016, and/or any other suitable electronic devices may, for example, change in an observable manner correlated to one or more bodily gestures based on movements in portions of body 2002. Any suitable electronic devices and/or combinations of electronic devices worn, held, and/or interacted with by the user may be utilized to detect bodily gestures in any suitable portion of body 2002, without limitation.

In some embodiments, a bodily gesture may be detected when a user's arm is positioned to form a shortened signal path between an electronic device worn on the user's arm, such as electronic device 2014, and head-mounted-display device 2012. For example, as shown in FIG. 20, arm 2008 of the user may be moved to a third position P3 such that the user contacts and/or grasps a portion of head-mounted-display device 2012. In some examples, the user may touch contact portions of head-mounted-display device 2012, such as electrodes 904 and 906 shown in FIG. 9, with their fingers. In at least one example, head-mounted-display device 2012 and electronic device 2014 may each be galvanically coupled to the user. When the user touches electrodes on head-mounted-display device 2012, a galvanic path through the user's body may be shortened between electronic device 2014 and head-mounted-display device 2012 via the user's hand making the contact with the electrodes. Accordingly, a body-bound signal galvanically transmitted between head-mounted-display device 2012 may be observably changed (e.g., the signal may experience a lower degree of attenuation). Thus, the gesture-detection system may detect a gesture made by the user's arm 2008 based on changed characteristics of the received signal.

According to at least one embodiment, bodily gestures detected by one or more of the systems and/or configurations disclosed herein may be utilized to facilitate interaction between a user and at least one electronic device. For example, a user may make a bodily gesture to interact with at least one visual, audio, and/or haptic element presented to the user by a head-mounted-display device (e.g., head-mounted-display device 500 shown in FIGS. 5 and 6). For example, a user may make a facial and/or other bodily gesture indicating a selection and/or other interaction with a displayed image element visible to the user via a display region of a head-mounted-display device. A gesture-detection system (e.g., gesture-detection subsystem 104 or 204 shown in FIGS. 1 and 2 and/or gesture-detection system 1000 shown in FIG. 10) may detect the user gesture and may send a signal indicating the selection and/or other interaction to the head-mounted-display device and/or to an external device other than the head-mounted-display device. In at least one example, the head-mounted-display device may modify visual, audio, and/or haptic elements presented to the user in response to the signal indicating the selection and/or other interaction. For example, the head-mounted-display device of the head-mounted-display device may include a display controller that modifies images displayed in a display region of the head-mounted-display device in response to the signal indicating the selection and/or other interaction.

In some embodiments, bodily gestures detected by one or more of the systems and/or configurations disclosed herein may be utilized to facilitate interaction between a user and at least one other user. For example, a user may make a facial and/or other bodily gesture that is detected and utilized to adjust a visual representation of the user (e.g., an avatar). For example, the facial and/or other bodily gesture made by the user may be detected by a gesture-detection subsystem (e.g., gesture-detection subsystem 104 or 204 shown in FIGS. 1 and 2) and may send data indicating a change in the visual representation of the user to the head-mounted-display device and/or to an external device other than the head-mounted-display device. The data indicating the change in the visual representation of the user may be utilized by the head-mounted-display device and/or the external device to change the appearance of the visual representation of the user. For example, an avatar of the user may be modified to visually represent a facial expression and/or a bodily gesture corresponding to a detected facial gesture made by the user. Such a visual representation of the user may, for example, be visible to the user via a display region of the head-mounted-display device and/or may be visible to one or more other remote users via at least one display device visible to the other or more other remote users, thereby facilitating interaction between the user and the one or more other remote users.

Figure 21:
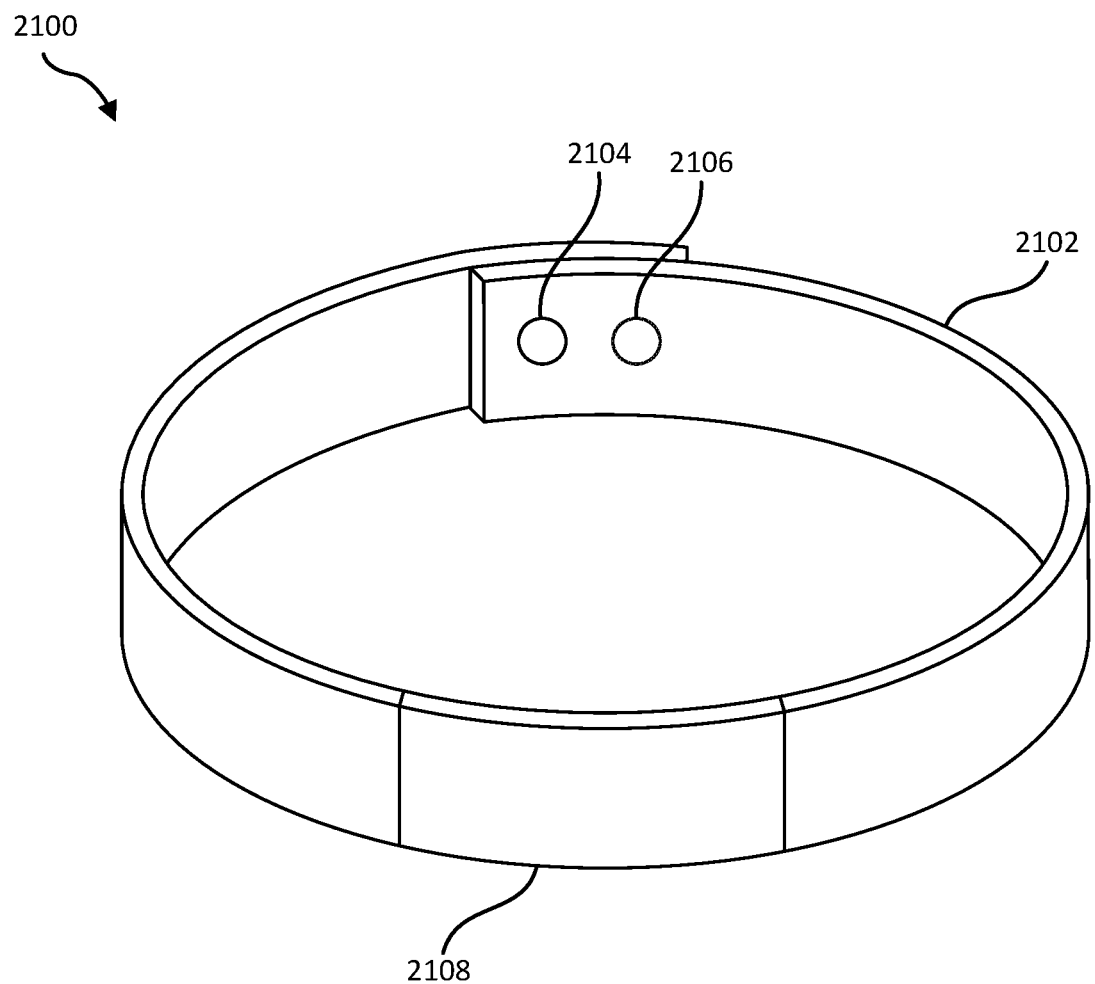
FIG. 21 is a perspective view of an exemplary interactive electronic device in accordance with some embodiments.

FIGS. 21-24 illustrate various exemplary electronic devices that may be interacted with by a user according to some embodiments. FIG. 21 is a perspective view of a body-mounted electronic device 2100 that may transmit and/or receive body-bound signals to and/or from a head-mounted-display device and/or to one or more other electronic devices via a user's body. Body-mounted electronic device 2100 may, for example, be worn on a user's wrist and/or ankle. For example, body-mounted electronic device 2100 may be a smart watch or wristband that is worn on the user's wrist. Body-mounted electronic device 2100 may be galvanically and/or capacitively coupled to the user's body in accordance with any embodiments disclosed herein.

As shown in FIG. 21, body-mounted electronic device 2100 may include a band 2102 for securing the device to the user's body (e.g., around the user's wrist). Body-mounted electronic device 2100 may include at least one electrode configured to abut the user's skin. For example, body-mounted electronic device 2100 may include a pair of electrodes 2104 and 2106. In some embodiments, body-mounted electronic device 2100 may include one or more additional electrodes positioned to contact the user's body. In at least one example in which body-mounted electronic device 2100 is configured to be capacitively coupled to the user's body, body-mounted electronic device 2100 may also include one or more electrodes disposed near electrodes 2104 and 2106 and positioned away from the user's skin. In some embodiments, body-mounted electronic device 2100 may include a display screen 2108 for displaying images that are visible to the user. Body-mounted electronic device 2100 may additionally or alternatively include various other features and/or components, including, for example, a charging port or surface, a barometer, a light sensor (e.g., ultraviolet light sensor), inertial, haptic, environmental, and/or health monitoring sensors (e.g., a heart rate monitor), multimode connectivity antennas for wireless communication, and/or any other suitable components, without limitation.

Figure 22:
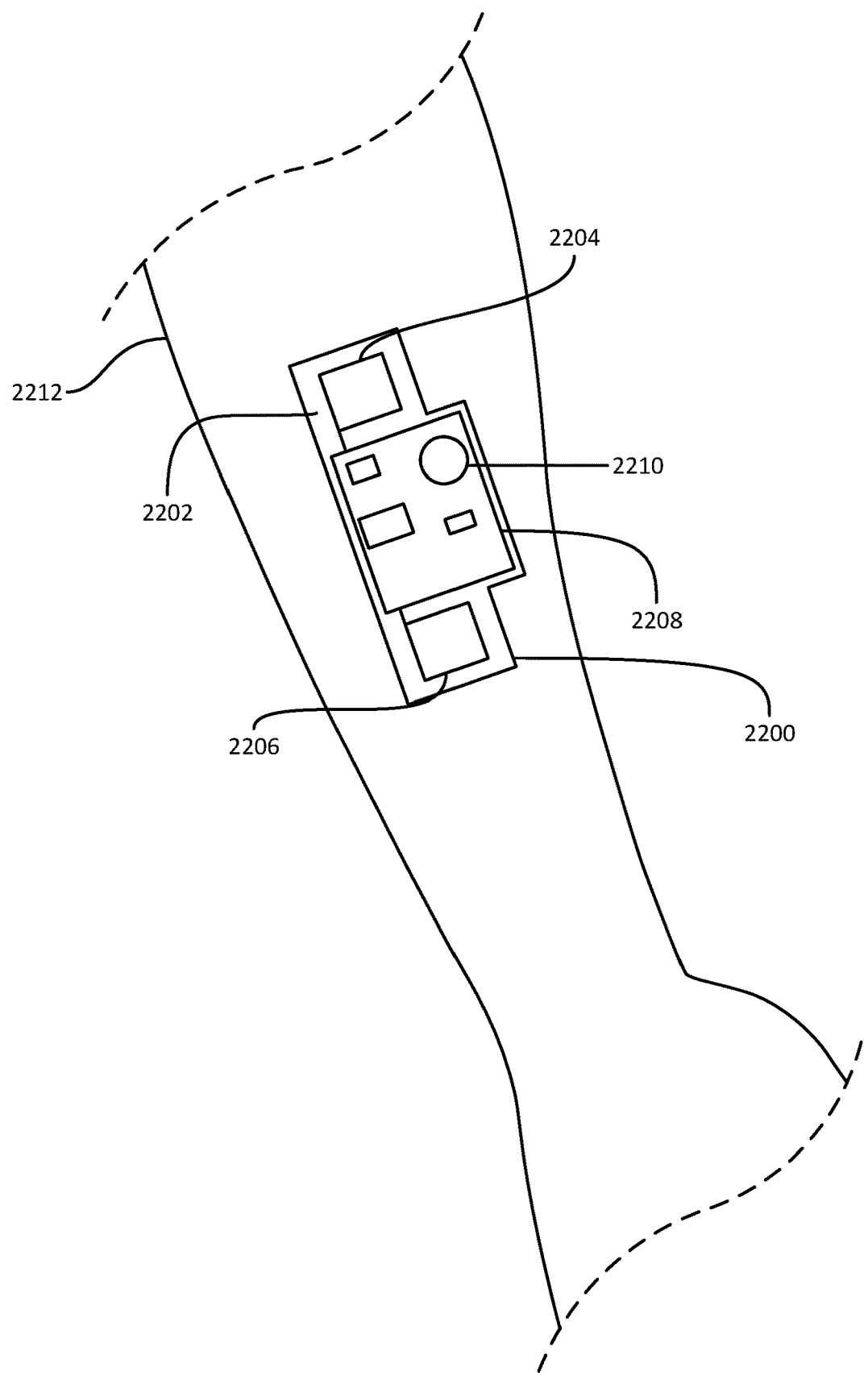
FIG. 22 is a top view of an exemplary epidermal electronic device in accordance with some embodiments.

FIG. 22 is a front view of an epidermal electronic device 2200 according to some embodiments. In the depicted embodiment, epidermal electronic device 2200 includes a flexible substrate 2202, electrodes 2204 and 2206 that may be galvanically and/or capacitively coupled to a user's body, and circuitry 2208 (e.g., an electronic component 2210 and/or other control systems for managing epidermal electronic device 2200). In some embodiments, epidermal electronic device 2200 may represent a biomedical or health-monitoring device. Additionally or alternatively, epidermal electronic device 2200 may represent electronic circuits that have been printed and/or tattooed directly on a user's skin. As shown in FIG. 22, epidermal electronic device 2200 may be printed or affixed to a user's forearm 2212. However, in other embodiments, epidermal electronic device 2200 may be printed or affixed to any other portion of a user's body (e.g., the user's head).

Figure 23A:
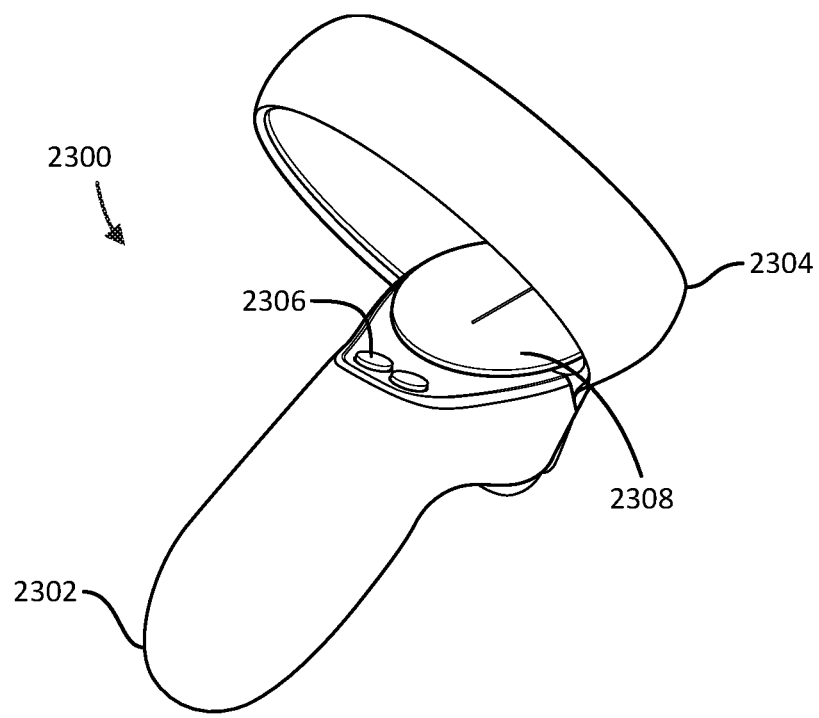
FIGS. 23A and 23B are perspective views of an exemplary interactive electronic device in accordance with some embodiments.
Figure 23B:
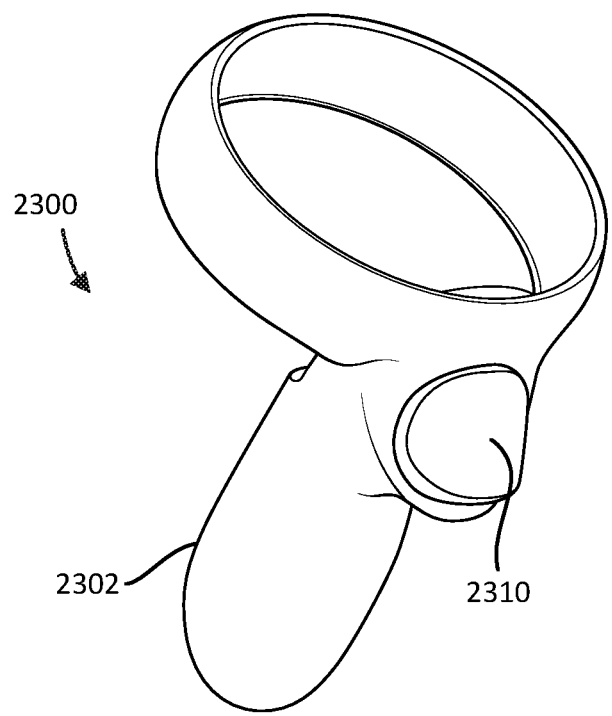
Figure 24:
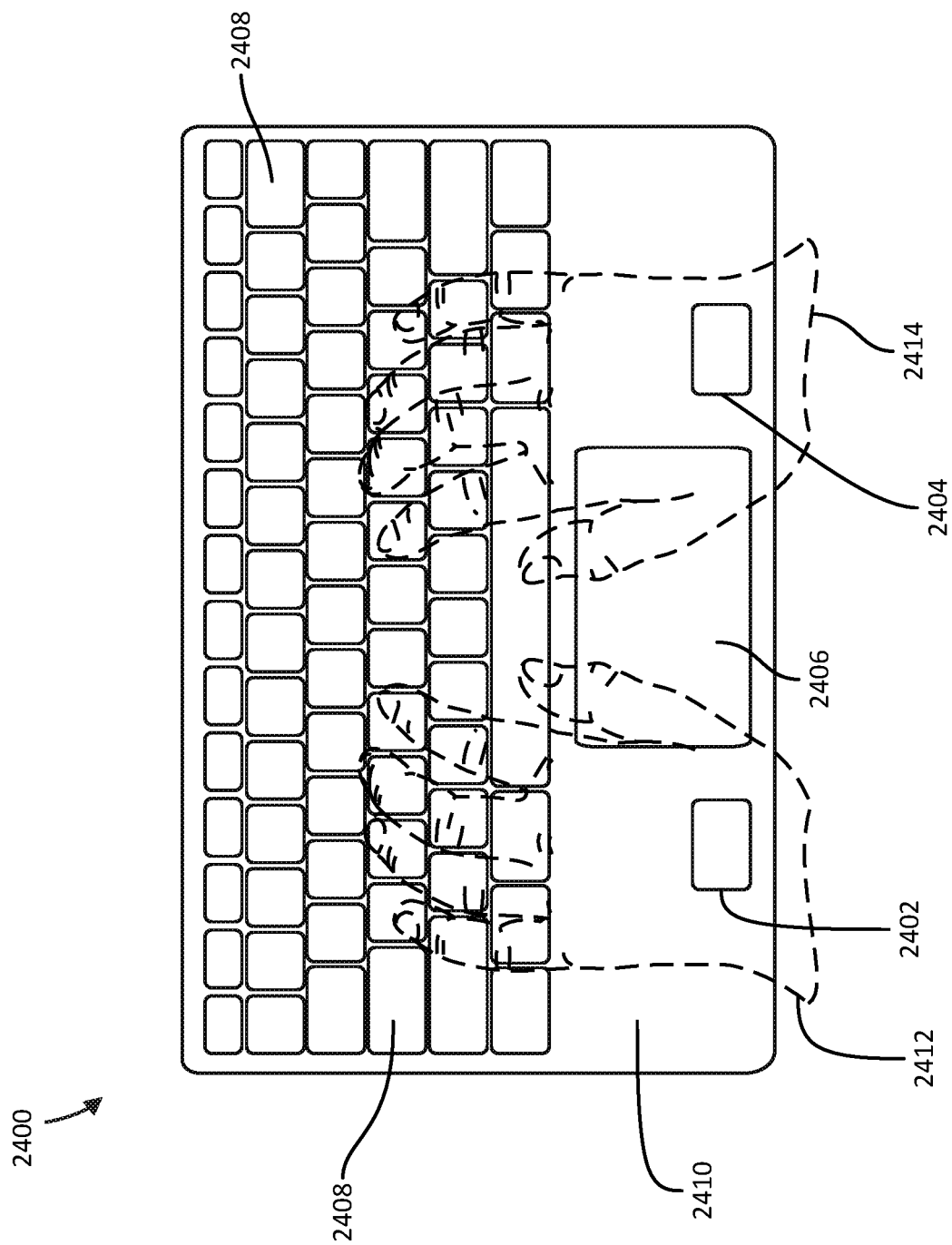
FIG. 24 is a top view of an exemplary interactive electronic device in accordance with some embodiments.
Figure 25:
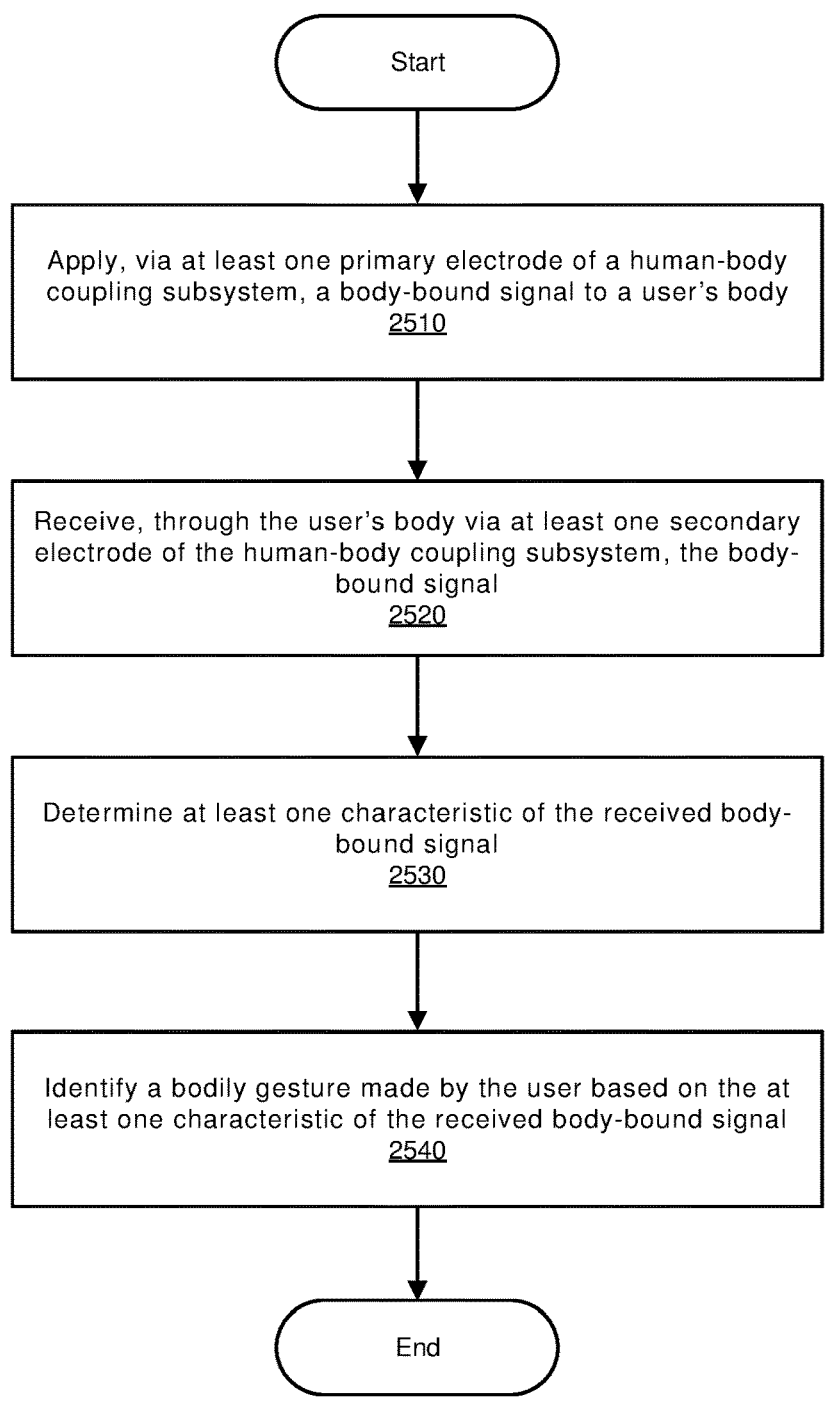
FIG. 25 is a flow diagram of an exemplary method for facilitating user interaction with an electronic device in accordance with some embodiments.

In at least one embodiment, the gesture-detection systems shown and described herein may be used to detect when a user is interacting with one or more electronic devices (e.g., a hand-held controller as shown in FIGS. 23A and 23B, keyboard as shown in FIG. 24, and/or any other suitable device) that may be galvanically and/or capacitively coupled to the user's body during the user's interaction with the devices. For example, when the user is wearing a head-mounted-display device (see, e.g., FIGS. 3, 4, 18, and 19), with or without wearing other electronic devices, the gesture-detection system may sense when the user is interacting with the electronic device and/or what type of interaction the user is having with the electronic device.

FIGS. 23A and 23B are perspective views of a hand-held controller 2300 that may be utilized with a head-mounted-display device in accordance with various embodiments. In some examples, a head-mounted-display device may include two hand-held controllers 2300, with one hand-held controller 2300 for each of a user's right and left hands. Each hand-held controller 2300 may be communicatively coupled to a head-mounted display device. In some embodiments, hand-held controller 2300 may be communicatively coupled to the head-mounted display via any suitable wireless connection.

As shown in FIGS. 23A and 23B, hand-held controller 2300 may include a grip 2302 sized to fit within a user's right or left hand. Hand-held controller 2300 may also include a tracking loop 2304 for tracking a position and orientation of hand-held controller 2300. For example, tracking loop 2304 may include an array of tracking lights, such as LEDs, that are used in conjunction with a sensor (not shown) for motion and positional tracking purposes to provide 360-degree motion control while using hand-held controller 2300. Hand-held controller 2300 may additionally include one or more input features (e.g., button, trigger, joystick, touchpad, etc.) for receiving input from a user. For example, hand-held controller 2300 may include buttons 2306 that may be depressed by the user's thumb to activate a corresponding switch and/or sensor. Additionally, hand-held controller 2300 may include a touchpad 2308 that includes, for example, sensors (e.g., capacitive sensors, conductive sensors, resistive sensors, etc.) that detect the position and/or directional movement of a user's thumb. In some embodiments, touchpad 2308 may be depressed by a user at one or more locations in the same manner as a button to provide additional input by activating one or more switches and/or sensors. Hand-held controller 2300 may also include a trigger 2310, which is a button that may be depressed by a user's finger (e.g., index finger) to activate a switch and/or sensor, on a side of hand-held controller 2300 opposite buttons 2306 and touchpad 2308.

Additionally or alternatively, hand-held controller 2300 may include one or more other buttons, triggers, touchpads, and/or any other suitable input features, such as, for example, an analog stick (e.g., a thumbstick) and/or a control pad (e.g., directional pad), without limitation. One or more electrodes for galvanically and/or capacitively coupling with a user's body may be utilized in any suitable portion of hand-held controller 2300, without limitation, including, for example, one or more portions of grip 2302, tracking loop 2304, one or more of buttons 2306, touchpad 2308, and/or trigger 2310. In some examples, a gesture-detection system may sense, based on signals transmitted between hand-held controller 2300 and a head-mounted-display device worn by a user as described herein, whether or not the user's hand is holding hand-held controller 2300. Additionally or alternatively, the gesture-detection system may detect various interactions between the user and hand-held controller 2300 based on the transmitted signals.

FIG. 24 is a top view of a keyboard 2400 that may be utilized with a head-mounted-display device as the user is interacting with keyboard 2400 in accordance with some embodiments. In at least one embodiment, keyboard 2400 may be a keyboard of a laptop or a desktop computing device. Whenever a user interacts with keyboard 2400, keyboard 2400 may transmit body-bound signals to and/or receive body-bound signals from a head-mounted-display device or other wearable devices worn by a user via electrodes incorporated into keyboard 2400.

Conductive elements for galvanically and/or capacitively coupling with a user's body may be incorporated into keyboard 2400 at various locations. As shown, in at least one embodiment, keyboard 2400 may include a left conductive element 2402, a right conductive element 2404, a touchpad 2406, keys 2408, and a top surface 2410. Left conductive element 2402 may be positioned relative to keys 2408 so that a left hand 2412 of a user will typically rest on left conductive element 2402 when the user interacts with keyboard 2400. Similarly, right conductive element 2404 may be positioned relative to keys 2408 so that a right hand 2414 of the user will typically rest on right conductive element 2404 when the user interacts with keyboard 2400. In addition to or as an alternative to left conductive element 2402 and right conductive element 2404, one or more additional conductive elements may be incorporated into other surfaces of keyboard 2400 with which the user is likely to touch or contact. For example, conductive elements may be incorporated in touchpad 2406, one or more of keys 2408, and/or some or all of top surface 2410. In some embodiments, a gesture-detection system may sense, based on signals transmitted between keyboard 2400 and a head-mounted-display device worn by a user as described herein, when a hand of a user is on the keyboard but is not typing. Subsequently, the gesture-detection system may sense when the hand of the user is on keyboard and is typing.

FIG. 15 is a flow diagram of an exemplary computer-implemented method 1500 for facilitating user interaction with electronic devices according to some embodiments. The steps shown in FIG. 15 may be performed by any suitable computer-executable code and/or computing system, including the devices illustrated in FIGS. 1-14B. In one example, each of the steps shown in FIG. 15 may represent an algorithm whose structure includes and/or is represented by multiple sub-steps, examples of which will be provided in greater detail below.

As illustrated in FIG. 15, at step 1510 one or more of the systems described herein may apply, via at least one primary electrode of a human-body coupling subsystem, a body-bound signal to a user's body. For example, transmitting and receiving subsystem 106 shown in FIG. 1 may galvanically apply a body-bound signal to the body of user 102 via a primary electrode 114 of human-body coupling subsystem 110. In another example, transmitting and receiving subsystem 206 shown in FIG. 2 may capacitively apply a body-bound signal to the body of user 202 via a primary electrode 214 of human-body coupling subsystem 210.

The systems described herein may perform step 1510 in a variety of ways. In general, a transmitting and receiving may transmit a body-bound signal through a user's body by converting a DC voltage to an oscillating signal (e.g., a square-wave signal) and applying the oscillating signal across two electrically isolated electrodes of a human-body coupling subsystem to induce a current or an electric field within the user's body. In some examples, a transmitting and receiving may transmit an artificial body-bound signal through a user's body by applying an oscillating or alternating voltage (i.e., an electric potential difference) across two electrodes of a human-body coupling subsystem. For example, the transmitting and receiving may select a frequency between about 1 kHz and 150 MHz for the oscillating or alternating voltage. In some examples, the applied frequency may be one of a plurality of frequencies applied during a time frame as part of a frequency sweep in which multiple frequencies are applied at different time periods via the primary electrode and/or one or more other electrodes of the human-body coupling system as described herein (see, e.g., FIG. 10).

As illustrated in FIG. 15, at step 1520 one or more of the systems described herein may receive, through the user's body via at least one secondary electrode of the human-body coupling subsystem, the body-bound signal. For example, transmitting and receiving subsystem 106 shown in FIG. 1 may galvanically receive, through the body of user 102 via secondary electrodes 120 and 122 of human-body coupling subsystem 110, the body-bound signal. In another example, transmitting and receiving subsystem 206 shown in FIG. 2 may capacitively receive, through the body of user 202 via secondary electrodes 220 and 222 of human-body coupling subsystem 210, the body-bound signal.

As illustrated in FIG. 15, at step 1530 one or more of the systems described herein may determine at least one characteristic of the received body-bound signal. For example, gesture-detection subsystem 104 shown in FIG. 1 or gesture-detection subsystem 204 shown in FIG. 2 may determine at least one characteristic of the received body-bound signal. In at least one example, the at least one characteristic of the received body-bound signal may include at least one of a magnitude of the received body-bound signal or a phase of the received body-bound signal As illustrated in FIG. 15, at step 1540 one or more of the systems described herein may identify a bodily gesture made by the user based on the at least one characteristic of the received body-bound signal. For example, gesture-detection subsystem 104 shown in FIG. 1 or gesture-detection subsystem 204 shown in FIG. 2 may identify a bodily gesture made by user 102 or user 202 based on the at least one characteristic of the received body-bound signal. In some example, multiple different frequencies may be applied and received consecutively via different combinations of electrodes over a period of time and the received frequencies may be utilized by the gesture-detection subsystem to identify the bodily gesture made by the user according to any of the techniques described herein (see, e.g., FIG. 10).

As explained above, embodiments of the instant disclosure may enable devices to detect user gestures based on changes in one or more body-bound signals transmitted through a user's body. User interaction with electronic devices, such as head-mounted displays, may be facilitated through user gestures without requiring users to input operations via conventional input interfaces, such as keyboards, controllers, headset buttons, voice-command interfaces, etc. Moreover, users may use facial and/or other bodily gestures to easily and efficiently convey gestures to other remote users. Accordingly, users may interact with electronic devices and other users in a manner that provides a broader range of interactive capabilities while facilitating a greater sense of immersion in VR and AR environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the subsystems and/or modules described herein may transform data, physical devices, and/or representations of physical devices from one form to another. For example, one or more of the subsystems and/or modules recited herein may apply a body-bound signal to and/or receive a body-bound signal from a human body, transform the artificial body-bound signal into correlated result for determination of a user gesture, output a result of the transformation to one or more electronic devices, use the result of the transformation to modify a displayed image, and/or store the result of the transformation. Additionally or alternatively, one or more of the subsystems and/or modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An interactive system comprising:
    a human-body coupling subsystem configured to conduct a body-bound signal through a user's body, the human-body coupling subsystem comprising a plurality of electrodes;
    a transmitting and receiving subsystem electrically connected to the human-body coupling subsystem and configured to:
        apply, to the user's body via at least one primary electrode of the human-body coupling subsystem, a body-bound signal having a frequency in a range of from approximately 1 kHz to approximately 150 MHz; and
        receive, through the user's body via at least one secondary electrode of the human-body coupling subsystem, the body-bound signal; and
    a gesture-detection subsystem electrically connected to the transmitting and receiving subsystem and configured to:
        determine at least one characteristic of the received body-bound signal; and
        identify a bodily gesture made by the user based on the at least one characteristic of the received body-bound signal.

2. The interactive system of claim 1, wherein the at least one characteristic of the received body-bound signal comprises at least one of an amplitude, a phase shift, or a propagation delay of the received body-bound signal.

3. The interactive system of claim 1, wherein the transmitting and receiving subsystem is configured to selectively apply and receive body-bound signals via each of the plurality of electrodes.

4. The interactive system of claim 3, wherein the at least one predetermined signal characteristic is based on at least one characteristic of one or more body-bound signals received by the transmitting and receiving subsystem during at least one of a time period during which the user is making the bodily gesture or a time period during which the user is not making the bodily gesture.

5. The interactive system of claim 1, wherein the gesture-detection subsystem is configured to identify the bodily gesture based on a comparison between the at least one characteristic of the received body-bound signal and at least one characteristic of a transmitted signal sent from the transmitting and receiving subsystem to the at least one primary electrode of the human-body coupling subsystem.

6. The interactive system of claim 1, wherein the gesture-detection subsystem is configured to identify the bodily gesture based on a correlation between the bodily gesture and the at least one characteristic of the received body-bound signal determined using a trained machine-learning model.

7. The interactive system of claim 1, wherein the human-body coupling subsystem is configured to be galvanically coupled or capacitively coupled to the user's body via at least some of the plurality of electrodes.

8. The interactive system of claim 1, wherein the human-body coupling subsystem further comprises:
    a medial surface positioned to face at least a portion of the user's body when the human-body coupling subsystem is worn by the user; and
    a lateral surface positioned to face away from the user's body when the human-body coupling subsystem is worn by the user, wherein:
        the at least one primary electrode is coupled to the medial surface of the human-body coupling subsystem such that the at least one primary electrode is positioned to abut at least one primary region of the user's body; and the at least one secondary electrode is coupled to the medial surface of the human-body coupling subsystem such that the at least one secondary electrode is positioned to abut at least one secondary region of the user's body.

9. The interactive system of claim 1, wherein:
the transmitting and receiving subsystem is configured to:
apply, to the user's body via the at least one primary electrode of the human-body coupling subsystem, a plurality of body-bound signals, each of the plurality of body-bound signals having a separate frequency;
receive, through the user's body via the at least one secondary electrode of the human-body coupling subsystem, the plurality of body-bound signals; and
the gesture-detection subsystem is configured to:
determine at least one characteristic of each of the plurality of received body-bound signals; and
identify the bodily gesture made by the user based on the at least one characteristic of each of the plurality of received body-bound signals.

10. The interactive system of claim 9, wherein the transmitting and receiving subsystem is configured to apply each of the plurality of body-bound signals to the user's body via a separate primary electrode of the at least one primary electrode.

11. The interactive system of claim 9, wherein the transmitting and receiving subsystem is configured to apply each of the plurality of body-bound signals to the user's body during a separate time period.

12. The interactive system of claim 1, further comprising a head-mounted device comprising:
a display region configured to display images to the user; and
a display controller configured to modify the images displayed in the display region based on the identified bodily gesture.

13. The interactive system of claim 12, wherein the head-mounted device comprises at least a portion of the human-body coupling subsystem.

14. The interactive system of claim 13, further comprising an electronic device that is configured to abut a non-head portion of the user's body, the electronic device comprising another portion of the human-body coupling subsystem.

15. The interactive system of claim 1, further comprising a communication subsystem configured to transmit data to an external device, wherein the communication subsystem is configured to modify the data transmitted to the external device based on the identified bodily gesture.

16. The interactive system of claim 1, wherein the bodily gesture comprises at least one of a facial gesture, a head gesture, a torso gesture, an arm gesture, or a leg gesture.

17. A head-mounted-display device comprising:
a human-body coupling subsystem configured to conduct a body-bound signal through a user's body, the human-body coupling subsystem comprising a plurality of electrodes, each of the plurality of electrodes positioned to abut a separate region of the user's head;
a transmitting and receiving subsystem electrically connected to the human-body coupling subsystem and configured to:
apply, to the user's head via at least one electrode of the plurality of electrodes, a body-bound signal having a frequency in a range of from approximately 1 kHz to approximately 150 MHz; and
receive, through the user's head via at least one additional electrode of the plurality of electrodes, the body-bound signal.

18. The head-mounted-display device of claim 17, further comprising a facial-interface cushion dimensioned to abut a facial portion of the user, wherein one or more of the plurality of electrodes form an integral part of the facial-interface cushion.

19. The head-mounted-display device of claim 17, further comprising:
a display region;
a bridge coupled to the display region and dimensioned to rest on the nose of the user; and
a temple coupled to the display region and dimensioned to rest on an ear of the user;
wherein one or more of the plurality of electrodes form an integral part of one of the bridge or the temple.

20. A method comprising:
applying, to a user's body via at least one primary electrode of a human-body coupling subsystem, a body-bound signal having a frequency in a range of from approximately 1 kHz to approximately 150 MHz;
receiving, through the user's body via at least one secondary electrode of the human-body coupling subsystem, the body-bound signal;
determining at least one characteristic of the received body-bound signal; and
identifying a bodily gesture made by the user based on the at least one characteristic of the received body-bound signal.

* * * * *